United States Patent [19]

Kaufman et al.

[11] 4,313,160
[45] Jan. 26, 1982

[54] DISTRIBUTED INPUT/OUTPUT CONTROLLER SYSTEM

[75] Inventors: Phillip A. Kaufman, Irvine; Jerry R. Washburn, Alhambra; Paul A. Stapinski, Mission Viejo, all of Calif.

[73] Assignee: Computer Automation, Inc., Irvine, Calif.

[21] Appl. No.: 35,263

[22] Filed: May 1, 1979

Related U.S. Application Data

[63] Continuation of Ser. No. 715,174, Aug. 17, 1976, abandoned.

[51] Int. Cl.³ .................. G06F 3/00; G06F 13/00
[52] U.S. Cl. ................................................ 364/260
[58] Field of Search ... 364/20 0 MS File, 900 MS File; 370/41, 85, 92, 91, 93, 89

[56] References Cited

U.S. PATENT DOCUMENTS

| | | | |
|---|---|---|---|
| 3,588,831 | 6/1971 | Figueroa et al. | 364/200 |
| 3,702,462 | 11/1972 | England | 364/200 |
| 3,728,693 | 4/1973 | Macker et al. | 364/200 |
| 4,003,033 | 1/1977 | O'Keefe | 364/200 |
| 4,016,548 | 4/1977 | Law et al. | 364/200 |
| 4,017,093 | 4/1977 | Calle et al. | 364/200 |
| 4,017,839 | 4/1977 | Calle et al. | 364/200 |
| 4,020,472 | 4/1977 | Bennett et al. | 364/200 |
| 4,025,906 | 5/1977 | Riikonen | 364/200 |
| 4,040,028 | 8/1977 | Pauker et al. | 364/900 |
| 4,103,328 | 7/1978 | Dalmasso | 364/200 |
| 4,104,718 | 8/1978 | Poublan et al. | 364/200 |
| 4,110,822 | 8/1978 | Porter et al. | 364/200 |

OTHER PUBLICATIONS

Westgate, Roger, The Design & Application of Microprocessor Systems pp. 52-55, 1977.
Microprocessors -A Special Issue, *Electronics,* Apr. 1976, p. 81.

*Primary Examiner*—Mark E. Nusbaum
*Assistant Examiner*—John G. Mills
*Attorney, Agent, or Firm*—Knobbe, Martens, Olson, Hubbard & Bear

[57] ABSTRACT

An improved distributed input/output system is disclosed for controlling numerous high speed peripheral devices (both low speed, medium speed, and high speed) and the transfer of data signals, status signals, and control signals between those devices and a general purpose digital computer. The control system described includes a direct-memory-access multiplexer which can accommodate a plurality of low or medium-speed input/output services and also high-speed input/output devices under the control of separate programmable microcoded peripheral-unit controllers. The direct-memory-access multiplexer of this invention is fully compatible with controllers that can also be used with an indirect-memory access multiplexer. Each controller, being an element of a distributed system, is adapted to be located at an individual peripheral device and each is connected to the multiplexer by an identical ribbon cable. The direct-memory-access multiplexer employs a microengine, that is, a microcoded processor, and an arithmetic logic circuit to simulate operations of a computer's central processor unit. The peripheral-unit controllers may be configured somewhat differently depending upon whether the peripheral device utilizes data signals in a parallel format or in a series format. Data is transferred directly between a computer memory unit and the periperhal devices without requiring the use of any computer working registers, without requiring subroutines to store data and status signals of an ongoing main program that is temporarily halted and without involving operations of the central processor unit. Each peripheral-device controller can issue interrupt signals which are processed on a priority basis when they occur simultaneously.

16 Claims, 37 Drawing Figures

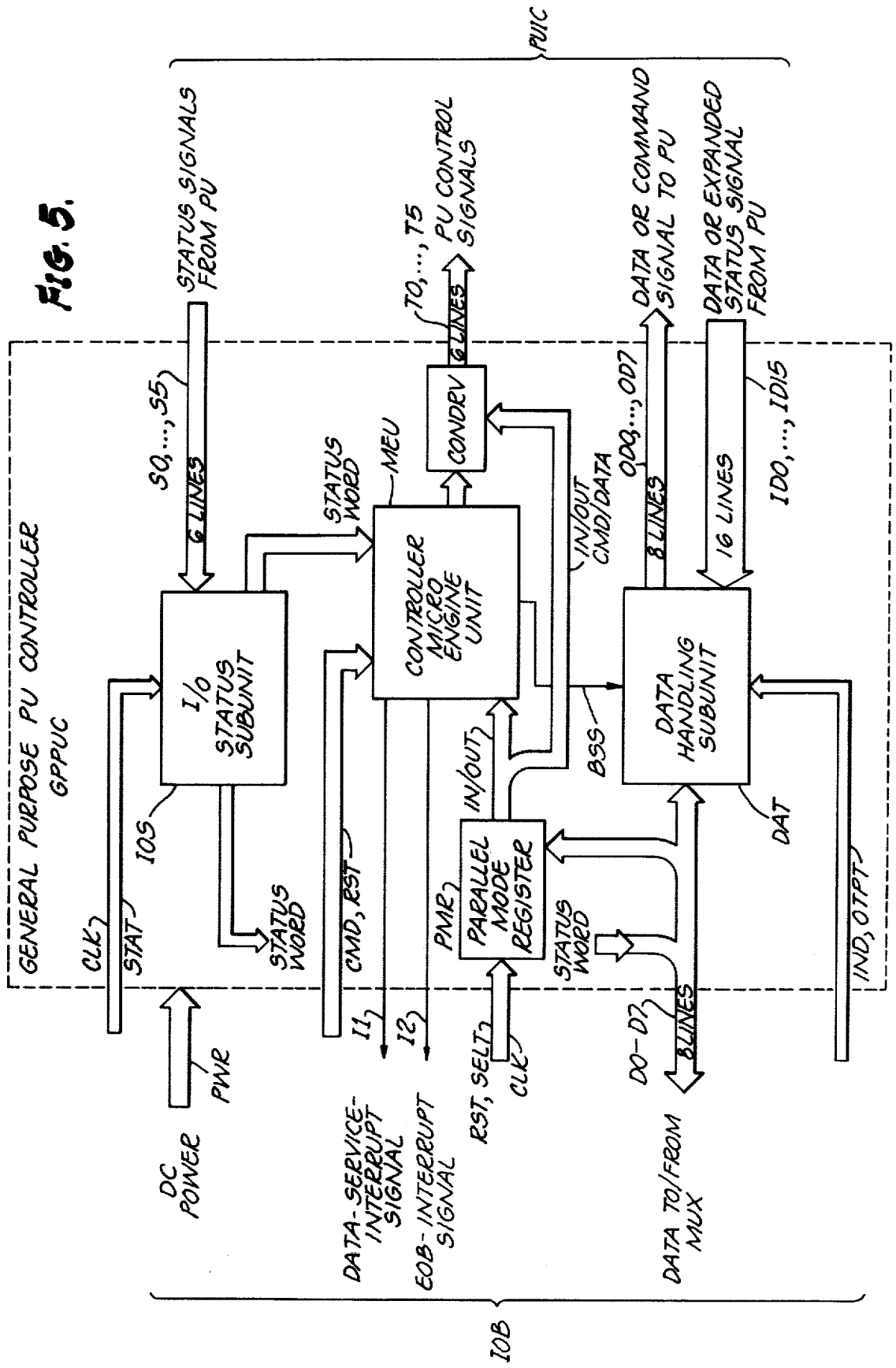

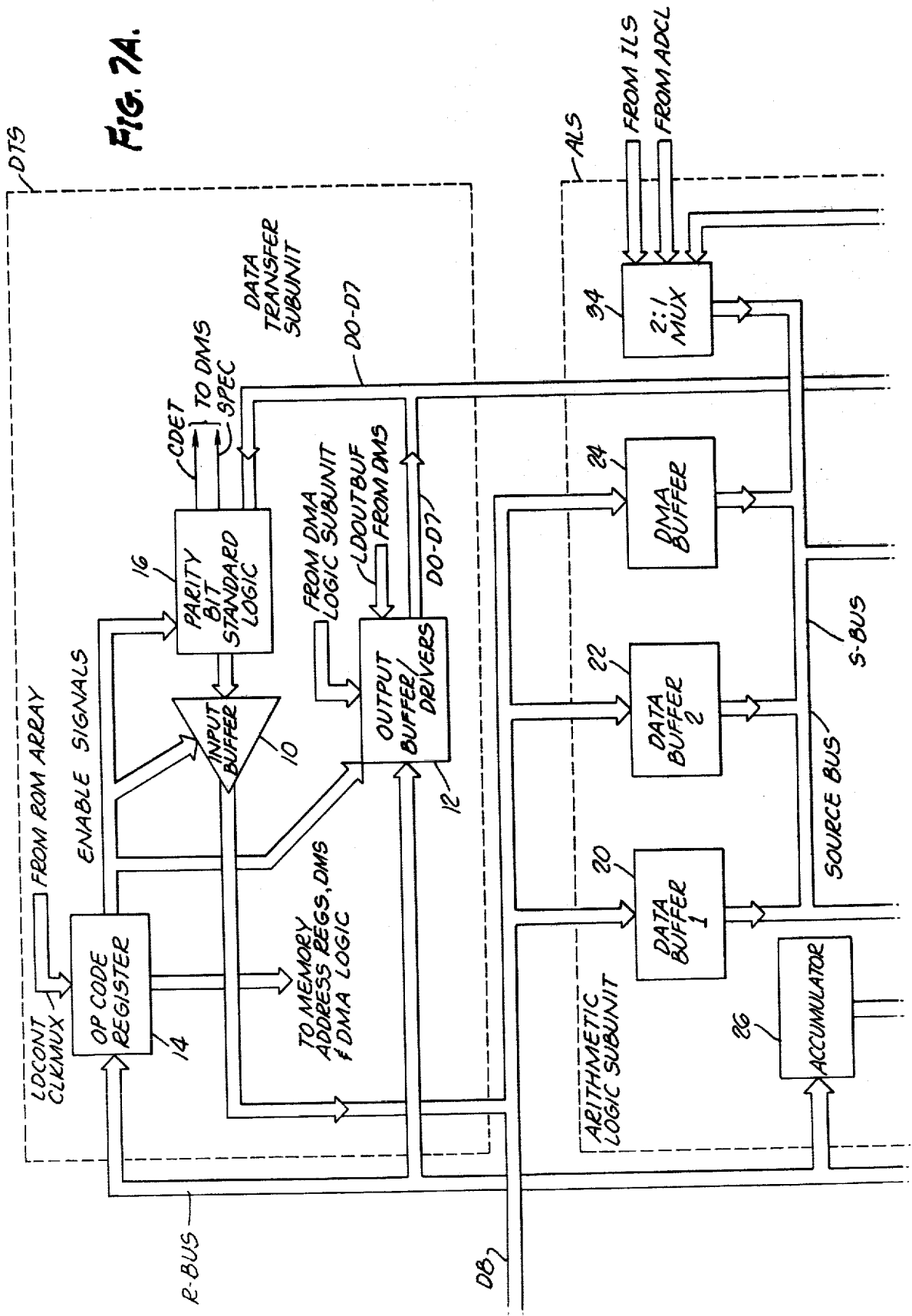

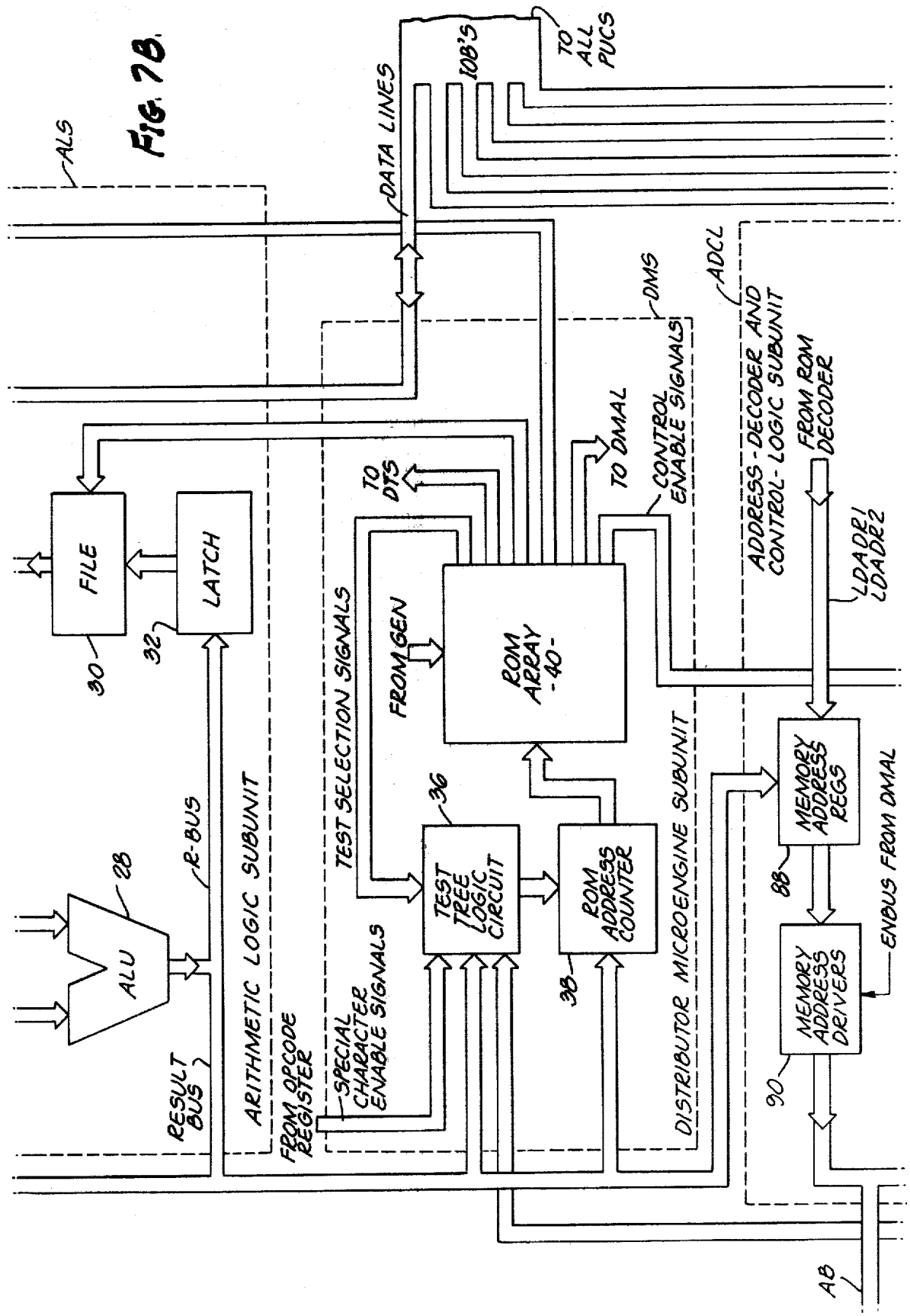

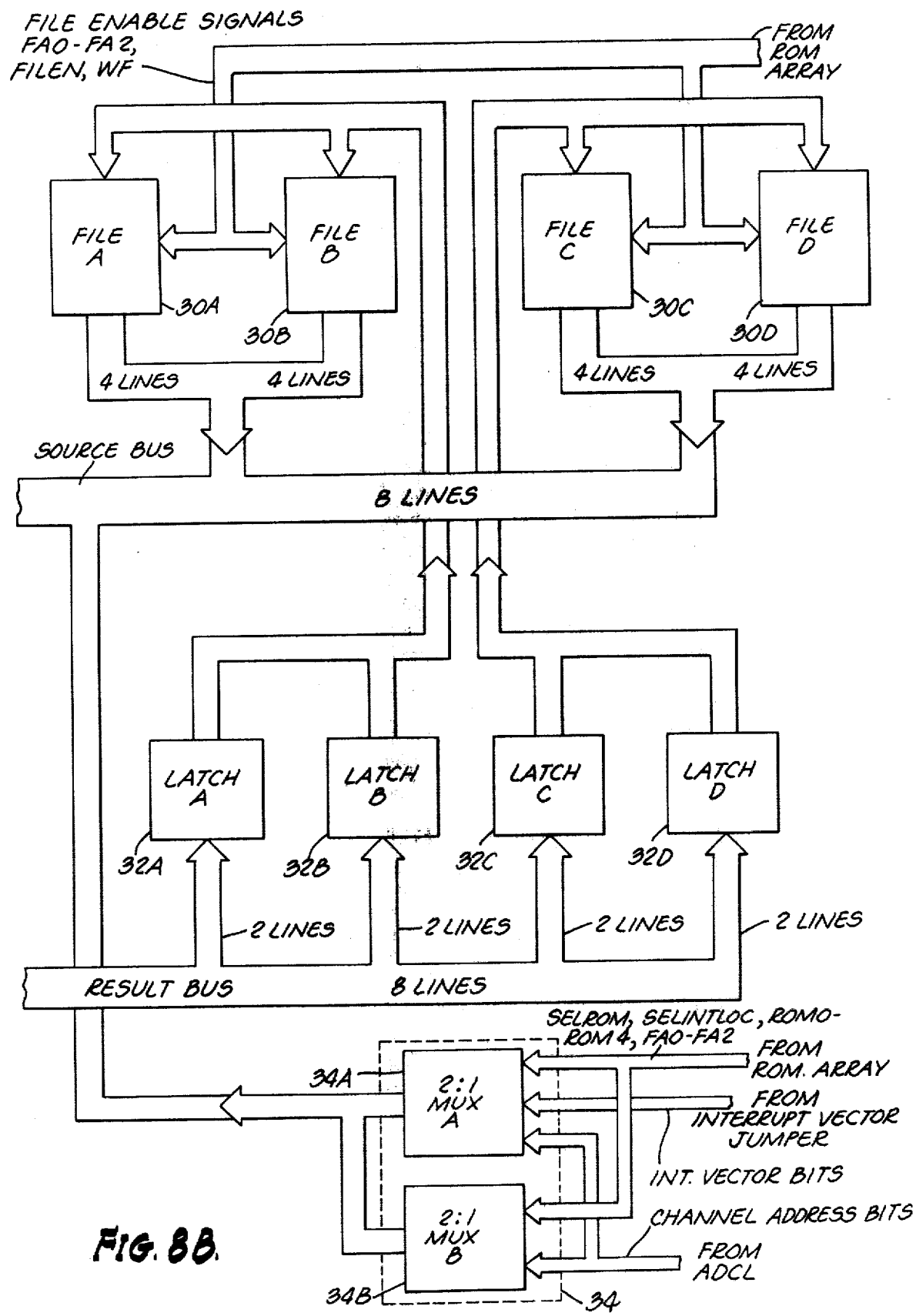

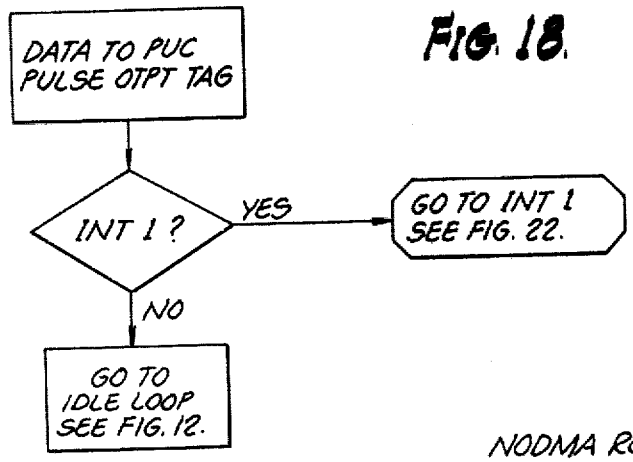
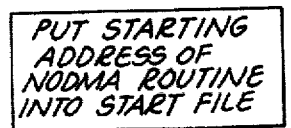
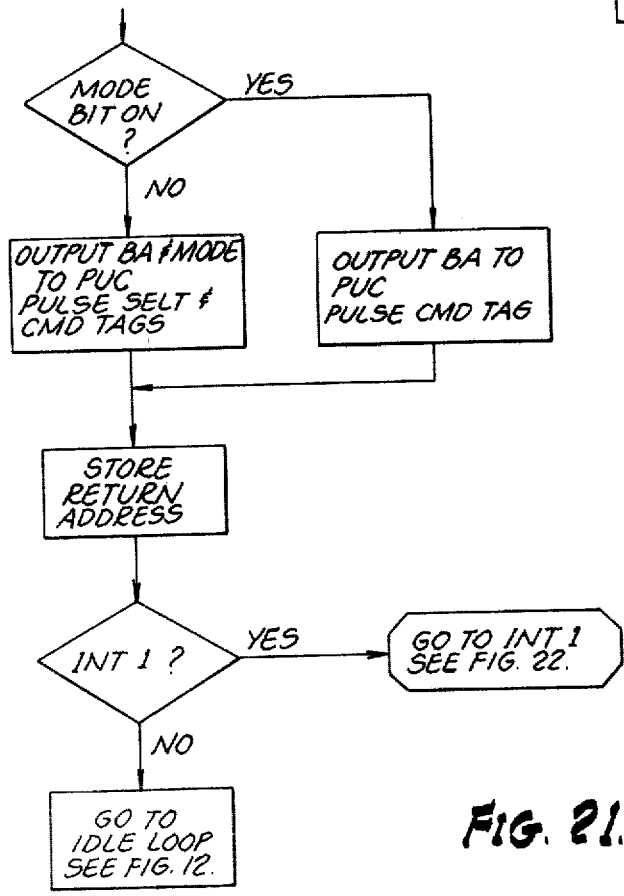
FIG. 18.
FIG. 20.
FIG. 21.

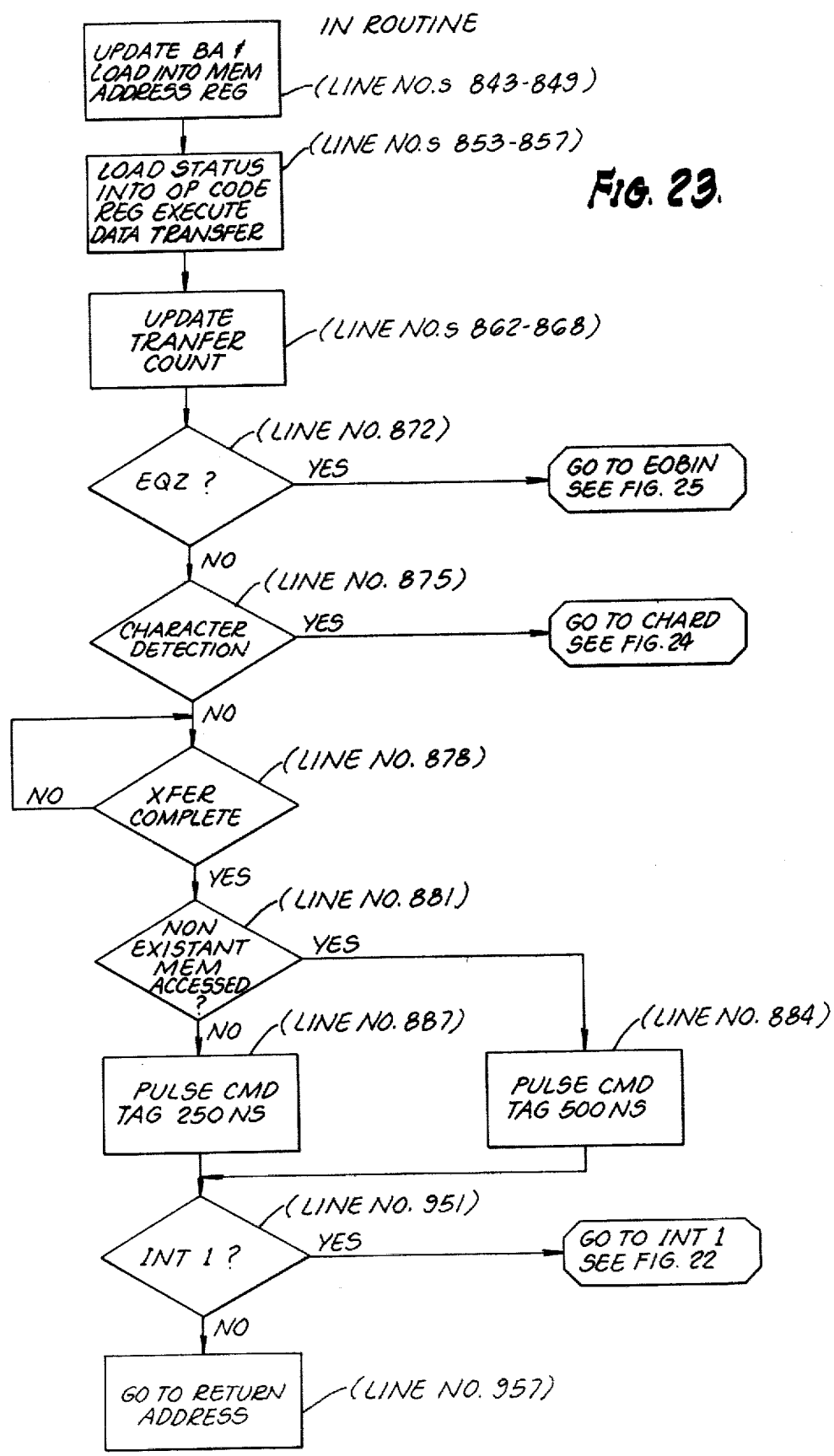

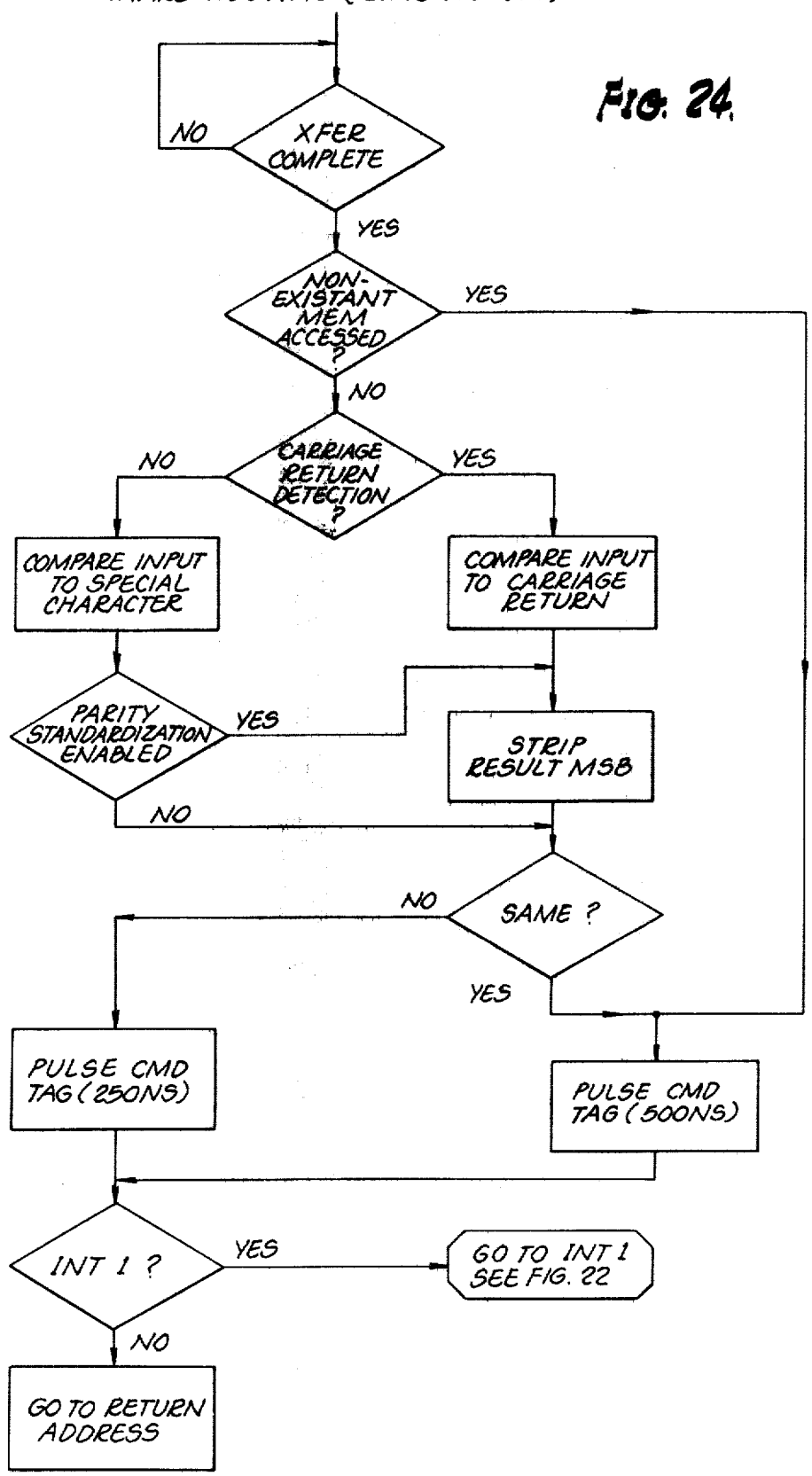

DISTRIBUTED INPUT/OUTPUT CONTROLLER SYSTEM

This is a continuation of application Ser. No. 715,174, filed Aug. 17, 1976, now abandoned.

CROSS REFERENCES TO RELATED APPLICATIONS

Patent application Ser. No. 644,341, now U.S. Pat. No. 4,124,888, filed on Dec. 24, 1975, in the name of JERRY R. WASHBURN for a PERIPHERAL-UNIT CONTROLLER APPARATUS, patent application Ser. No. 644,412, now U.S. Pat. No. 4,124,889, filed on Dec. 24, 1975, in the names of PHILIP A. KAUFMAN and JERRY R. WASHBURN, for a DISTRIBUTED INPUT/OUTPUT CONTROLLER SYSTEM, and patent application Ser. No. 647,762, now U.S. Pat. No. 4,100,601, filed on Jan. 9, 1976, in the names of PHILIP A. KAUFMAN and JERRY R. WASHBURN, for a DISTRIBUTED INPUT/OUTPUT CONTROLLER SYSTEM, disclose related subject matter.

TABLE OF CONTENTS

ABSTRACT OF THE DISCLOSURE
CROSS REFERENCES TO RELATED APPLICATIONS
BACKGROUND OF THE INVENTION
PRIOR ART
SUMMARY OF THE INVENTION
BRIEF DESCRIPTION OF THE FIGURES
GENERAL DESCRIPTION
  TABLE I
  TABLE II
  TABLE III
GENERAL DESCRIPTION OF THE DIRECT-MEMORY-ACCESS MULTIPLEXER DMA-MUX
  Input/Output Formats
  DMA Input/Output
  Integrated Input/Output
  Programmed Input/Output
  Interrupt Input/Output
  Auto Input/Output
GENERAL DESCRIPTION OF PERIPHERAL-UNIT CONTROLLER PUC
DETAILED DESCRIPTION OF DIRECT-MEMORY-ACCESS MULTIPLEXER DMA-MUX
  Data Transfer Subunit
  Arithmetic Logic Subunit
  Distributor Microengine Subunit
  Address-Decoder and Control-Logic Subunit
  Interrupt Logic Subunit
  Direct-Memory-Access Logic Subunit
SUMMARY OF DMA-DIOS
OPERATION
  The HOME Routines
  INT2 Routine
  CPUOUT Routine
  RESET Routine
  MODE Routine
  SETSPC Routine
  POUT Routine
  BRANCH Routine
  NODMA Routine
  NODMAL Routine
  INT1 Routine
  IN Routine
  CHARD Routine
  EOBIN Routine
  OUT Routine
  EOBOUT Routine
  DMANOT Routine
FIRMWARE PROGRAM
  TABLE IV
  TABLE V
  TABLE VI
  TABLE VII
  TABLE VIII
  TABLE IX
  TABLE X
SUMMARY
GENERAL REMARKS

BACKGROUND OF THE INVENTION

This invention relates generally to data processing systems and particularly to a system that employs controllers which provide means for interconnecting peripheral units, also commonly referred to as input/output devices, and a general-purpose digital computer. This invention relates particularly to an improved system of distributed peripheral-unit controllers, each of which is microprogrammed to control the transfer of data signals in conjunction with a specific peripheral unit. Specifically in this invention, each such controller is electrically interposed between a peripheral unit and a direct-memory-access multiplexer (DMA-MUX) which provides means for data transfer to and from a plurality of peripheral units and the main-memory unit of a digital computer.

PRIOR ART

Peripheral-unit controllers commonly constitute addressable control units to steer data signals and control signals to and from a selected peripheral unit. Such controllers transmit interrupt signals to the computer to indicate that a device has completed a data transfer sequence or is ready for the transfer of signals. Such controllers also provide for buffering of the information flowing between the peripheral device and the computer. They also provide for control signal decoding to permit selection of the proper command signal for control of a specific operation.

Generally, there are two types of controllers. There are controllers that employ the computer's central processor unit CPU for each transfer of data signals into or out of the computer's main-memory unit. This type of controller does not have direct access to the main-memory unit. There are also controllers that do not involve the computer's central processor unit CPU for each such transfer of data signals. The latter type of controller does have the capability to acquire direct access to the computer's main-memory unit, that is, with computers that are capable of granting such access.

The latter type of controller is generally known in the computer art as a direct-memory-access controller or DMA Input-Output controller. For purposes of distinguishing the DMA controller from controllers lacking the direct-memory-access capability in this description, the term IMA is used to refer to controllers, multiplexers, or other devices that do not have the direct access capability.

Prior to Applicants' invention of a distributed input/output system as disclosed, for example, in their aforementioned prior patent applications Ser. No. 647,762, filed Jan. 9, 1976, now U.S. Pat. No. 4,100,601, Ser. No.

644,341, filed Dec. 24, 1975, now U.S. Pat. No. 4,124,888, and Ser. No. 644,412, filed Dec. 24, 1975, now U.S. Pat. No. 4,124,889. (hereinafter referred to as Applicants' Prior Applications), such controllers, whether of the DMA or IMA type, had been physically integrated with the digital computer electronics and had been connected to the devices by lengthy cables lwhich had required special terminations to compensate for the reactive effects of such long cables. Such special terminations add substantially to the design and manufacturing costs of prior art computer input/output electronics.

Furthermore, some kinds of prior art input/output device controllers, whether the DMA or IMA type, had been typically configured to be dedicated to a particular device and could not thereafter be utilized for control of another type of device, and other kinds of controllers could be so utilized only after complex and costly reconfiguration.

Prior art device-controllers of the IMA type, that is, IMA controllers known prior to Applicants' invention thereof, are generally sources of inefficiency which substantially raise the overhead of computer operations. By way of example, such inefficiency results from a lack of capability in the device controller to control data transfers to or from a peripheral device without involving the central processor unit. The central processor unit of the computer must therefore be actively involved in every step of a process which involves the input/output device. The prior central processor unit must initiate and monitor the completion of each transfer of a data term between the computer and the input/output device, and it must also control or actually perform every intermediate step involving transfer of a non-data term between the computer and the input/output device. In this context, a term means any complete form of information regardless of the number of bits and any non-data term that is transferred from the computer to the device is referred to as a control signal and any non-data term that is transferred from the device to the computer, is referred to as a status signal.

One way of reducing the complexity and cost of the electronics associated with peripheral-device controllers, that are used to control numerous peripheral devices, whether of the DMA or IMA type, and that are used to combine all the common control functions in one controller and then share the controller on a time-multiplexed basis among the numerous devices. Such a combined controller is normally referred to as a multiplexer. Even where a multiplexer is used, some additional operations involving the peripheral devices, may still be allocated to dedicated input/output adapter units of simple configuration, each adapter unit being interposed between the input/output device and the multiplexer. However, even such multiplexer-adapter unit combinations of the prior art are extremely complex and costly, are usually limited to one type of peripheral device, and those having IMA-multiplexers still require almost constant activity in the central processor unit. Of such prior art combinations of a multiplexer and a plurality of peripheral device adapter units, none known to the Applicants provides substantially identical adapter units that utilize both software and firmware programming to control data communications between a plurality of peripheral devices and a digital computer or adapter units that accommodate a plurality of types of peripheral devices while employing a common multiplexer. Nor do Applicants know of any such prior art combinations that provide adapter units located at or near the peripheral devices to which they are connected.

In this invention, Applicants provide a distributed input/output system that includes all of the advantageous features of the system disclosed in Applicants' Prior Applications, but that also includes a multiplexer having direct-memory-access capability. Although DMA-multiplexers are already known in the computer art, there are no prior art DMA-multiplexers known to Applicants that provide the unique features and resultant advantages of the invention herein disclosed.

Nowhere in the prior art known to Applicants is there a distributed input/output system of the type disclosed in Applicants' Prior Applications which can also employ a multiplexer having direct-memory-access capabilities to even further reduce the overhead of the central processor unit. Nowhere in the prior art known to Applicants is there a Direct-Memory-Access-Distributed Input/Output System that is capable of data transfer operations in a plurality of modes, including a direct-memory-access mode and other less sophisticated modes. Nor is there such a system in the prior art known to Applicants, that permits input/output data transfer by means of a direct-memory-access multiplexer that is compatible with device controllers that may be also used with indirect-memory-access multiplexers. There are no known prior art DMA-multiplexers that are compatible with software for data transfer systems employing IMA-multiplexers. Furthermore, there are no prior art systems known to Applicants in which some distributed input/output controllers are employed in conjunction with an indirect-memory-access multiplexer, and in which some are employed in conjunction with a direct-memory-access multiplexer.

Accordingly, none of the prior art systems provide the flexibility, high speed capability, and cost effectiveness of the invention disclosed herein.

SUMMARY OF THE INVENTION

This invention, as an improvement over Applicants' invention disclosed in Applicants' Prior Applications, also employs a plurality of simple, substantially identical, microcoded peripheral-unit controllers, each connected to a multiplexer and each located near or adjacent the peripheral device to which it is connected. In this invention also, special terminal requirements are obviated since cables having lengths of two feet or less may be employed to interconnect each controller and the adjacent peripheral device adjacent to which it is allocated. Short cables avoid capacitive, or inductive, effects sufficiently severe to require compensation by different special terminations for each device.

This invention also provides controller flexibility by means of microcoded read-only-memory units. Furthermore, as in the invention disclosed in Applicants' Prior Applications, in this invention too, high costs and complexity of prior art input/output control systems are substantially reduced or eliminated by means or peripheral-unit controllers, each of which employs a substantially identical microengine unit which utilizes a microprogrammed subunit and inexpensive, commercially available, integrated-circuit devices. In this invention too, each controller is connected to an input/output device and the transfer of data signals, control signals, and status signals between the device and a computer unit is accomplished in accordance with sequences of instructions stored in the microprogrammed subunit.

All of the previously discussed deficiencies of prior art input/output control systems that employ a combination of a multiplexer and a plurality of adapter or control units, are remedied by means of this invention as they are remedied by means of the invention disclosed in Applicants' Prior Applications. However, unlike the invention disclosed in Applicants' Prior Applications, this invention comprises a multiplexer that is provided with the capability for direct access to the main-memory unit of a general purpose digital computer, thus making the improved multiplexer of this invention also useful for data transfer with input/output devices having higher data rates and with a plurality of input/output devices, the combined data bandwidth of which exceeds the capability of an indirect-memory-access multiplexer.

Thus, unlike the prior art known to Applicants, the invention described below provides numerous advantages of a synergistic combination of a plurality of distributed peripheral-unit controllers and a direct-memory-access multiplexer and numerous additional advantages of a synergistic combination of distributed input/output systems of the IMA type and distributed input/output systems of the DMA type.

Accordingly, one object of this invention is to overcome, or to materially reduce, the foregoing and other disadvantages of the prior art.

Another object of this invention is to provide a peripheral-device distribution and control system comprising a plurality of simple and low cost distributed controllers and a common direct-memory-access multiplexer for channeling data signals, status signals, and control signals between the peripheral device and the computer with greater throughput and lower central processor unit overhead than prior distributed controller systems.

Another object of this invention is to provide a peripheral-unit interface system for connecting a plurality of peripheral devices to a computer, the peripheral-unit interface system having a plurality of peripheral-unit controllers and a plurality of multiplexers, wherein at least one of the plurality of multiplexers is of a direct-memory-access type and at least one is of an indirect-memory-access type.

Another object of this invention is to provide a distributed input/output system having a direct-memory-access muliplexer and a plurality of controller units located at or near a corresponding plurality of peripheral units, wherein data signals, status signals, clock signals, control signals, and power, are transferred between the multiplexer and each of the controller units, utilizing a simple and low cost circuit configuration.

It is another object of this invention to provide a cost effective distributed input/output system that may be used with more than one of a plurality of types of peripheral devices, such as a teletypewriter unit, a card reader, a cathode-ray-tube terminal unit, a line printer, a paper-tape punch, a paper-tape reader, magnetic tape devices, and numerous special devices, some of the controllers requiring no circuit reconfiguration for use with more than one type of device.

Still another object of this invention is to provide an improved distributed input/output system in which there are peripheral-device controllers allocated to the control of signal transfer between a general purpose digital computer and peripheral devices and which permits a higher degree of system optimization by selection of either a direct-memory-access multiplexer or an indirect-memory-access multiplexer, or combinations of both, depending on the data bandwidth desired and system capability desired.

These and other objects, features, and advantages of the invention will be readily apparent from the consideration of the following detailed description of the annexed drawings in which:

BRIEF DESCRIPTION OF THE FIGURES

FIG. 5 is a simplified block diagram of a general-purpose-peripheral-unit controller that may be used with this invention;

FIG. 7 is a diagram indicating the manner in which FIGS. 7A, 7B, and 7C are to be combined;

FIGS. 7A, 7B, 7C, and 7D together comprise a detailed block diagram of the direct-memory-access multiplexer unit;

FIGS. 8A and 8B are to be combined;

FIGS. 8A and 8B together comprise a detailed block diagram of the arithmetic logic subunit of this invention;

FIGS. 9A and 9B together comprise a detailed block diagram of the distributor microengine subunit of this invention;

FIGS. 12-28 are flow chart diagrams illustrating the sequence of operations of one embodiment of the invention.

GENERAL DESCRIPTION

Figure 1:
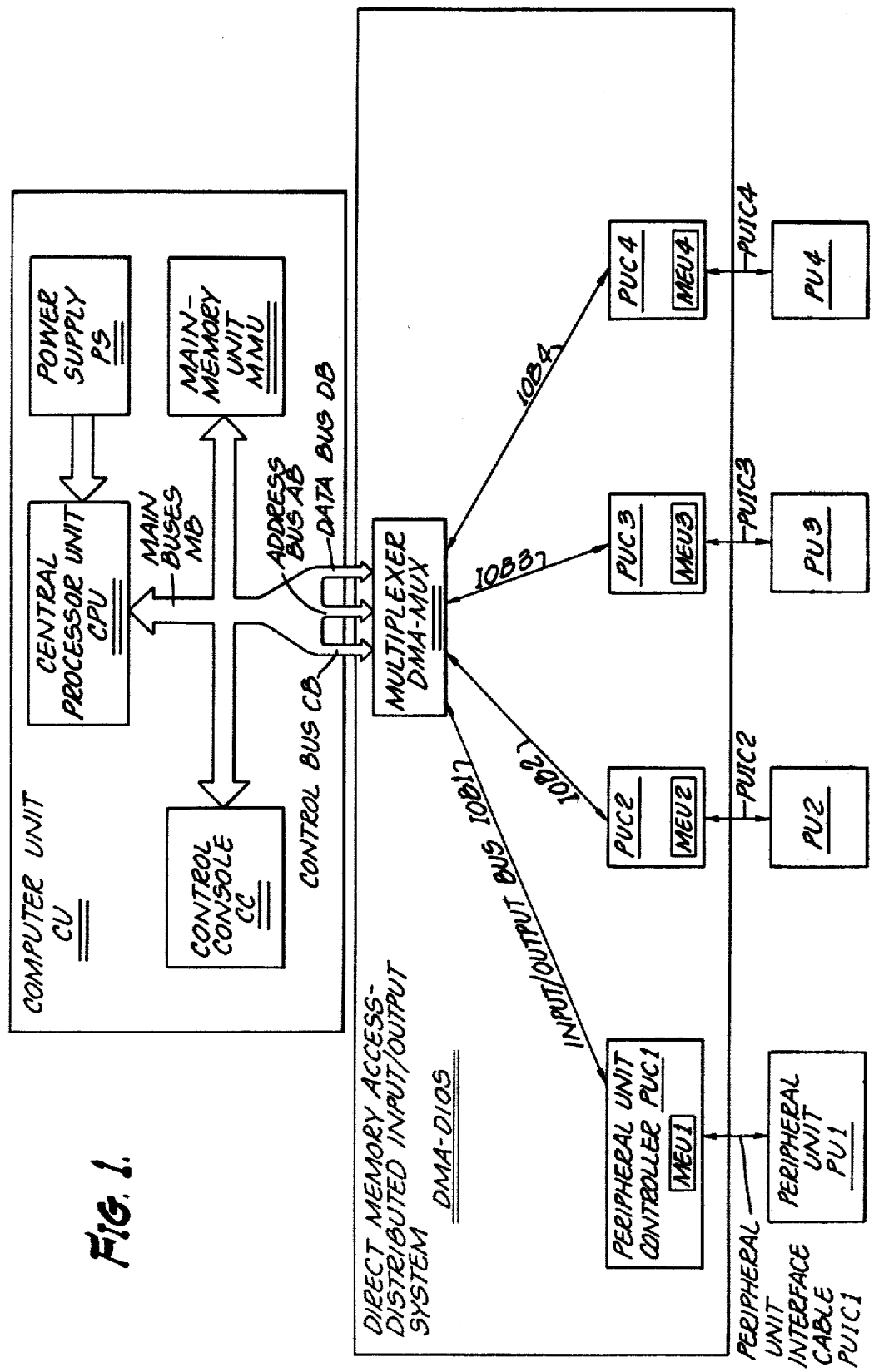
FIG. 1 is a general block diagram of the invention which is shown connected to a computer unit and to a plurality of peripheral units.

Referring now to the drawings, FIG. 1 illustrates in simplified block diagram form, the interconnection of a computer unit CU and a plurality of peripheral units PU1, ..., PU4, by means of an improved distributed input/output system DMA-DIOS in accordance with this invention.

The computer unit CU is a general purpose binary digital computer having a central processor unit CPU, a main-memory unit MMU, a power supply PS, and a control console CC, all of which are interconnected by means of a series of buses. For purposes of explanation only, the computer unit described herein in conjunction with the invention, is assumed to have main buses MB comprising a control bus CB for the transfer of control signals, an address bus AB for the transfer of address signals, and a data bus DB for the transfer of data signals.

It will be observed that the terms "data" and "data signals" are both used throughout this description. These terms are intended to be interchangeable and to define manifestations of information that are capable of physical manipulation, such as being stored in binary form in the memory cells of a computer memory unit. The term "microengine" is used throughout the description to mean a firmware programmed device including means to perform sequences of control operations. The term "microengine" refers to such a device which may also include means for making decisions dependent upon the truth values of signals.

In this application, the term "input-data" refers to data that is being transferred from a peripheral device into or toward the computer unit, and the term "output-data" refers to data that is being transferred out of the computer unit and into a peripheral device.

As is well known in the computer arts, except in short transition intervals, binary signals are either in a TRUE state or in a FALSE state. Such states typically correspond to two levels of voltage, such as +5 volts and 0 volts, respectively. In this context, it may be said that binary signals are always present on a given line since a signal is in a TRUE state when the voltage is positive and the absence of a positive voltage on the line corresponds to the presence of a signal in a FALSE state. However, it is still common in the computer arts to describe the "transfer" of a binary signal from one device to another. In the description of this invention, signals are sometimes described as being transferred and are sometimes described as being set to a particular state or truth value. It is to be understood that in either manner of describing the signal, the voltage level on a line is being set to one of two possible binary levels and remains set at that level for a selected period of time or until reset after the occurrence of some subsequent condition.

In addition to the peripheral units to which a computer unit may be connected by means of the distributed input/ouput system DIOS dislosed in Applicants' Prior Applications, namely, those which the computer industry generally regards as being low and medium speed peripheral devices in this invention, high speed peripheral units, that is, units requiring a data rate, or bandwidth, of at least 60 kilobytes per second, may also be so connected by means of the improved distributed input-/output system of this invention.

Some peripheral devices are simplex-mode devices in which data flows in only one direction. The paper-tape reader, for example, is a simplex-mode device utilizing only input-data transfer. Similarly, the paper-tape punch is a simplex-mode device that utilizes only output-data transfer.

Other peripheral devices to which a computer may be connected are duplex-mode devices, namely, devices which utilize both input-data and output-data transfers. Duplex-mode devices in which data may be transferred in both directions (also called "bidirectional" in this description), but not simultaneously, are known as half-duplex-mode devices. Duplex-mode devices in which data may be transferred in both directions simultaneously are known as full-duplex-mode devices.

Peripheral devices may be either of parallel type or serial type devices. Those devices which are of parallel type, utilize simultaneous data transfer over a plurality of data transfer lines. By way of example, in the embodiment of the invention disclosed herein, data is transferred in the form of bits, that is, binary digit signals, and for parallel type devices, data is transferred eight bits at a time over eight separate lines. One bit is transferred over each line substantially simultaneously with the transfer of a bit on each of the remaining lines. On the other hand, serial type devices, which are interconnected to the computer unit by the embodiment of the invention disclosed herein, employ data transfer over only one line wherein a plurality of bits, such as eight bits, are transferred serially, that is, in a sequence.

Teletypewriter units, cathode-ray-tube terminal units and modems, are examples of devices that are of the serial type. Card readers, line printers, paper-tape punches, and paper-tape readers are examples of devices that are of the parallel type.

As indicated in FIG. 1, the distributed input/output system DMA-DIOS is electrically interposed between the computer unit CU and a plurality of peripheral-unit controllers PUCs. The distributed input/output system DMA-DIOS of this invention comprises a direct-memory-access multiplexer DMA-MUX which interfaces directly with the main buses MB of the computer unit CU; a plurality of peripheral-unit controllers PUC1, . . ., PUC4; input/output cables IOBs interconnecting the peripheral-unit controllers PUCs with the multiplexer MUX; and cables interconnecting peripheral-unit controllers PUCs and respective peripheral devices.

In referring to a plurality of the same parts of this invention, an "s" is added to the acronym to indicate more than one such part. For example, a plurality of peripheral-unit controllers is referred to as PUCs.

The cables interconnecting the multiplexer MUX and the peripheral-unit controllers PUCs, are referred to herein as input/output buses IOB1, . . ., IOB4. The cables interconnecting the peripheral-unit controllers PUCs and the peripheral units, are referred to herein as peripheral-unit interface cables PUIC1, . . ., PUIC4.

In one embodiment of this invention, the direct-memory-access multiplexer DMA-MUX is located in a computer unit chassis and is incorporated on a single printed-circuit-board on which are mounted up to eight electrical plugs, each having 16 terminals, two plugs being allocated to each of the four peripheral-unit controllers PUCs to which the DMA-multiplexer may be connected. The DMA-multiplexer DMA-MUX is also connected to the main buses MB of the computer unit CU, by means of a series of edge terminals which form an integral portion of the printed-circuit-board, at the time that the DMA-multiplexer printed-circuit-board is installed in the computer unit CU. The DMA-multiplexer printed-circuit-board is similar to the printed-circuit-board illustrated in FIG. 2 of Applicants' Prior Applications.

The input/output buses IOBs are each sufficiently long, e.g., about 10 feet long, to permit the positioning of the peripheral-unit controllers PUCs in substantial juxtaposition with their respective peripheral units PUs.

The computer unit CU may be any one of a large number of commercially available general purpose digital computers that include direct-memory-access capabilities. General purpose computers that are suitable for use in conjunction with this invention include the Model ALPHA LSI general purpose digital computers manufactured and sold by Computer Automation, Inc., Irvine, Calif. A publication of that company entitled "Naked Mini LSI Series Computer Handbook, 1974" describes the ALPHA LSI general purpose digital computers in considerable detail and is expressly incorporated herein by reference. The interrelationship between the control console CC, the central-processor unit CPU, the power supply PS and the main-memory unit MMU of a computer unit CU, will not be described herein. However, since the bus nomenclature may vary from computer to computer, the functions of the address bus AB, data bus DB, and control bus CB in relation to the invention, are defined herein.

During input/output operations, the address bus AB is used by the central processor unit CPU to convey device-address and function-code information to peripheral devices. In this respect, as will be explained below, the address bus AB is utilized in this invention to select a particular multiplexer which may be either a direct-memory-access multiplexer DMA-MUX, or an indirect-memory-access multiplexer IMA-MUX, and a particular peripheral-unit controller PUC for signal transfer. In the embodiment of the invention disclosed herein, up to eight DMA-multiplexers may be connected to the computer unit, and each direct-memory-access multiplexer DMA-MUX may be connected to as many as four peripheral-unit controllers PUCs. The address bus AB is also used to transfer a single-bit function code, the truth value of which determines whether the signals being transferred on the data bus DB are to be treated as data signals or as control signals. The address bus AB is also used in this invention to transfer address signals from the multiplexer DMA-MUX directly to the main-memory unit MMU to either read out from or write into the addressed memory cells.

The data bus DB consists of 16 bidirectional lines upon which data signals, read from locations within the main-memory unit MMU, are transferred to a peripheral unit PU, and upon which data signals are transferred from a peripheral unit PU and written, or loaded, into selected addressable locations in the main-memory unit MMU. Unlike indirect memory access distributed I/O systems IMA-DIOS, disclosed in Applicants' prior applications which transfer of data signals either into or out of the main-memory unit is performed under the control of the central processor unit CPU, the DMA-distributed I/O system DMA-DIOS of this invention obviates central processor unit control of data transfer into and out of the main-memory unit. The data bus DB is also used to transfer a number of control signals between the computer unit CU and the peripheral-unit controllers PUCs and to transfer to each peripheral unit controller PUC the original or starting address or count of a selected sequence of peripheral unit PU operations that are controlled by the peripheral-unit controller PUC to which the peripheral unit PU is connected.

Data bus lines and address bus lines are also utilized to transfer vectored interrupt signals from the multiplexer MUX to the computer unit CU.

In this application, vectored signals are defined as signals that contain information designating an address within the main-memory unit MMU. A group of binary signals together comprise a coded word, the contents of which depend upon the respective truth values of the individual binary signals. When the binary signals comprising a particular coded word are used to designate an addressed location in the main-memory unit, the address of which corresponds to the code of that word, it is said that those signals are being "vectored" into the main-memory unit.

The control bus CB consists of twenty-seven unidirectional lines upon some of which, signals are transferred between the computer unit CU and the direct-memory-access multiplexer DMA-MUX for the control of operations during data transfers and interrupt-signal operations.

Interrupt signals indicate that a peripheral device is ready for servicing or has completed an operation.

The purpose of signals relevant to the invention and applied to the respective lines of the main buses, are described in greater detail below in conjunction with Tables I, II, and III.

TABLE I

| | Control Bus |
|---|---|
| IND | Data-In Signal is a signal that is generated by the Central Processor Unit CPU in accordance with programmed instructions for indicating that the current instruction is an input instruction and that the addressed peripheral-unit controller will place input data on the data bus. |
| OUTD | Data-Out Signal is a signal that is generated by the Central Processor Unit CPU in accordance with programmed instructions for indicating that the current instruction is an output instruction and that the computer unit has placed output data on the data bus DB for the addressed peripheral-unit controller to accept. |
| PLSE | Pulse Signal is a signal that is generated by the Central Processor Unit CPU and is used to reset Interrupt circuits in the multiplexer DMA-MUX upon recognition by the computer unit CU of an interrupt signal. This signal is also used to strobe signals into buffer registers in the multiplexer DMA-MUX. |
| RST | Reset Signal is a signal that is generated by the Central Processor Unit CPU or Control Console CC and is used to reset all controls in all input/output devices, the multiplexers, and controllers, to a known starting configuration. |
| IUR | Interrupt Request Signal is a multiplexed signal that multiple peripheral devices generate to request interrupt service. All devices which use the line on which this signal is transferred to the computer unit, are forced to compete with each other for recognition by the Central Processor Unit CPU. If two or more devices request interrupt service at the same time, recognition is given to the highest priority device by means of a priority chain. |
| IOCL | I/O Clock Signal is a signal generated by the Central Processor Unit CPU that is used by the direct-memory-access multiplexer DMA-MUX to synchronize end-of-block interrupt requests into the computer unit CU. When an interrupt signal is recognized by the Central Processor Unit, IOCL signals are inhibited to prevent the generation of additional interrupt requests. |

TABLE I-continued

Control Bus

| | |
|---|---|
| | The I/O Clock Signal IOCL remains inhibited until execution of the interrupt instruction is completed. |
| PRIN and PROT | Priority-In Signal and Priority-Out Signal are transferred on an interrupt signal priority chain which is strung serially through all distributed input/output systems, as well as through controllers of peripheral devices that are connected directly to the computer unit. PRIN is the name given to the signal in the priority chain where it enters a multiplexer. If logically TRUE, it allows the multiplexer to vector interrupt signals into the computer unit. Each multiplexer generates a Priority-Out Signal PROT to indicate whether it or other devices with higher priority are generating an interrupt signal. The Priority-Out signal PROT from each multiplexer is the Priority-In signal PRIN for the next lower priority multiplexer. |
| IAR | Interrupt Address Request Signal is a signal generated by the Central Processor Unit and is used to request a vectored interrupt address from the multiplexer MUX in response to an interrupt request signal. |
| MDIS | Memory Disable Signal is a processor generated signal which is active during power up and power down sequences to assure no spurious memory cycles will occur during power transitions. |
| DPIN and DPOT | DMA Priority IN and DMA Priority Out Signals DPIN and DPOT form a DMA priority chain which is strung serially through all DMA-multiplexers and memory modules. DPIN is the name given to the priority chain where it enters a DMA-MUX. If low, it allows the multiplexer DMA-MUX to access the main-memory unit. Each DMA-multiplexer DMA-MUX generates a DPOT signal to indicate that neither it nor other upstream DMA-multiplexers are requesting access to or communicating with the main-memory unit. The DPOT signal from each DMA-MUX is the DPIN signal for the next downstream DMA-MUX. |
| STOP | Stop Processor. This is a DMA-MUX generated signal which stops the Processor upon completion of its current machine cycle to permit the DMA-multipflexer to gain control of the main buses. STOP may be generated at any time and may remain active for any length of time. |
| SACK | Stop Acknowledge. Processor generated signal which informs the multiplexer DMA-MUX that the Processor has relinquished control of the main buses to the DMA-MUX. SACK will remain TRUE until the stop processor signal STOP is removed. |
| PFD | Power Failure Detected. Power supply generated signal which, when active, forces any direct-memory-access operations to terminate in order to permit the Central Processor Unit to shut down the system in an orderly manner. |
| SLB | Select Least Significant Byte. DMA-MUX generated signal which is used for Byte Mode memory accesses. When SLB is low, the least significant byte (bits 0 through 7) of the addressed memory-unit word is accessed. When SLB is high, the most significant byte (bits 8 through 15) of the addressed memory-unit word is accessed. |
| MST | Memory Start. DMA-MUX generated signal which is used to initiate a memory-unit access cycle. |
| RD | Read Mode. DMA-MUX generated signal which, when low, indicates the current memory cycle is a Read access cycle. When high, RD indicates that the current memory cycle is a Write access cycle. |
| MACK | Memory Acknowledge. Memory-unit generated signal that is used to inform the DMA-MUX that data is available on the data bus DB during a Read operation, or that data has been accepted during a Write operation. |

TABLE II

Data Bus

| LINE | FUNCTION |
|---|---|
| DB 00 | Data, Status, Mode, Special Character |
| DB 01 | Data, Status, Mode, Special Character |
| DB 02 | Data, Interrupt Vector, Status, Mode, Special Character |
| DB 03 | Data, Interrupt Vector, Status, Mode, Special Character |
| DB 04 | Data, Interrupt Vector, Status, Branch Address, Mode, Special Character |
| DB 05 | Data, Interrupt Vector, Status, Branch Address, Mode, Special Character |
| DB 06 | Data, Interrupt Vector, Status, Branch Address, Mode, Special Character |
| DB 07 | Data, Interrupt Vector, Status, Branch Address, Mode, Special Character |
| DB 08 | Interrupt Vector, Reset |
| DB 09 | Command |
| DB 10 | Select |
| DB 11 | Charact. Det. Enable |
| DB 12 | Parity Bit Std. |
| DB 13 | Select Special Charact. or Carriage Return |
| DB 14 | Spare |
| DB 15 | DMA or IMA Set Special Charact. |

Table II indicates the function of each of the data bus lines DB00, ..., DB15. As indicated in Table II, many of the data bus lines are utilized for a plurality of functions. Of course, it will be understood that each line may perform only one function at a time. Thus, by way of example, where DB00 is indicated in Table II to function to transfer data signals, status signals, and mode signals, it will be understood that DB00 may at one time be used to transfer a data signal in either direction between the main-memory unit MMU and the direct-memory-access multiplexer DMA-MUX, and it may also be used at another time to transfer a status signal from the multiplexer DMA-MUX to the computer unit CU and it may also be used, at still another time, to transfer a mode signal from the computer unit CU to the multiplexer DMA-MUX.

As indicated in Table II, eight data signals are transferred over data bus lines DB00 through DB07; up to eight status signals are transferred over data bus lines DB00 through DB07; up to eight mode signals are transferred over data bus lines DB00 through DB07; seven interrupt address signals may be transferred over data bus lines DB02 through DB08 (although the remaining data bus lines are treated by the computer unit as having all ZERO signals on them); four external branch address signals are transferred over data bus lines DB04 through DB07; and the reset signal, command signal, and select signal are transferred over data bus lines DB08, DB09, and DB10, respectively.

Data bus lines DB00 to DB07 are used to transfer a special character against which incoming signals from peripheral units may be compared. The signal on line DB11 enables the comparison in the multiplexer DMA-MUX. If it is TRUE, the multiplexer may compare each byte of input data signals with the special character or with a standard ASCII carriage return character :OD, depending on the truth state of the signal on line DB13.

As also indicated in Table II, data bus line DB15 is used in this invention in the embodiment herein disclosed to indicate whether data transfer will employ a direct-memory-access mode in which the central processor unit CPU is not involved or an indirect-memory-access mode in which the central processor unit CPU is involved in each data transfer operation.

The underlined functions in Table II represent the signals on the data bus which in combination form the command word. Bits 0 through 7 of the command word represent mode bits and branch address bits depending upon the truth state of the select signals on DB10 and the command signal on DB09. If the select signal is TRUE, bits 0 through 7 represent mode bits to set up a particular mode in a peripheral-unit controller. If, on the other hand, the command signal is True, bits 0 through 7 represent branch bits which are used to start the controller microengine unit MEU in the peripheral-unit controller at a selected firmware address.

Bit 8 of the command word on line DB08 is the reset signal RESET. Bits 9 and 10 are the command and mode select bits previously referred to.

The character detection enable bit on data bus line DB11, when TRUE, indicates that each byte of input data signals is to be compared with either a stored special character or a standard carriage return ASCII code character. The parity bit standardization signal on the data bus line DB12, if TRUE during a command word transfer, enables the DMA-multiplexer to drive the most significant bit of all input characters to either a TRUE or FALSE state, depending upon which one of the two states is selected by a jumper plug in the parity bit standardization circuitry.

The signal select special character or carriage return on data bus line DB13 is operative only if the character detection enable bit on DB11 is TRUE, and indicates whether the comparison of the input character is to be made with the special character stored in a multiplexer file storage unit or is to be compared with a standard carriage return code.

The DMA or IMA bit on data bus line DB15 indicates whether the peripheral-unit controller channel being addressed by the command word is to operate under DMA operation or IMA operation.

As shown in Table II, data bits 0 through 7 on data bus lines DB00 through DB07, also are used to transfer special character bits. If the command bit is FALSE and the reset bit is FALSE and the select bit is FALSE and the set special character bit on data bus line DB15 is TRUE, the special character signals on data bus line DB00 through DB07 are stored in the multiplexer's file storage unit as the special character against which incoming data signals will be compared when such comparison operations are enabled as previously discussed.

It will be understood that the allocation of functions among the data bus lines DB00 through DB15, may be made in many alternative ways to accommodate word formats of many other general purpose digital computers.

TABLE III

| | Address Bus |
|---|---|
| LINE | FUNCTION |
| AB 00 | Function Code (i.e., Data or Command or Status), Memory Address |
| AB 01 | PUC Address, Memory Address |
| AB 02 | PUC Address, Memory Address |
| AB 03 | DMA-MUX Address, Memory Address |
| AB 04 | DMA-MUX Address, Memory Address |
| AB 05 | DMA-MUX Address, Memory Address |
| AB 06 | DMA-MUX Address, Memory Address |
| AB 07 | DMA-MUX Address, Memory Address |
| AB 08 | Memory Address |
| AB 09 | Memory Address |
| AB 10 | Memory Address |
| AB 11 | Memory Address |
| AB 12 | Memory Address, Interrupt Enable |
| AB 13 | Memory Address |
| AB 14 | Memory Address |
| AB 15 | Word/Byte Memory Operation Select |

Line AB00 is used to transfer a function signal or function code to the DMA-multiplexer from the computer unit CU. The function signal indicates whether the transferred term is to be a data term or a non-data term. Lines of the address bus AB01 through AB02 are used to transfer to the DMA-multiplexer MUX, a 2-bit peripheral-unit controller address corresponding to a selected one of the four peripheral-unit controllers that may be connected to the multiplexer DMA-MUX. Address bus lines AB03 through AB07 are used to transfer a 5-bit multiplexer address representing a selected DMA-multiplexer of a plurality of multiplexers that may be connected to the computer unit. Address bus line AB12 is used to transfer an interrupt enable signal INTE from the computer unit CU to the multiplexer DMA-MUX to enable the interrupt signal circuitry in the DMA-multiplexer. Unless the interrupt circuitry of a multiplexer DMA-MUX is enabled, interrupt signals generated by peripheral-unit controllers will not be transferred from the multiplexer DMA-MUX to the computer unit CU. Address bus line AB15 is used in the embodiment of the invention herein disclosed to indicate whether data transfer to or from the main-memory unit will be in a word mode or in a byte mode. Lines AB00 through AB14 are also used to transfer memory address signals to the main-memory unit MMU.

Figure 7:
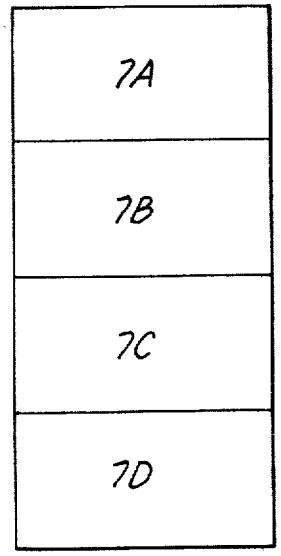
Figure 8:
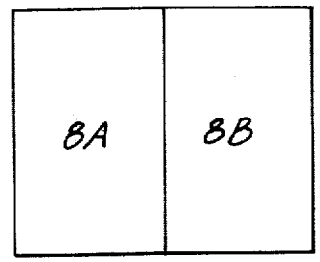
FIG. 8 is a diagram indicating how

As indicated in FIG. 1, each peripheral-unit controller PUC includes a controller microengine unit MEU. The microengine unit MEU is the programmable portion of the controller and contains processing circuits used to generate a sequence of control signals to manage the transfer of data between a peripheral device and the computer unit. A more sophisticated distributor microengine subunit provides sequence control signals in the multiplexer DMA-MUX. A detailed description of the distributor microengine subunit DMS of the multiplexer DMA-MUX is provided below in conjunction with FIGS. 7B, 9A, and 9B.

Each combination of an input/output bus IOB, a peripheral-unit controller PUC, and a peripheral-unit interface cable PUIC, is sometimes regarded as a single cable having a firmware programmed controller located therein.

In the embodiment illustrated in FIG. 1, the cables are up to about ten feet in length. The multiplexer DMA-MUX is in the form of a printed-circuit board which is approximately sixteen inches long and seven inches wide, and the peripheral-unit controllers PUCs are each in the form of a printed-circuit board housed in a plastic box having approximate dimensions of three inches by eight inches by one inch.

Figure 2:
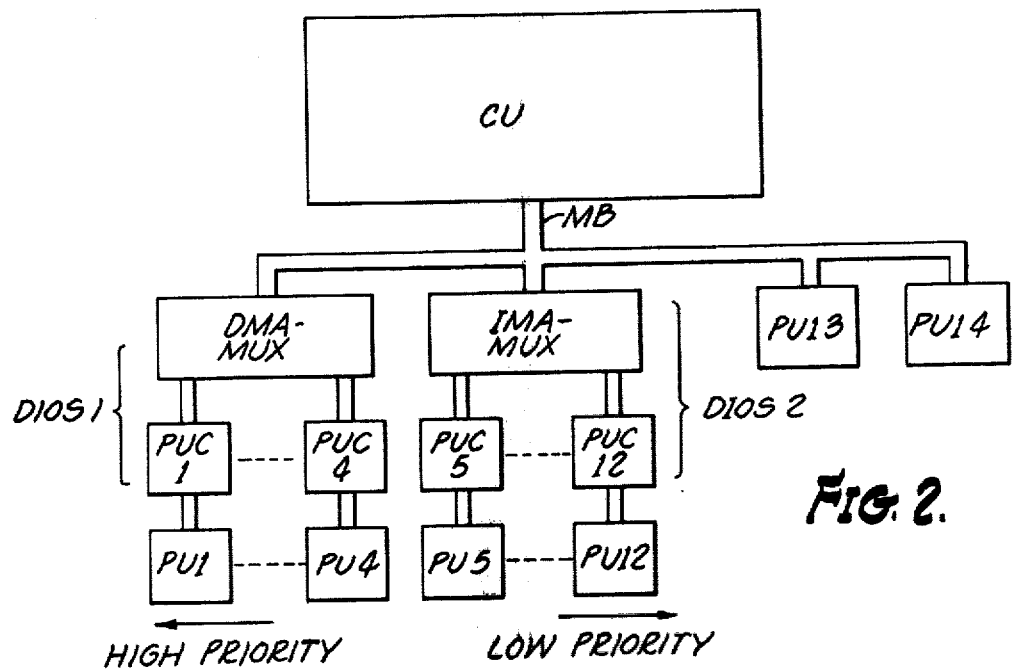
FIG. 2 is a general block diagram of a system in which a direct-memory-access multiplexer of this invention is shown connected to a computer to which is also connected a distributed input/output system that employs an indirect-memory-access-multiplexer as disclosed in Applicants' Prior Applications as well as peripheral units that are connected directly to the computer unit.

Referring now to FIG. 2, there is shown a computer unit CU connected to fourteen peripheral units, twelve of which are connected to the computer unit by means of two distributed input/output systems, one of which is a direct-memory-access system, namely, DIOS1 and one of which is an indirect-memory-access system, namely, DIOS2. Peripheral units PU1 through PU4 are connected to the computer unit CU by means of distributed input/output system DIOS1 which includes a first multiplexer, namely, DMA-multiplexer DMA-MUX, and peripheral unit controllers PUC1 through PUC4.

Peripheral units PU5 through PU12 are connected to the computer unit by means of distributed input/output system DIOS2 which includes a second multiplexer, namely, IMA-multiplexer IMA-MUX, and peripheral-unit controllers PUIC5 through PUIC12. The two multiplexers DMA-MUX and IMA-MUX are connected to the computer unit CU by means of main buses MB. As indicated in FIG. 2, two additional peripheral units, namely, PU13 and PU14, are connected directly to the computer unit CU and do not employ a distributed input/output system. It is assumed for discussion purposes, that by virtue of their physical order of connection to the computer unit, peripheral unit PU14 has lower interrupt signal priority than peripheral unit PU13 and peripheral unit PU13, in turn, has lower interrupt signal priority than the second multiplexer IMA-MUX which, in turn, has lower interrupt signal priority than the first multiplexer DMA-MUX. Furthermore, it will be assumed that by virtue of their respective order of physical connection to their multiplexers, peripheral units with lower numbers have greater interrupt signal priority than peripheral units with higher numbers. Therefore, of the peripheral units connected to the second multiplexer IMA-MUX, peripheral unit PU12 has the lowest priority, and peripheral unit PU5 has the highest priority, and of the peripheral units connected to the multiplexer DMA-MUX, peripheral unit PU4 has the lowest priority, and PU1 the highest priority.

The above described interrupt priorities are achieved in the following manner: The priority-in signal PRIN for the first multiplexer DMA-MUX is transferred from the computer unit CU directly to the multiplexer DMA-MUX over the control bus CB. The priority-out signal PROT is developed in the multiplexer DMA-MUX and transferred to the second multiplexer IMA-MUX where it becomes the PRIN signal for that multiplexer. Multiplexer IMA-MUX generates a PROT signal which then becomes the PRIN signal for peripheral unit PU13, and so on for peripheral units PU13 and PU14.

In the configuration of FIG. 2, only the first multiplexer DMA-MUX is capable of data transfer in a direct-memory-access mode. Multiplexer IMA-MUX and peripheral units PU13 and PU14 can communicate with the main-memory unit MMU only indirectly with the intervention by and the interruption of the central processor unit CPU. Accordingly, there is no competition for direct-memory-access priority in the configuration of FIG. 2. However, if multiplexer IMA-MUX was instead another DMA-multiplexer, then direct-memory-access priority signals DPIN and DPOT would be employed to establish DMA priority in much the same way interrupt priority signals PRIN and PROT establish interrupt signal and priority.

It will be seen below that there are two types of interrupt signals. A data-service interrupt signal I1 is generated by a peripheral-unit controller PUC when the peripheral unit to which it is connected is ready for a data transfer operation. An end-of-block interrupt signal I2 is generated by a peripheral-unit controller PUC either when a data transfer operation has been completed or when a terminating condition of some other kind has occurred.

In indirect-memory-access multiplexers, both types of interrupt signals are converted to vectored interrupt address signals which are transferred to the computer unit CU to provide access to the addressed location of the main-memory unit MMU. Previously stored words, known in combination as an Auto I/O Block, are located at such addressed locations. The function of Auto I/O Blocks will be described in more detail below, however, it is to be noted at this point that Auto I/O Blocks contain the information that is required to control data transfer operations between the computer unit CU and the input/output devices to which it is connected.

In the embodiment of the invention disclosed herein, a full word contains sixteen bits or two 8-bit bytes. In some computer systems, the locations of data signals stored in a memory unit are identified by a word number or byte number. For example, a particular block of data stored in a memory unit may contain ten bytes. The first byte in the block would have a count of 9, and the last would have a count of 0. If this particular block of data is transferred to a peripheral unit PU, the central processor unit CPU of the computer unit CU, may keep an accounting of the progress of the data transfer by checking the transfer count. If the transfer count has reached 0, the last byte of data in the particular block will have been transferred and the data transfer will be complete. A block of data is defined herein as a plurality of data bytes comprising all the data to be transferred to or from a particular peripheral unit at a particular time. In the DMA-multiplexer of this invention, the transfer count is updated and monitored in the multiplexer and not by the central processur unit CPU.

In direct-memory-access multiplexers, end-of-block interrupt signals are also converted to vectored interrupt address signals to be transferred to the computer unit CU over the data bus DB. However, data-service interrupt signals initiate a routine within the multiplexer resulting in the transfer of a buffer address directly to the main-memory unit MMU over the address bus AB. The difference resides in the fact that in the DMA-multiplexer, the Auto I/O Blocks are stored in a file storage unit within the multiplexer and the main-memory unit MMU is addressed directly without the intervention of the central processor unit CPU.

Accordingly, in a DMA-multiplexer, each time a data-service interrupt signal is received, the DMA-multiplexer acquires direct access to the main-memory unit, accomplishes the data transfer, updates the transfer count and the memory unit address, resets the interrupt signal and checks for a transfer count equal to zero.

Each time a data-service interrupt signal I1 or an end-of-block interrupt signal I2 is generated by a system including an IMA-multiplexer, and each time an end-of-block interrupt signal I2 is generated by a system including a DMA-multiplexer, the interrupt signal is vectored to the main-memory unit MMU after is attains top interrupt signal priority. Top priority is attained only when there are no higher priority interrupt signals pending in the same multiplexer unit or in multiplexer units of higher priority, or in peripheral units of higher priority, that are not connected to the computer unit by means of a distributed input/output system DIOS, but are instead connected directly to the computer unit by conventional techniques.

In a DMA-multiplexer, the question of interrupt priority arises only when more than one end-to-block interrupt signal is generated. In a DMA-multiplexer, a question of direct-memory access priority arises if other direct-memory access devices are also competing for such access. If only one peripheral unit is in the process of transferring data to the computer unit CU, or is in the process of receiving data from the computer unit CU, priority decisions do not arise since there is no competition for the attention of the computer unit's central processor unit or main-memory unit.

GENERAL DESCRIPTION OF THE DIRECT-MEMORY-ACCESS MULTIPLEXER DMA-MUX

As previously indicated, the principal difference between the distributed input/output system of this invention that employs a multiplexer having direct-memory-access capability, and the distributed input/output system described in Applicants' prior applications which employs a multiplexer having only indirect-memory-access capability, is that direct-memory access provides means for communicating directly with the main-memory unit MMU of the computer unit CU without involving the central processor unit; involvement that would otherwise reduce the rate of such communications.

As a result of this difference, numerous advantages are produced. For example, the distributed input/output system of this invention is capable of operating in conjunction with peripheral devices that are of higher speed and greater data bandwidths. Data bandwidth is defined herein as the number of bytes of data signals transferred from one device to another within a unit of time. This invention is also capable of working with multiple slower devices that in combination exceed the data bandwidth of the distributed input/output system disclosed in Applicants' prior applications. Furthermore, since the central processor unit is not involved in data transfers in the system of this invention, such transfers are accomplished in less time, leaving more time for computational operations by the central processor unit.

One of the many important advantages of the invention disclosed herein, is that although the direct-memory-access multiplexer DMA-MUX includes the capability for communicating directly with the main-memory unit MMU, thereby substantially reducing the overhead time involved in making data transfers between the computer and a plurality of peripheral units, the multiplexer DMA-MUX is also compatible with other less sophisticated forms of input/output transfer formats.

To gain further insight into the numerous advantages of this invention, it is beneficial to have some understanding of some of the various commonly used input/output formats. A brief description of such formats now follows:

Input/Output Formats

Basically there are a number of input/output formats in the present computer arts, including those commonly referred to as direct-memory-access input/output, programmed input/output, interrupt input/output, integrated input/output, and Auto input/output.

DMA Input/Output

Direct-memory-access input/output is an "INTELLIGENT" type of input/output control technique where the central processor unit CPU initiates a transfer operation by giving a controller or multiplexer a command signal, an address pointer signal indicating a particular location in the memory unit, and a transfer count corresponding to the number of operations involved in the transfer. Once begun, the data transfer operation is controlled automatically by the controller, or multiplexer, which transfers all data between a peripheral device and the main-memory unit without central processor unit CPU intervention. The direct-memory access controller, or multiplexer, keeps track of memory addresses, updates the addresses, updates and monitors the transfer count, and provides various forms of required data formatting and error checking. Direct-memory-access data interface offers high system performance, ease of programming, and high data throughput with reduced central processor unit overhead.

Large computers, for example those too large to be considered minicomputers, have adopted the direct-memory-access interfacing concept for all input/output control and data transfer primarily because of the reduced software requirement, software uniformity, and increased performance. Unfortunately, the use of direct-memory-access data transfer techniques is not cost effective for all input/output devices because there are many standard input/output devices for which the much higher data flow rates and data bandwidths provided by direct-memory-access and the inherently higher cost of the additional control logic, are unnecessary.

Integrated Input/Output

Integrated input/output is actually a data transfer implementation technique based upon utilization of internal microprocessor techniques employing firmware programs within the computer unit. In such techniques, most or all of the input/output controller logic is incorporated into the firmware in the central processor unit. Although integrated input/output is often cheaper than direct-memory-access input/output, so far as the hardware is concerned, computer performance is sacrificed in that data bandwidths are severely reduced and central processor unit overhead is increased substantially because the central processor unit must act as an inefficient input/output channel controller performing functions unrelated to its usual central processor unit functions.

Programmed Input/Output

Programmed input/output is an economical interfacing concept in which a majority of input/output controller functions are performed by means of a software program. Essentially, programmed input/output is a concept in which all data transfer between a main-memory unit and an input/output device pass through the central processor unit's accumulator. Both the computer unit and the software must be involved in the overhead processes of manipulating data, buffer addresses, transfer counts, device error checking, and other related controller functions. Many minicomputers and microcomputers use programmed input/output for data transfer for all low speed peripheral devices. This type of input/output format sacrifices ease of programming, software uniformity, and computer performance to achieve lower cost hardware.

Interrupt Input/Output

Interrupt input/output is a type of programmed input/output format that utilizes interrupt signals to reduce computer overhead. By using this interrupt signal technique, the central processor unit need not anticipate each data transfer from an input/output controller but can be free to perform other system computations. However, to obtain this improved performance, special timing and interrupt signal circuitry must be added to the input/output controller.

Auto Input/Output

Auto input/output is a type of interrupt input/output having an additional capability to achieve higher system bandwidths without impacting hardware costs. Auto input/output involves the use of specialized input/output instructions, that is, Auto I/O Blocks, under interrupt signal control. These special input/output instructions allow data to be transferred between a main-memory unit and a peripheral device without the need for the computer hardware or software to save the data in operating registers and to transfer control of computer operation to an input/output subroutine in order to process each data character. Central processor unit firmware, or hardware, is used to fetch and update a dedicated block of instructions stored in a preselected location in the computer unit's main-memory unit.

The dedicated block contains information relating to the operation to be performed, the transfer count and the address pointers to other portions of the memory unit where data will be either read out of or written into the memory unit. Although the Auto input/output concept has substantially improved the system performance of conventional programmed input/output, with increased software uniformity, it is still limited to relatively slow speed peripheral devices and it still lacks the overall performance provided by the direct-memory-access method of data transfers with input/output peripheral devices.

In a conventional Auto input/output operation, the input/output controller generates a vectored interrupt signal which is transferred to the central processor unit. The central processor unit then uses the interrupt vector address to fetch a dedicated control block in the main-memory unit. This control block contains the information regarding the operation to be performed with the input/output device, information regarding the address of memory locations out of or into which data is to be transferred, and also the number of bytes, or words, to be transferred during the data operation. The central processor unit uses this control block to implement the transfer of data between the input/output controller and the main-memory unit. As terms of data are transferred, the central processor unit updates the address pointer information, the transfer count information, and also continuously checks for a transfer count equal to zero which would indicate that the data transfer for a particular operation has been completed.

Applicants' invention employs a multiplexer that employs direct-memory-access input/output format and simulates the Auto input/output transfer technique. In Applicants' invention, the multiplexer is provided with the logic circuits necessary to fetch the dedicated control block from the main-memory unit corresponding to a particular input/output device with which data transfer operations are being started. Then, when the input/output device causes the generation of a data-service interrupt signal, the direct-memory-access multiplexer does not pass the interrupt signal request on to the central processor unit, but instead performs the prescribed data transfer between the input/output device and the main-memory unit on a memory-unit cycle stealing basis, that is, by gaining access to the main-memory unit in accordance with the priorities established for such access. The control block information is temporarily stored in a file memory unit in the multiplexer and is updated by the multiplexer whereby the buffer address is incremented and the transfer count is decremented as each term of data is transferred. When an ending condition occurs, either as a result of the entire set of data terms having been transferred, or as a result of some error condition, the updated, dedicated control block is restored to the designated location in the main-memory unit and the central processor unit is informed of the ending condition by an end-of-block interrupt signal that is vectored into the computer unit.

Figure 3:
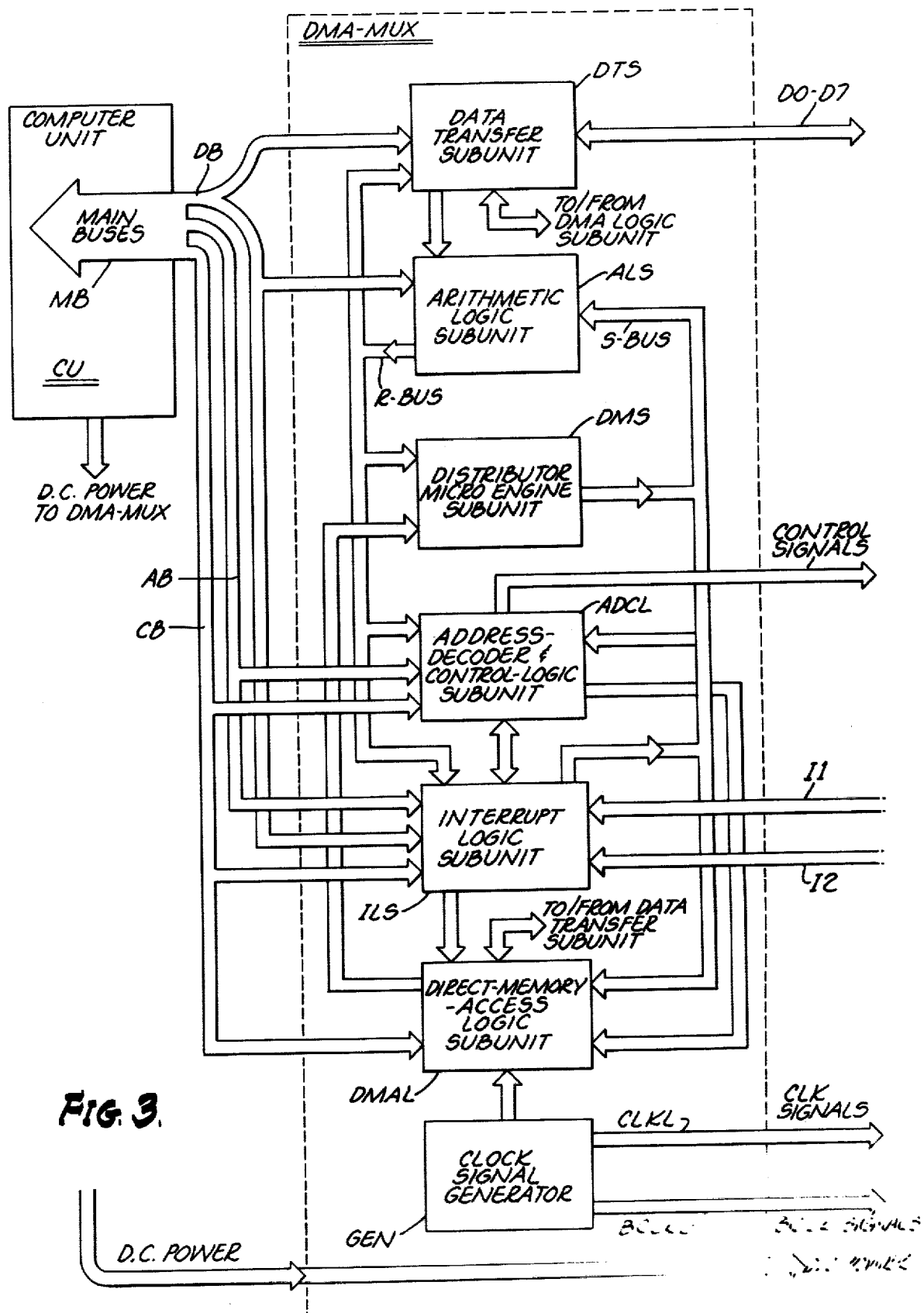
FIG. 3 is a simplified block diagram of the direct-memory-access-multiplexer of this invention indicating the functional subunits of the multiplexer and the general signal flow into and out of the multiplexer.

Referring now to FIG. 3, there is shown a general simplified block diagram of the direct-memory-access multiplexer DMA-MUX indicating its subunits, and also indicating the signal flow involving the multiplexer DMA-MUX, the computer unit CU and the peripheral-unit controllers PUCs.

The multiplexer DMA-MUX includes seven subunits, namely, a data transfer unit DTS, an arithmetic logic subunit ALS, a distributor microengine unit DMS, an address-decoder and control-logic subunit ADCL, an interrupt-logic subunit ILS, and a clock signal generator subunit GEN.

The data transfer subunit DTS is utilized primarily to implement the transfer of data signals, status signals, branch address signals, and mode signals between the computer unit CU and all of the peripheral-unit controllers PUCs. In the embodiment of the invention herein disclosed, the data transfer subunit DTS comprises a plurality of tri-state drivers.

A tri-state device is one that, in addition to having the usual two output levels corresponding to the truth values of TRUE and FALSE, or ONE and ZERO, also has a third state in which the output of the device presents a high impedance. In this high-impedance third state, the devices neither load nor drive the line to which each is connected.

Tri-state drivers are employed for transferring address signals, data signals, status signs, and vectored end-of-block interrupt signals from the multiplexer DMA-MUX to the computer unit CU. An 8-bit register with tri-state output capability is employed for transferring data signals, branch address signals, and mode signals from the multiplexer DMA-MUX to the plurality of peripheral-unit controllers PUCs to which it is connected.

The data transfer subunit DTS also includes circuits to standardize the most significant bit MSB of input data bytes. This MSB standardization is used in conjunction with serial-data peripheral devices to force the parity bit to a known preselected truth value before data is transferred to the computer unit CU. The purpose of parity bit standardization is discussed below in conjunction with FIG. 11.

Also included in the data transfer subunit DTS is an Opcode register which stores enable signals transferred from the computer unit CU. These enable signals enable either the input drivers or the output drivers, or both, depending on the direction of data transfer. The data transfer subunit DTS is described below in conjunction with FIGS. 7A and 11.

The arithmetic logic subunit ALS is employed primarily as a means for making arithmetic and logic modifications to signals in the form of data signals transferred from the computer unit CU to the multiplexer DMA- MUX and to signals transferred to the arithmetic logic subunit ALS from other subunits within the multiplexer DMA-MUX.

The arithmetic logic subunit ALS is used for, among other reasons, decrementing transfer counts, testing for identity between a special character and the incoming data from peripheral devices, and for decoding and storing computer instructions which indicate the type of data-transfer operation that is about to take place.

Details of the arithmetic logic subunit ALS are described below in conjunction with FIGS. 7A, 7B, 8A, and 8B. By way of introduction, it is to be noted that the arithmetic logic subunit ALS includes an arithmetic logic chip which comprises an accumulator or shift-storage matrix portion and an arithmetic logic operation portion, commonly referred to as an ALU. Also included within the arithmetic logic subunit ALS are buffers which are used to temporarily store data signals transferred from the computer unit CU over the data bus DB. The data signlas may correspond either to actual data signals to be transferred to a selected peripheral-unit controller PUC, or to control signals that are used in the control of such data transfers.

Also included in the arithmetic logic subunit ALS is a file memory unit which provides a storage capacity of 32 bytes, each byte consisting of eight bits. Also included is a file latch which is a temporary storage device, such as a register, for storing signals generated by the arithmetic logic chip and temporarily stored for eventual restorage into the file memory unit. The latch unit is utilized in the present embodiment to restore data in the file storage unit.

The distributor microengine subunit DMS is the processor portion of the multiplexer DMA-MUX and includes a plurality of read-only memory units ROMs comprising a ROM-array and address counters used to address the information stored in the read-only memory units. It also includes test-tree logic circuits used to select the signals which determine the truth states of the ROM-array output signals.

The read-only memory units in the distributor microengine subunit DMS are programmed by means of firmware programs, that is, a microcode that is programmed into the read-only memory units.

The distributor microengine subunit DMS is employed to perform many operations, including the following tasks:

it is used to control the access and storage of the automatic input/output control block transferred from the main-memory unit and stored in the file storage unit of the arithmetic logic subunit ALS;

it is used to recognize data-service-interrupt signals from a peripheral-unit controller and to initiate data transfer under direct-memory-access controls;

it is used to update the buffer address and the transfer count in the Auto I/O Block;

it is used to signal the peripheral-unit controller when the transfer count, corresponding to a data transfer sequence in conjunction with such a controller, has reached zero;

it is used to initiate the recognition of special characters which indicate that the data transfer operation is to be terminated; and it is used also to recognize that an attempt has been made to access information in a nonexistent portion of the main-memory unit MMU.

The distributor microengine subunit DMS is used also to recognize the end-to-block interrupt signal from a peripheral-unit controller and to restore buffer address and transfer count information to the main-memory unit MMU and to signal the central processor unit CPU of the status after a data transfer operation is completed.

The means by which the distributor microengine subunit accomplishes these various operations, are described below in conjunction with FIGS. 7B, 9A, and 9B.

As indicated in FIG. 3, the control signals that are transferred from the multiplexer DMA-MUX to the controllers are generated in the address-decoder and control-logic subunit ADCL, another subunit of the multiplexer DMA-MUX.

The following control signals are generated by the address-decoder and control-logic subunit in response to signals transferred from the computer unit CU to the multiplexer DMA-MUX over the main buses MB.

Figure 9:
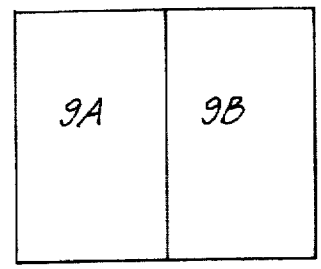
FIG. 9 is a diagram indicating how

A reset signal RST, a status signal STAT, a data-in signal IND, an output signal OTPT, a command signal CMD, and a select signal SEL. These signals are used to initiate various operations in the peripheral-unit controllers when the signals are set to a truth value of TRUE. The manner in which these control signals are generated in discussed below in detail in conjunction with FIGS. 7 and 9.

The reset signal RST, when set to a truth value of TRUE, resets the peripheral-unit controller PUC, to which it is channeled, to an idle configuration making it ready for a new operation. It is normally used only when the computer unit is initially powered up.

The status signal STAT, when set to a truth value of TRUE, and transferred to a particular controller, will cause the selected controller to enable drivers to transfer a status word to the multiplexer DMA-MUX over the data lines D0 through D7 in the input/output bus IOB. The multiplexer gates the status word onto the data bus DB for the duration of the status control signal STAT. The status word comprises signals which represent information regarding the condition of one or more parameters of a peripheral unit PU. For example, the status word of a peripheral-unit controller PUC, that is connected to a card reader, may include a status signal that will have a truth value of TRUE when the card hopper is empty of cards and a truth value of FALSE when there are cards in the card hopper. The status word may be transferred to the computer unit CU and it is also utilized by the peripheral-unit controller to determine which of two alternative steps will be the next step in a sequence of controller operations.

The data-in signal IND, when set to a truth value of TRUE, enables the transfer of data from a peripheral unit PU to the computer unit CU by enabling the appropriate drivers in an addressed peripheral-unit controller and in the multiplexer DMA-MUX.

The output signal OTPT is generated in response to the data-out signal OUTD which, when set to a truth value of TRUE, causes an output flag OUTFLG to become TRUE and thereby enables the transfer of data from the computer unit CU to a selected peripheral unit PU. In an output signal transfer, an enable out signal ENOUT enables drivers in the multiplexer DMA-MUX and the output signal OTPT clocks registers, or receivers, in the peripheral-unit controller PUC. The dataout signal OUTD is transferred each time the central processor unit CPU issues an output instruction.

The command signal CMD serves a multiple purpose. It is a start signal used during the initial step in a sequence of data transfer operations to load starting address signals into the peripheral-unit controller for the beginning of a data transfer sequence. The command signal CMD is also utilized during interrupt operations to reset the serviced interrupt signal in the periphal-unit controller in which the interrupt signal was generated. The command signal CMD is used also to indicate an ending condition, such as a zero transfer count, that is temporarily stored in the file storage unit of the arithemtic logic subunit ALS. A zero transfer count is reached when a sequence of data transfers has been completed. The details of the ways in which the command signal CMD serves these purposes, is presented in Applicants' prior applications.

The select signal SEL is used in conjunction with peripheral-unit controllers PUCs for the purpose of transferring mode-select signals onto the input/output bus to the controller. The mode-select signals are utilized by the controllers to select a peripheral unit PU control function. By way of example, a mode-select signal may be utilized to turn on the motor of a teletypewriter unit prior to the transfer of data between the computer unit CU and the teletypewriter unit. The select signal SEL is utilized in serial-peripheral-unit controllers SPUCs and in general-purpose-peripheral-unit controllers GPPUCs.

The address-decoder and control-logic subunit ADCL provides means to determine whether the multiplexer DMA-MUX is the one of the plurality of multiplexers connected to the computer unit CU (irrespective of whether they are direct-memory-access types or indirect-memory-access types), that is being addressed by the computer unit CU. It also provides means for determining which of the control signals is to be transferred to the peripheral-unit controllers; and means to select for a data transfer operation a particular controller cut of the plurality of controllers connected to the multiplexer DMA-MUX.

As indicated in FIG. 3, an additional subunit of the multiplexer DMA-MUX is the interrupt logic subunit ILS. Each peripheral-unit controller can generate two types of interrupt signals. A data-service interrupt signal I1, and and end-of-block interrupt signal I2. The end-of-block interrupt signal I2 occurs after the end of a transfer of a block of data or as the result of some other ending condition.

When a sequence of data transfers is about to commence, the computer unit CU notifies the multiplexer DMA-MUX. Subsequently, under the control of the distributor microengine subunit DMS and the arithmetic logic subunit ALS, input/output instructions stored in the main-memory unit MMU are transferred to the multiplexer DMA-MUX. The peripheral-unit controller is then notified to commence data transfer.

The peripheral-unit controller then generates a data-service interrupt signal I1 which is transferred to the multiplexer-interrupt-logic subunit ILS. The interrupt logic subunit then notifies the distributor microengine subunit DMS that a data-service interrupt signal is pending.

At the beginning of a data transfer operation, the Auto I/O block stored in a particular portion of the main-memory unit MMU, is transferred to the file storage unit of the arithmetic logic subunit ALS in the multiplexer DMA-MUX. Thereafter, until the data transfer operations with that particular peripheral unit are completed, all data-service interrupt signals I1 emanating from the particular peripheral-unit controller PUC, are utilized within the multiplexer DMA-MUX to update the buffer address and transfer count of the Auto I/O block. Of course, each time the transfer count is decremented, a term of data is transferred either into or out of the address portion of the main-memory unit MMU. After the last data term in a particular block of data has been transferred, a command signal CMD of 500 nanoseconds duration, twice the nominal 250 nanosecond duration, is transferred to the controller to indicate that the transfer count of the data being transferred has reached zero. The frequency of the clock signal CLK used to synchronize multiplexer and peripheral-unit controller operations, is 4 mHz. Thus, one period or cycle of operation is 250 nanoseconds in duration. When an interrupt signal resetting command signal CMD is only one cycle, or 250 nanoseconds in duration, the interrupt signal reset operation is the only response. However, if the command signal duration is two cycles, or 500 nanoseconds in duration, there are two responsive operations in the selected peripheral-unit controller. The pending interrupt signal is reset and the controller microengine unit MEU branches to an end-of-block interrupt signal operation. The means by which these command signal operations are implemented are described more fully in Applicant's prior applications.

In response to a zero transfer count command signal, the controller generates an end-of-block interrupt signal I2,, which is also transferred to the interrupt logic subunit ILS of the multiplexer DMA-MUX. The end-of-block interrupt signal I2 is then vectored or directed to the computer unit CU and to a known preselected location in the main-memory unit MMU with the aid of the central processor unit CPU. The end-of-block interrupt signal I2 is vectored to the memory cells of the main-memory unit MMU which are preprogrammed to contain the instruction necessary to terminate the data transfer operation. After the end-of-block interrupt signal I2 is made available to the central processor unit CPU, a command signal CMD is transferred to the peripheral-unit controller PUC which responds by returning to an idle state to wait for the next command signal. An end-of-block interrupt signal I2 will also be generated if a status error is detected at any point in a sequence of data transfers.

In addition to containing the circuits necessary for vectoring interrupt signals to selected locations in the main-memory unit MMU that are programmed to contain certain instructions, the interrupt logic subunit ILS also provides means for determining the priority of interrupt signals when they occur simultaneously. As an example, all data-service interrupt signals I1 have higher priority than all end-of-block interrupt signals I2.

The interrupt logic subunit ILS also includes means for either inhibiting or enabling an interrupt sequence initiated by a peripheral-unit controller PUC depending upon whether or not other interrupt signals are already being processed by the multiplexer DMA-MUX either alone or in conjunction with the computer unit.

Another subunit of the multiplexer DMA-MUX indicated in FIG. 3, is the direct-memory-access logic subunit DMAL. This subunit contains all the logic necessary to permit the multiplexer DMA-MUX to communicate directly with the main-memory unit MMU. The direct-memory-access logic subunit DMAL simulates the central processor unit CPU by generating an appropriate control signal to gain and maintain control of the main buses MB. Memory operations may be either READ (data accessed from the main-memory unit) or WRITE (data written into the main-memory unit). This subunit also includes logic to control DMA priority so that when more than one DMA type multiplexer is employed, priority of access to the main buses MB of the computer unit CU and to the main-memory unit MMU will be controlled in accordance with a predetermined criterion for priority.

Another subunit of the multiplexer DMA-MUX is indicated in FIG. 3. It is the clock-signal-generator subunit GEN. This subunit generates the system clock signal CLK and a baud clock signal BCLK. The clock-signal-generator subunit GEN generates a 16 mHz signal that is used within the multiplexer DMA-MUX and a 4 mHz signal CLK that is also used within the multiplexer DMA-MUX and that is also transferred to all controllers PUCs for the purpose of synchronizing the transfer of information between the controllers and the multiplexer DMA-MUX. The baud clock signal BCLK is used only in serial peripheral-unit controllers SPUCs. The baud clock signal BCLK is typically a multiple of the fundamental clock rate of a peripheral unit. It will be seen below that the baud clock generator is provided with a jumper plug that permits the selection of any one of a plurality of baud rates for each peripheral-unit controller. Typically, rates in the range of 75 to 19,200 baud are used for standard peripheral devices.

As indicated in FIG. 3, DC power is transferred from the computer unit CU to the multiplexer DMA-MUX over a power line PWR to be used by the multiplexer circuits. DC power is also transferred over each input-/output bus IOB for use in the peripheral-unit controllers PUCs. As noted previously in conjunction with FIG. 1, the computer unit CU includes a power supply PS. Power supply PS is an AC to DC converter that converts commonly available 60 Hertz AC power to several independent DC voltages for use in the computer unit and in the distributed input/output system DIOS. The embodiment described herein utilizes DC voltages of +5 volts, +12 volts, and −12 volts.

GENERAL DESCRIPTION OF PERIPHERAL-UNIT CONTROLLER PUC

This invention is used in conjunction with two types of peripheral-unit controllers PUCs. One type is utilized in conjunction with parallel-data devices and is therefore called a parallel-peripheral-unit controller PPUC. The second type is utilized in conjunction with serial-data-peripheral devices and is therefore called a serial-peripheral-unit controller SPUC.

Figure 4:
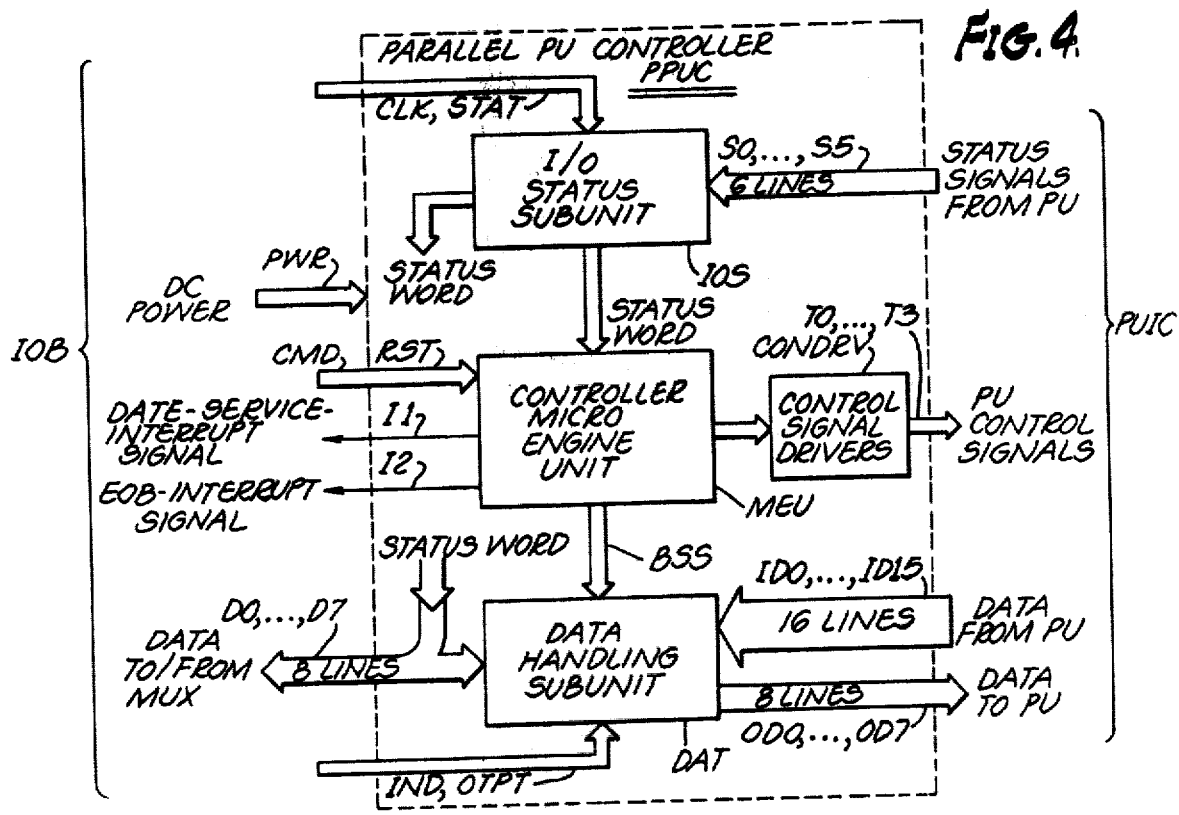
FIG. 4 is a simplified block diagram of a parallel-peripheral-unit controller that may be used with this invention.

There are two versions of the parallel-peripheral-unit controller PPUC, the basic parallel controller, which is illustrated in FIG. 4, and a somewhat more flexible and powerful parallel controller which is illustrated in FIG. 5 and is called a general-purpose-peripheral-unit controller GPPUC. There are also two versions of the serial-peripheral-unit controller SPUC. The simplified block diagram shown in FIG. 6 is illustrative of both versions of the serial controller.

Such controllers are described in more detail in Applicants' prior applications Ser. No. 644,412, filed Dec. 24, 1975 for DISTRIBUTED INPUT/OUTPUT CONTROLLER SYSTEM (CAI-5), Ser. NO. 644,341, filed on Dec. 24, 1975 for PERIPHERAL-UNIT CONTROLLER APPARATUS (CAI-6), and Ser. No. 647,762, filed Jan. 9, 1976, for DISTRIBUTED INPUT/OUTPUT CONTROLLER SYSTEM (CAI-5A), particularly in conjunction with FIGS. 8, 9, and 11–14 of those applications.

Figure 6:
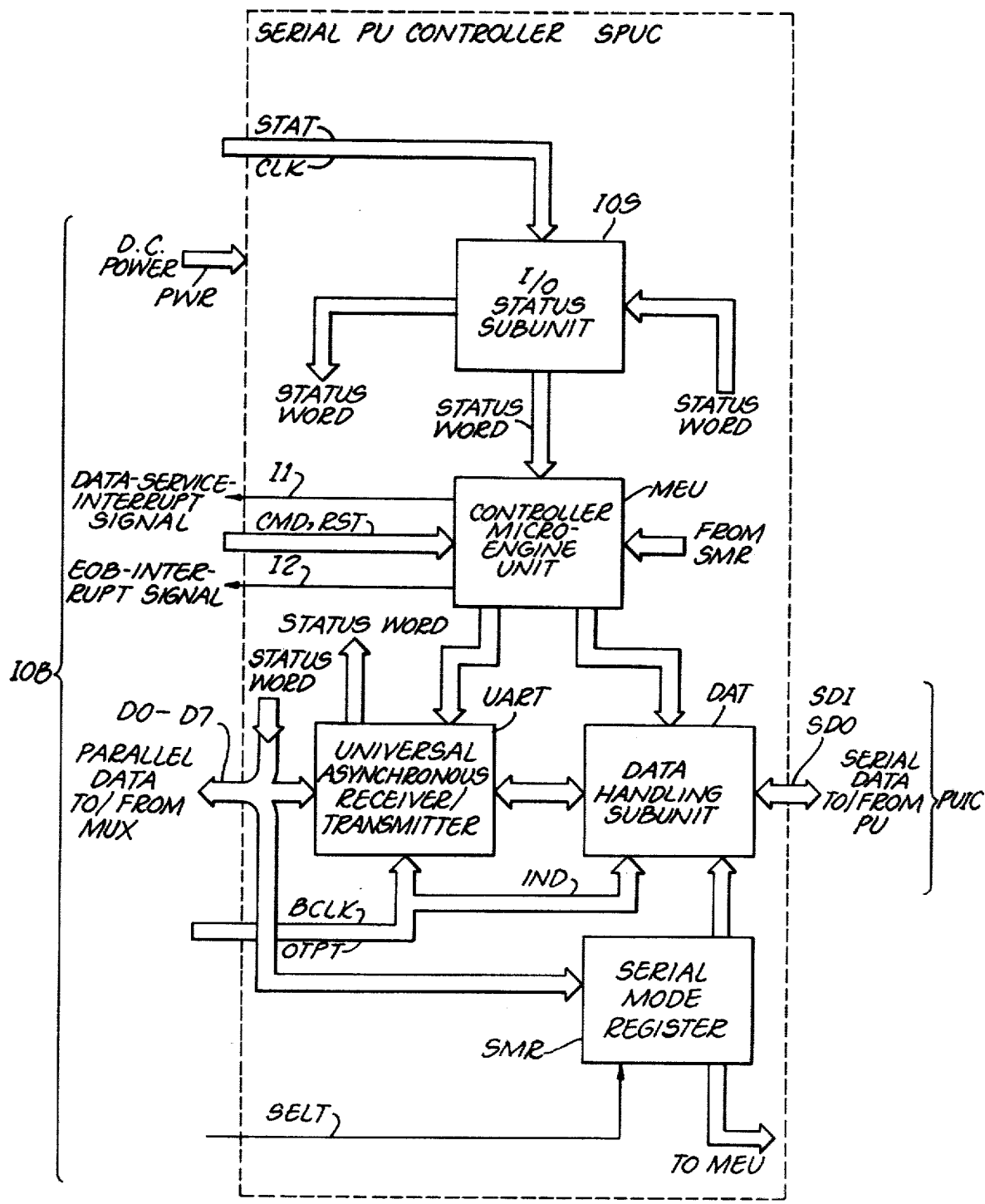
FIG. 6 is a simplified block diagram of a serial-peripheral-unit controller that may be used with this invention.

In each of FIGS. 4, 5, and 6, the version of the peripheral-unit controller being discussed is shown interposed between an input/output bus IOB and a peripheral-unit interface cable PUIC. In the discussion of each of those figures, reference to the IOB, the PU, etc., means the particular input/output bus, the particular peripheral unit, etc., to which the peripheral-unit controller is connected.

In FIG. 4 there is shown a simplified block diagram of a parallel-peripheral-unit controller PPUC interposed between an input/output bus IOB and a peripheral-unit interface cable PUIC and comprising four subunits, namely, an Input/Output Status Subunit IOS, a Controller Microengine Unit MEU, a Data Handling Subunit DAT, and a Control Signal Driver Subunit CONDRV. It will be seen hereinafter that all of the peripheral-unit controllers contain subunits of the type illustrated in FIG. 4, and it will be observed that one of the subunits common to all controllers, namely, the microengine unit MEU, is substantially identical in all controllers. The control signal driver subunit CONDRV is included in only the parallel-peripheral-unit and general-purpose-peripheral-unit controllers.

The input/output status subunit IOS of a parallel controller, receives a plurality of status signals over lines SO, ..., S5 comprising a status word from the peripheral unit PU to which a controller PUC is connected and stores the status word in a register. The status word is then made available for transmission to the multiplexer DMA-MUX over the data lines of the input/output bus IOB and is also made available to the controller microengine unit MEU for purposes which will be hereinafter discussed in more detail. The status subunit IOS also receives a STAT control signal to enable the transfer of the status word to the multiplexer DMA-MUX and to the computer unit CU.

At the bottom portion of FIG. 4, there is shown a data handling subunit DAT. This subunit comprises the drivers and temporary storage means employed to implement bidirectional data transfer between the multiplexer DMA-MUX and the peripheral unit PU. As indicated in FIG. 4, data being transferred between the parallel-peripheral-unit-controller PPUC and the peripheral unit PU, is transferred on either output lines OD0, ..., OD7 or input lines ID0, ..., ID15, depending upon the direction of the transfer taking place.

It will also be observed that although there are eight lines for the transfer of data from a controller PUC to a peripheral unit PU, there are sixteen lines for the transfer of data from the peripheral unit PU to the peripheral-unit controller PUC. The extra set of eight input-data lines permits the accommodation of peripheral devices that generate sixteen data bits at a time for transfer to the computer unit CU.

A third subunit in the parallel-peripheral-unit controller PPUC is the controller microengine unit MEU. As indicated in FIG. 4, the microengine unit receives a status word from the I/O status subunit IOS and receives control signals from the multiplexer DMA-MUX. The microengine unit MEU is preprogrammed to generate the data-service-interrupt signals I1 and the end-of-block-interrupt signals I2 previously discussed. These interrupt signals are transferred to the multiplexer DMA-MUX over allocated lines in the input-/output bus IOB. The microengine unit is also programmed to generate a byte select signal BSS which is transferred to the data handling subunit DAT. The truth value of the byte select signal BSS determines which of the two sets of eight input-data lines IDO, . . . , ID7 or ID8, . . . , ID15 is enabled for transmission of data to the multiplexer DMA-MUX over the input/output bus IOB.

The microengine MEU also generates peripheral-unit control signals which are transmitted over separate lines to the peripheral unit PU for control of one or more peripheral unit operations.

FIG. 5 is a simplified block diagram of the general-purpose-peripheral-unit controllers GPPUC. A comparison of FIG. 5 with FIG. 4 reveals that the principal differences between the general-purpose-peripheral-unit controller GPPUC and the parallel-peripheral-unit controller PPUC are a mode register PMR and two additional peripheral unit control lines in the general-purpose controller not present in the parallel controller.

The added mode register PMR and the additional control lines substantially increase the flexibility of the general-purpose-peripheral-unit controller GPPUC for use with more complex peripheral devices that can accommodate special user requirements not accommodated by the standard peripheral devices previously mentioned.

In FIG. 6, there is shown a simplified block diagram of a serial-peripheral-unit controller SPUC. As in the parallel controllers, the serial-peripheral-unit controller SPUC has an I/O status subunit IOS, a data handling subunit DAT, and a microengine unit MEU. However, the serial-peripheral-unit controller SPUC has two additional subunits, namely, a universal asynchronous receiver-transmitter UART and a 4-bit, or 4-flip-flop, serial-mode register SMR.

One function of the universal asynchronous receiver/transmitter UART is to convert data being transferred between the multiplexer DMA-MUX and the serial-peripheral-unit controller SPUC in an 8-bit parallel format to an 11-bit serial format for transfer between the serial-peripheral-unit controller and the peripheral unit to which it is connected. THe universal asynchronous receiver/transmitter UART also functions to make the opposite conversion for data being transferred in the opposite direction.

The mode register SMR responds to a select signal SELT from the multiplexer DMA-MUX by setting its four flip-flops according to the respective truth values of four signals transferred over the four data lines DO-D3 of the input/output bus IOB. The output signals of these flip-flops are then made available to the peripheral unit PU to which the controller is connected, the data handling subunit DAT and the microengine MEU. By way of example, one of the mode control signals is used in conjunction with a teletypewriter unit to step the motor of the paper-tape reader in the teletypewriter unit.

As previously indicated, there are at least two versions of the serial-peripheral-unit controller SPUC. The differences between the two versions reside primarily in the data handling subunit DAT. The principal difference between the data handling subunits of the two versions of the serial-peripheral-unit controller SPUC stems from the fact that data handling subunits that are used in conjunction with teletypewriter units employ a discrete transistor output stage for current mode logic operation. Data handling subunits that are used in conjunction with cathode-ray-tube terminal units CRTs and modems employ means for converting the peripheral-unit controller PUC logic levels to standards established by Electronic Industries Association for the interface between data terminals and data communications equipment. This standard, called RS232, defines voltage levels for receivers and transmitters operated in such equipment. For example, a space at the receiver input corresponds to a voltage in the range +3 volts to +25 volts, while a mark corresponds to a voltage in the range −3 volts to −25 volts. The serial-peripheral-unit controller provides a transmitter output of +12 volts for a space, and −12 volts for a mark. The input/output impedances and signal rise and fall times are also specified by the RS232 standard.

Because of the parallel-to-serial conversion requirements in the serial-peripheral-unit controllers SPUCs, it will be observed that unlike the parallel-peripheral-unit controllers PPUCs, the serial-peripheral-unit controllers do not employ direct connections between the peripheral unit PU and the I/O status subunit IOS or between the peripheral unit PU and the microengine unit MEU. Instead, the serial-peripheral-unit controller derives status information through the universal asynchronous receiver/transmitter UART.

The peripheral unit control signals generated by the microengine unit MEU in serial-peripheral-unit controllers are also used somewhat differently than those in parallel-peripheral-unit controllers. For example, in serial controllers, two of the control signals, namely, Master Reset signal MR and Data-Received Reset signal DDR, generated by the microengine unit MEU, are transferred to the universal asynchronous receiver/transmitter UART for controlling registers in that subunit. A third microengine unit control signal is used only in serial-peripheral-unit controllers that operate with teletypewriter units. Serial-peripheral-unit controllers used in conjunction with cathode-ray-tube terminal units CRTs and modems, do not employ the last mentioned control signal generated by the microengine unit.

This general description of the peripheral-unit controllers PUCs that can be employed in conjunction with a direct-memory-access multiplexer DMA-MUX, is intended only as an overview of those controllers as they pertain to the present invention. A more detailed description of the controllers is presented in Applicants' prior applications.

DETAILED DESCRIPTION OF DIRECT-MEMORY-ACCESS MULTIPLEXER DMA-MUX

The following discusssion is a more detailed and comprehensive description of the direct-memory-access multiplexer DMA-MUX of FIG. 3, and employs FIGS. 7A through 7D which more clearly indicate the interconnections and signal flow between the subunits of the multiplexer DMA-MUX shown in FIG. 3. This discussion also refers to FIGS. 8-11 which are more detailed schematic block diagrams, each indicating logic circuits and signal flow within a particular subunit.

Data Transfer Subunit

As shown in FIG. 7A, the data transfer subunit DTS includes four major elements, namely, input buffer 10, output buffer driver 12, Opcode register 14, and parity bit standardization logic 16.

As shown in FIG. 7A, the data lines D0-D7 are connected to the parity bit standardization logic 16 and the output of the parity bit standardization logic 16 is applied to the input buffer 10 which includes a plurality of drivers, one driver for each data line. The output of input buffer 10 is applied to the data bus DB upon which incoming data signals, that is, data signals being transferred from a peripheral unit PU to the computer unit CU, are actually transferred to the computer unit.

Figure 11:
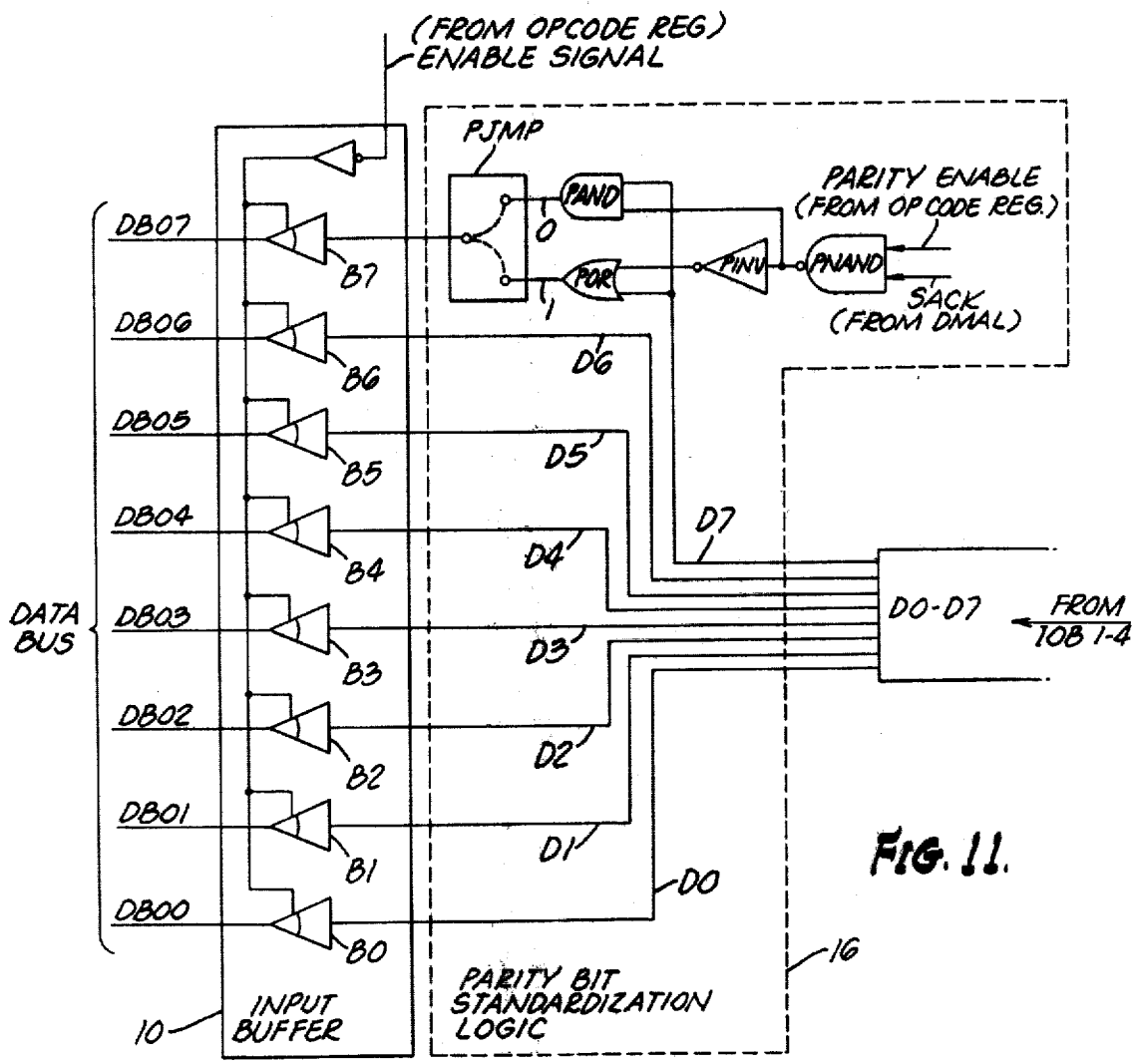
FIG. 11 is a detailed schematic block diagram of the parity bit standardization circuits of this invention.

A more detailed representation of parity bit standardization logic 16 is presented in FIG. 11. As shown in FIG. 11, data lines D0 to D7 from input/output buses IOB1 through IOB4 are applied, respectively, to the parity bit standardization logic 16. Data signals on lines D0 through D6 are applied directly to buffers B0 through B6, respectively, which are in turn connected to data bus lines DB00 through DB06, respectively. Data line D7, on the other hand, is connected as one input line to parity OR-gate POR and also as one input line to parity AND-gate PAND. The output lines of gates POR and PAND are connected to respective terminals within parity jumper unit PJMP. The output terminal of parity jumper unit PJMP is connected to buffer B7 which in turn is connected to data bus line DB07.

A parity NAND-gate PNAND and a parity inverter PINV complete the parity bit standardization logic circuitry. Two input signals are applied to the input terminals of parity NAND-gate PNAND, namely, a parity bit standardization enable signal from the Opcode register 14 and a stop acknowledge signal SACK from the direct-memory-access logic subunit DMAL.

When parity bit standardization is desired, the parity bit standardization enable signal, applied to the NAND-gate PNAND, will be set to a truth value of TRUE. Furthermore, each time the direct-memory-access logic subunit DMAL receives a TRUE stop acknowledge signal SACK from the computer unit CU to initiate a direct-memory-access cycle, that signal will also be set to a truth value of TRUE. Accordingly, the output signal of NAND-gate PNAND will be false, thus forcing one input signal to parity AND-gate PAND to a truth value of FALSE. However, parity inverter PINV inverts the output signal of parity NAND-gate PNAND to force one input to parity OR-gate POR to a truth value of TRUE.

The output signals of parity AND-gate PAND and parity OR-gate POR will therefore be in a truth state of FALSE and TRUE, respectively, irrespective of the truth state of the data signal appearing on data line D7. Consequently, the truth value of the data signal appearing on data bus line DB07 may be forced to either a TRUE or FALSE condition depending upon which one of two jumpers is installed in parity jumper unit PJMP.

It may also be seen in FIG. 11 that when parity standardization is not desired and parity standardization enable signal from Opcode register 14, applied to one input of parity NAND-gate PNAND, is in a FALSE state, the polarity of the signals produced by parity NAND-gate PNAND and parity inverter PINV are inverted. Accordingly, a signal having a truth state of TRUE is applied to parity AND-gate PAND and a signal having a truth state of FALSE is applied to parity OR-gate POR. As a result, the output signals of OR-gate POR will be determined by the truth state of the incoming data signal appearing on line D7.

The purpose of parity bit standardization logic 16 is to provide means for substituting a bit having a known truth value for the most significant bit of input data when a peripheral-unit controller PUC employs data signals that comprise a 7-bit code. Typically, when a parity bit is included in the set of eight bits of input data, the eighth bit of an 8-bit character, that is, the most significant bit MSB, is a parity bit that is used to test the accuracy of the transmission.

The parity bit is usually utilized in interface transfers involving critical applications and where transmission errors are especially likely. Typically, a parity bit is made equal to 1 if, and only if, the number of 1's in the remaining seven bits of data term is odd. In the embodiment of the invention herein disclosed, the parity bit is utilized in conjunction with a 7-bit ASCII code. In ASCII code, the parity bit is the most significant bit. The remaining seven bits represent upper case letters, lower case letters, numerals, various standard symbols or control characters.

Ordinarily, as is well known, parity checking is accomplished in a computer unit in a comparison process in which the 8-bit data term is compared with a term having a parity bit calculated by the computer unit and therefore known to be correct. If the parity bit of the term to be used and the parity bit of the correct term are not identical, the computer unit terminates operations and indicates that a parity error has occurred.

Frequently, although a parity bit is included in the term transferred from a peripheral unit to the computer unit, a parity check in the computer unit is omitted. The parity check may be omitted because it is performed somewhere else in the data transmission before the data reaches the computer unit. In such cases, the most significant bit may be forced to one truth value or the other to permit accurate conversion in the computer unit while avoiding a situation in which there are two 8-bit code representations for each 7-bit character. It is generally old in the art to make such most significant bit MSB substitutions in the computer unit by programming the computer to perform a subroutine in which the most significant bit MSB is forced to take on one truth value or another regardless of the truth value of the transferred data signal. This prior art programming means for performing such substitutions can be very cumbersome and inconvenient for the programmer and results in increased programming costs and computer inefficiency. It is therefore advantageous to provide hardware means for accomplishing most significant bit substitution.

It is advantageous to provide this capability on a selective basis so that the substitution for the most significant bit occurs only when desired, that is, only when the most significant bit is surplusage or a parity bit and not when the most significant bit forms part of an 8-bit character wherein all eight bits contain information. By way of example, in the embodiment of the invention disclosed herein, the most significant bit of each 8-bit term transferred by standard parallel devices to the computer unit, is an information bit. Therefore, most significant bit MSB substitution would usually not be used for data transfer operations involving such standard parallel devices. However, many of the standard peripheral devices that utilize serial mode data format, such as teletypewriter units and modems, may employ a parity bit as the most significant bit of each data term. Thus, according to this invention, most significant bit substitution takes place only when parity bit checking is not to be prformed in the central processor unit CPU and a peripheral unit is transferring data signals to the computer unit, which signals include an eighth bit added to a 7-bit code.

If the capability for substituting a bit of predetermined truth value for the transferred most significant bit was omitted from the multiplexer DMA-MUX, such substitution would have to be performed under software control in the computer unit CU. In that case, data signals stored in the main-memory unit MMU in an ASCII code format, would have to be processed in the computer unit CU to provide the substitution bit each time such data signals would be used in a computer operation. Providing this capability in a hardware configuration in the multiplexer DMA-MUX, obviates the need for providing such numerous instructions to be carried out by the central processor unit CPU. The use of such software control would increase programming costs and the time required for performing computations.

Returning now to FIG. 7A, there are many suitable drivers and buffered drivers that could be used for the input and output buffer and driver components of the data transfer subunit DTS. However, it has been found convenient to use a National Semiconductor Model 8098 tri-state driver chip for the input buffer 10 and a Texas Instruments Model 74374 8-bit register with tri-state driver outputs for the output buffer/drivers 12.

Unlike the input buffer which, as shown in FIG. 11, is connected directly to the data lines D0-D7 of the input-/output bus IOB for each of the peripheral-unit controllers PUCs connected to the multiplexer DMA-MUX, the input to the output buffer drivers does not come directly from the source of the outgoing data, namely, the data bus DB, but instead comes from the result bus R-bus of the arithmetic logic subunit ALS. This indirect path for outgoing data is used because there may be some delay between the time that data signals are transferred from the main-memory unit MMU to the multiplexer DMA-MUX and the time the corresponding data is transferred to the selected peripheral-unit controller PUC. There may also be a logical or arithmetical manipulation of data transferred from the computer unit CU to the multiplexer DMA-MUX before the information is transferred to a peripheral-unit controller.

The Opcode register 14 applies enable signals to the input buffer 10, output buffer/driver 12, and parity bit standardization logic 16. The enable signals are applied to the register 14 by the result bus R-bus The signals that control the output of the Opcode register 14 are generated as part of the read-only memory ROM array output in the distributor microengine subunit DMS.

Arithmetic Logic Subunit

The arithmetic logic subunit ALS is shown partially in FIG. 7A and partially in FIG. 7B. It includes three buffer registers referred to as data buffer1 20, data buffer2 22, and DMA buffer 24. The arithmetic logic subunit ALS also includes an accumulator 26, an arithmetic logic circuit 28, a file storage unit 30, and a latch unit 32. Also included in the arithmetic logic subunit ALS is a 2-to-1 multiplexer 34.

As shown in FIG. 7A, the input signals to buffers 20, 22, and 24 are applied from the data bus DB. Each buffer is an 8-bit register with a tri-state output. One such commercially available device suitable for use as each of the buffers 20-24, is a Texas Instruments Model 74S374. The output signals of the buffers are connected together to a common bus designated the source bus S-bus. The source bus is one source of input signals to the arithmetic logic circuit ALU 28. The second source of input signals to the arithmetic logic circuit 28 is derived from the accumulator 26, the input to which is applied from the result bus R-bus.

The arithmetic logic circuit ALU 28 is capable of performing logical or arithmetic operations on the two sets of input signals, including the arithmetic operations of subtracting one input from the other, adding the two inputs together, incrementing either input by 1, incrementing the complement of either input by 1, decrementing the difference between the two inputs and inverting either input. Logic functions that may be employed by means of the arithmetic logic circuit 28 include, among others, the OR function, the AND function, the NOR function, the NAND function, and the EXCLUSIVE-OR function. The arithmetic logic subunit ALS also includes a latch unit 32 and a file storage unit 30.

Figure 8A:
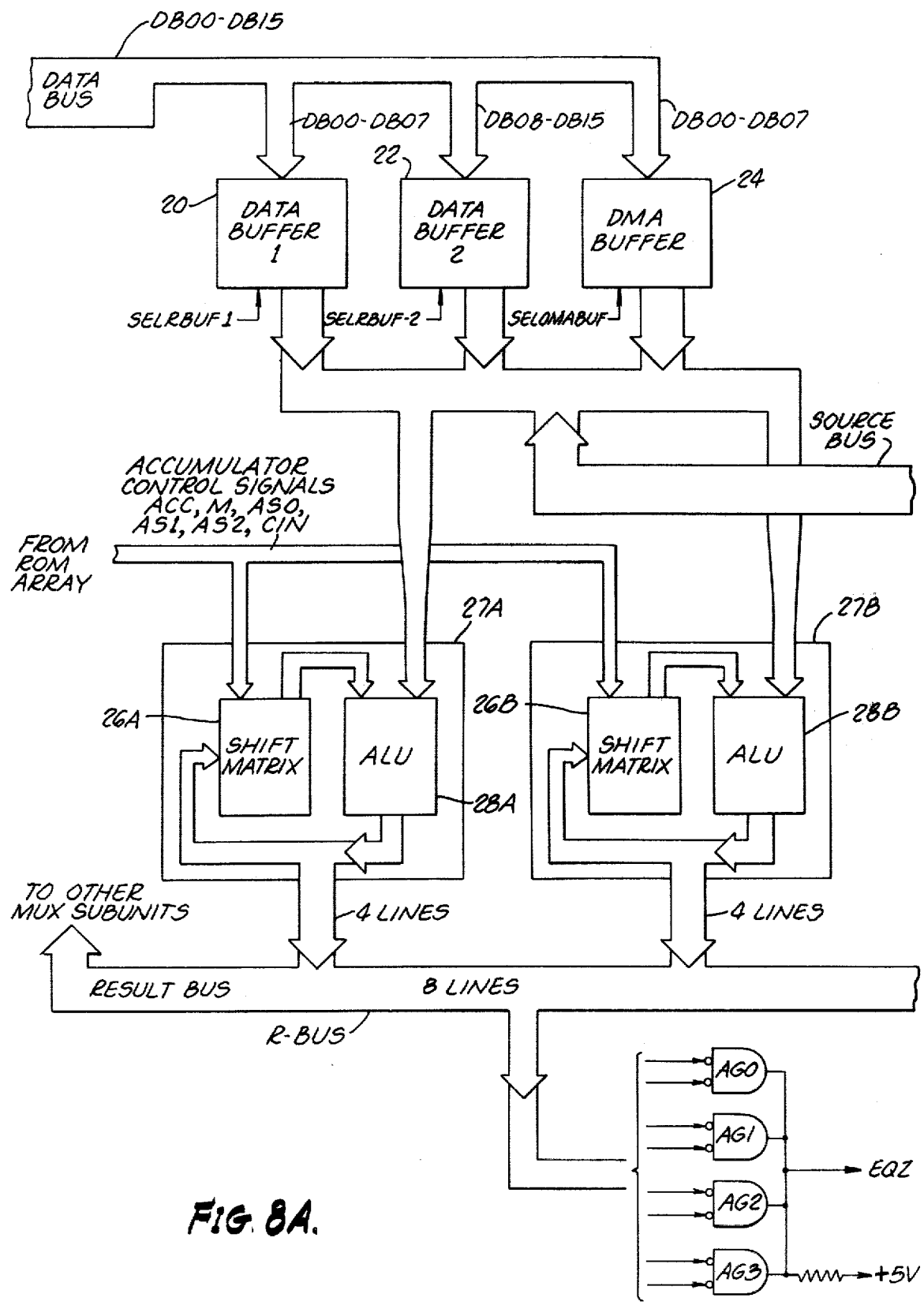

FIGS. 8A and 8B together comprise a detailed schematic block diagram of the arithmetic logic subunit ALS. As indicated in FIG. 8A, data buffer 20 is connected to data bus lines DB00 through DB07 and data buffer 22 is connected to data bus lines DB08 through DB15. The DMA buffer 24 is also connected to data bus lines DB00 through DB07. The output lines of the three buffers are connected to a common 8-line bus designated the source bus S-bus. The information on the source bus S-bus is one of the two sets of signals for arithmetic logic manipulation by the arithmetic logic circuit ALU.

In one embodiment of the invention, the arithmetic logic circuit 28 and the accumulator 26 are embodied within one chip (see FIG. 8A), namely, a Texas Instruments Model 74S281. This device is a 4-bit parallel binary accumulator described in detail at pages S271 through S272 of a publication entitled "Supplement to the TTL Data Book For Design Engineers" published by Texas Instruments, Inc. of Dallas, Tex. in 1974, and hereinafter referred to as the TI Supplement.

Since each such 4-bit parallel binary accumulator chip provides only four output lines, two such chips are used and as indicated in FIG. 8A, one such chip designated arithmetic logic chip 27A includes a 4-bit arithmetic logic circuit 28A and an accumulator, also called a shift matrix portion 26A. A second such arithmetic logic chip 27B includes a second 4-bit arithmetic logic circuit 28B and a second accumulator, that is, shift matrix portion 26B. The output signals of the shift matrix portion of each chip are returned internally to the arithmetic logic circuit of the same chip. It is these returned output signals which comprise the second source of signals manipulated in conjunction with the signals on the source bus to produce resultant output signals. Therefore, as shown in FIG. 8A, each of the chips 27A and 27B has four lines at its output terminals which together merge in an 8-line result bus R-bus.

As indicated in FIG. 8A, the result bus R-bus is applied to other subunits in the multiplexer DMA-MUX and is also used within the arithmetic logic subunit ALS in a manner to be described below. It is sometimes necessary to determine whether or not a particular data term has been received from one of the peripheral-unit controllers and whether that term corresponds to a carriage return ASCII character, or to a special character. Such characters indicate that a data operation is to be terminated. In such determinations, it is desirable to produce a signal indicative of a zero output on the result bus, which also indicates in a comparison operation, that term stored in the accumulator and the term on the source bus S-bus are identical terms. As shown in FIG. 8A, this signal, called the zero-test signal EQZ, is produced at the output formed by the common junction of NAND-gates AG0 through AG3. Two different lines of the 8-line result bus are applied as input signals to each of NAND-gates AG0 through AG5. Thus, a zero-test signal EQZ having a truth state of TRUE is produced only when a signal having a truth state of FALSE is present on each of the eight lines of the result bus R-bus. The zero-test signal EQZ is transferred to the distributor microengine subunit DMS where it is applied as an input signal to test-tree logic circuits (see FIG. 9A). In combination with other input signals, the zero-test signal EQZ may determine the truth states of the output signals of the read-only memory units in accordance with a preprogrammed microcode.

As indicated in FIG. 8A, accumulator control signals are applied to the shift matrix portions 26A and 26B respectively, of the two arithmetic logic chips 27A and 27B. The accumulator control signals are generated at the output terminals of the read-only memory units in the distributor microengine subunit DMS (see FIG. 9B) and thereby control the arithmetic and logical operations performed in the arithmetic logic subunit ALS.

As indicated in FIG. 8B, the eight lines of the result bus R-bus are connected to a plurality of latches, namely, the four latches 32A, 32B, 32C, and 32D. Each such latch is a 2-bit register and provides a temporary storage means whereby the output of the arithmetic logic circuit 28 (see FIG. 8A) can be restored in the file storage unit 30 comprising portions, 30A, 30B, 30C, and 30D. Temporary storage in latches 32A through 32D is employed in this particular embodiment because timing limitations preclude restoration of the information generated by the arithmetic logic circuit 28 into the file storage unit 30 in one machine cycle. Thus, the output signals of latches 32A through 32D are transferred to the four file storage units 30 comprising portions 30A through 30D.

Each file storage unit portion 30A, 30B, 30C, and 30D may be a Texas Instruments Model 74S189 64-bit random access memory RAM with tri-state outputs which is described in detail beginning at page S211 of the TI Supplement. In combination, the file storage unit portions 30A through 30D provide storage capacity for thirty-two 8-bit bytes. Those thirty-two bytes of storage capacity are divided equally among the four peripheral-unit controllers that are connected to the multiplexer DMA-MUX so that each block of eight bytes of storage capacity is devoted to a particular peripheral-unit controller channel.

The eight bytes of file storage capacity devoted to each such channel are divided up as follows: One byte of storage capacity is used to store the special character that corresponds to a terminating data term for a particular peripheral device, two bytes of storage capacity are utilized for the most significant byte and least significant byte respectively, of the transfer count portion of the Auto I/O block, and two additional bytes of storage capacity are utilized to store the most significant byte and least significant byte respectively, of the buffer address portion of the Auto I/O block fetched originally from the main-memory unit. The remaining three words in each of the file storage unit portions 30A-30D are used for storing STATUS data signals, START ROM address signals, and as a temporary storage register TEMP, the purposes of which will be explained below.

Additional input signals to the arithmetic logic subunit ALS are applied to the source bus S-bus by means of a 2-to-1 multiplexer 34 which is comprised of two multiplexer chips MUX 34A and MUX 34B shown toward the bottom portion of FIG. 8B. The signals applied to the multiplexer chips 34A and 34B include channel address bits transferred from the address-decoder and control-logic subunit ADCL to indicate the particular peripheral-unit controller PUC channel with which a data transfer operation is taking place.

As indicated in FIG. 8B, among the signals transferred to the MUX chips 34A and 34B are the interrupt vector location signals INTLOC transferred from the interrupt logic subunit ILS to the arithmetic logic subunit ALS where they may be operated upon in accordance with some arithmetic or logic function before being transferred to the computer unit CU over the address bus AB to address the main-memory unit.

Various signals generated by the read-only memory units ROMs in the distributor microengine subunit DMS and normally used for control purposes throughout the multiplexer DMA-MUX, are also applied to the 2-to-1 MUX chips 34A and 34B. Included among these read-only memory unit ROM generated signals are ROM signals ROM0-ROM4 and file address signals FA0-FA2. The file address signals are normally signals used for addressing the file storage units 30A through 30D. However, when these ROM-generated signals are applied to 2-to-1 MUX chips 34A and 34B, they are being used as literals, that is, as a known arithmetic term to support operations in arithmetic logic circuits 28A and 28B. By way of example, literals are used to mask the signals in a command word so that the truth state of each signal can be tested one signal at a time.

Thus, the arithmetic logic subunit ALS provides the data buffers, file storage unit, and arithmetic and logic manipulation circuits employed during data transfers for various types of logical and arithmetical modifications of signals in accordance with a preprogrammed microcode in read-only memory units ROMs in the distributor microengine subunit DMS.

Distributor Microengine Subunit

As shown in FIG. 7B, the distributor microengine subunit DMS comprises three major elements, namely, test-tree logic circuit 36, read-only memory address counter 38, and read-only memory ROM array 40. Test-tree logic circuit 36 receives input signals from the result bus R-bus and from the direct-memory-access logic subunit DMAL.

Figure 9A:
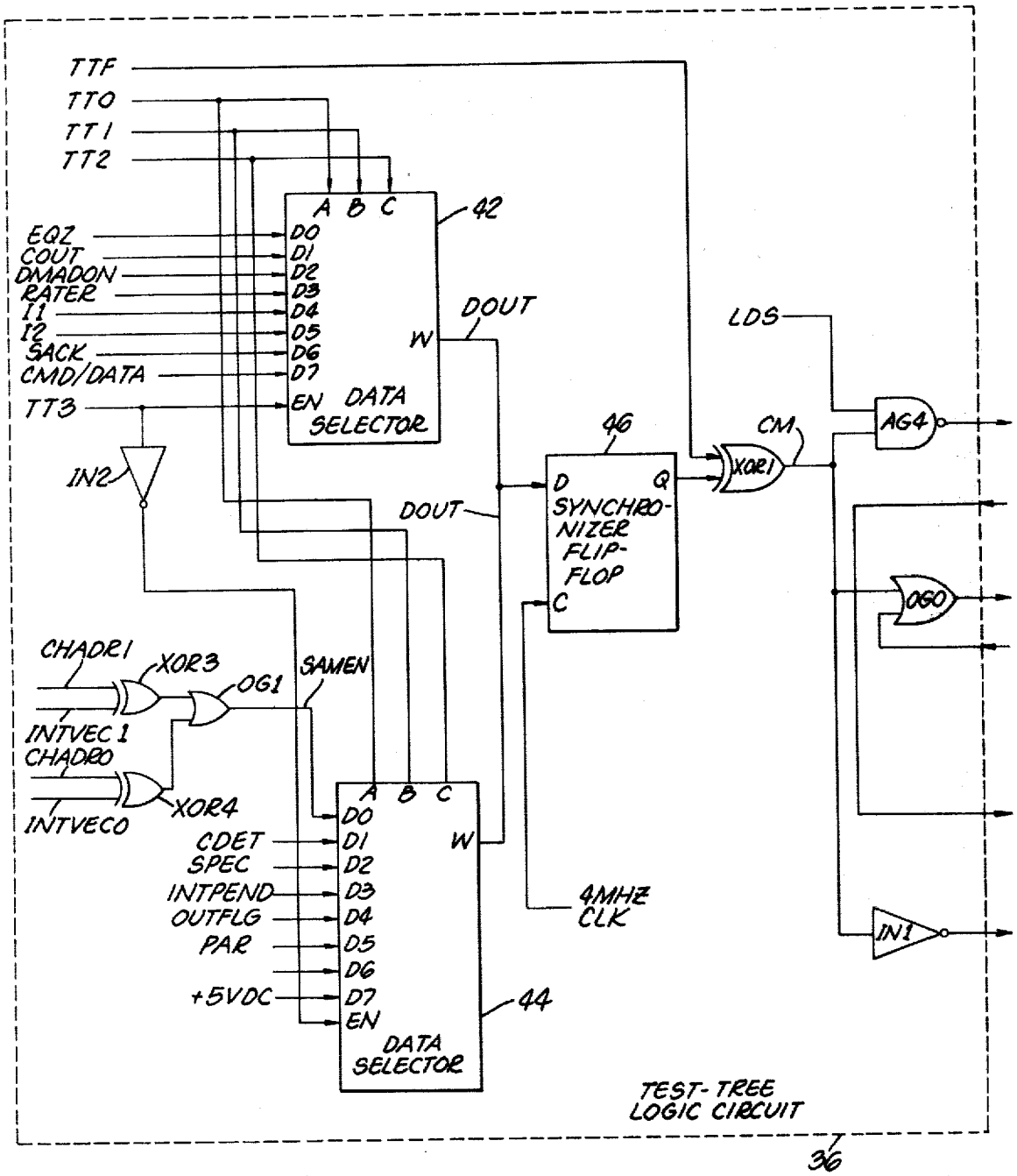
FIGS. 9A and 9B are to be combined.
Figure 9B:
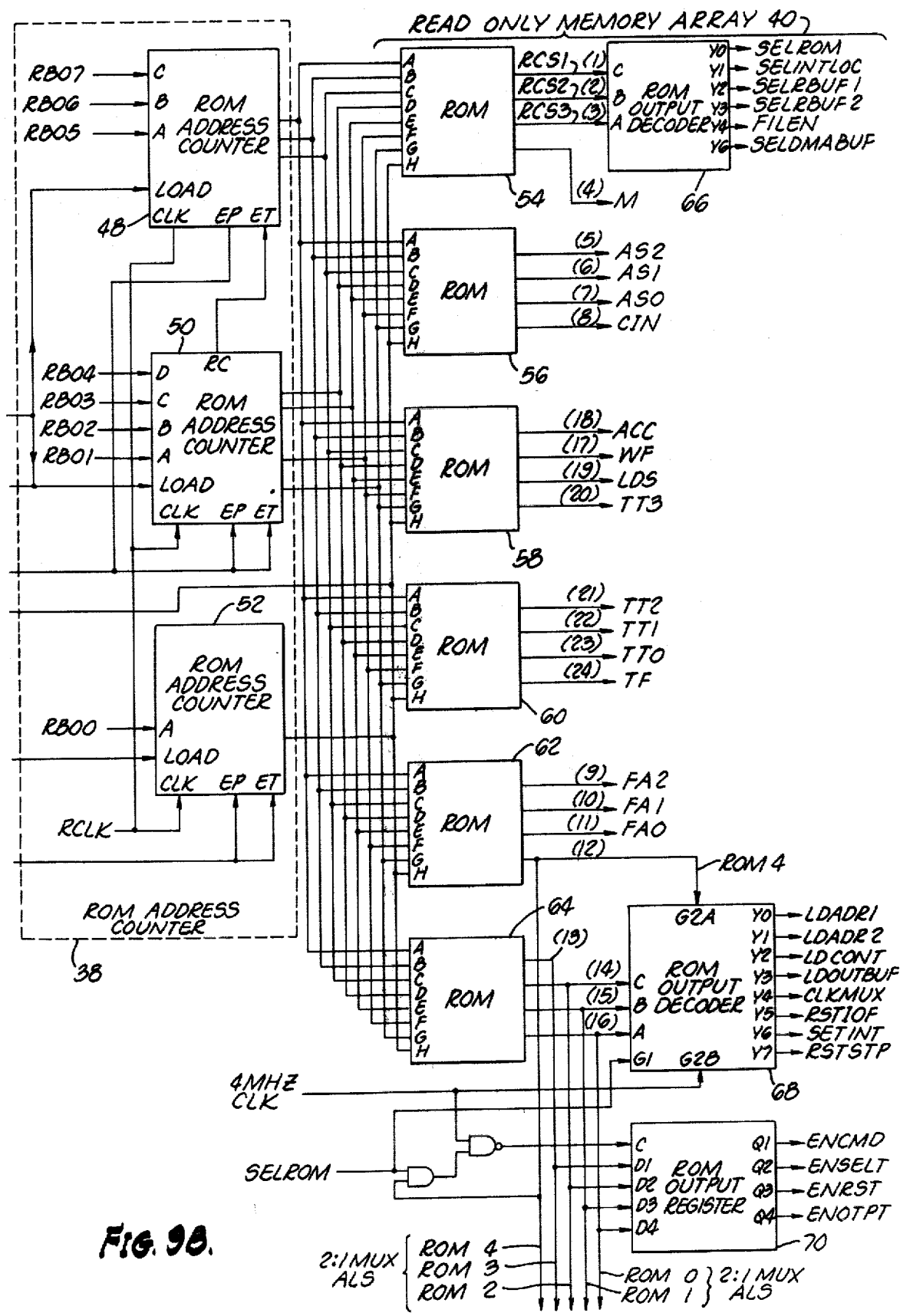

FIGS. 9A and 9B together constitute a detailed schematic block diagram of the distributor microengine subunit DMS.

The test-tree logic circuit 36 comprises two data selectors 42 and 44, each of which has a plurality of input signals applied to its input terminals D0 through D7 and a plurality of data select signals TT0 through TT2 applied to data select terminals A, B, and C for selecting one of the input signals to be applied to the output terminal DOUT. Also included in the distributor microengine subunit DMS is a synchronizer flip-flop 46, an Exclusive-OR selectable inverter XOR1, and AND-gate AG4, an OR-gate OG0, and an inverter IN1.

The function of the test-tree logic circuit 36 is to provide signals to be applied to the ROM address counters 38, which signals determine whether the counters are to be incremented to the next following count, or skipped to the second following count, or instead to perform a jump operation, that is, to be loaded with a new count. This determination is made in accordance with the truth value of a signal selected from a plurality of selectable signals and also in accordance with the microcoded program in the read-only memory ROM-array 40.

The distributor microengine subunit DMS also includes a ROM address counter 38 comprising three ROM address counter chips 48, 50, and 52. The function of the combination of the counters 48, 50, and 52 is to develop a plurality of address signals which are applied to the input terminals of the six read-only memory units to select a particular sets of output signals in accordance with a preprogrammed microcode, as explained below in the Operation section of this description. The address generated by the ROM address counters 48, 50, and 52 may be either an increment of or a skip from a previous count or a new count loaded into the counters from the result bus R-bus in accordance with signals on the eight lines RB00-RB07 of the R-bus. As previously indicated, the choice between incrementing or skipping the counters or loading the counters with a new count is a function of the truth value of the output signal of the test-tree logic circuit 36 and the load signal LDS fed back from a ROM output terminal (see FIG. 9A).

As indicated in FIG. 9B, the output signals of the counters 48, 50, and 52 are the address signals for the read-only memory array 40 and accordingly determine the truth state of the signals on the output terminals of the six ROM elements 54, 56, 58, 60, 62, and 64. Many of the output signals of the read-only memory elements are applied directly to circuits in other subunits in the multiplexer DMA-MUX. Other output signals of the read-only memory chips are applied to an intermediate device, such as a decoder or a register, from which signals are generated and utilized in other subunits in the multiplexer DMA-MUX. Some of the output signals of the read-only memory elements are fed back within the distributor microengine unit to the test-tree logic circuit 36 and play a part in determining the next subsequent step in the sequence of steps, each of which results in the generation of a set of read-only memory output signals.

A more detailed description of the distributor microengine subunit DMS now follows.

Data selectors 42 and 44, shown in FIG. 9A, each may be a Texas Instruments Model SN74251 Data Selector/Multiplexer with tri-state output capability. These devices are described in detail beginning at page 473 of the Data Book. Each of these data selectors has the capability of selecting a chosen one of up to eight input signals for transfer to output terminal DOUT. This selection process is made in accordance with a binary code represented by the signals TT0, TT1, and TT2 applied to the data selector terminals A, B, and C respectively. A fourth selection signal TT3 is applied directly to the enable terminal EN of data selector 42 and is also applied in an inverted format to the enable terminal EN of data selector 44. In this way, the truth value of the signal TT3 applied to respective enable terminals, determines which one of the two data selectors 42 or 44 will apply the output signal DOUT to the synchronizer flip-flop 46.

Each of the signals applied to the input terminal D0 through D7 of the two data selectors 42 and 44 may, if selected, affect the subsequent operational mode of the ROM address counters by playing a part in determining whether the counters are to be incremented or skipped from a prior count or loaded with a new count.

The signals that are applied to the input terminals D0 through D7 of the two data selectors 42 and 44, include the following:

The zero-test signal EQZ;
the carry out signal COUT;
the DMA done signal DMADON;
the rate error signal RATER;
the interrupt 1 signal I1;
the interrupt 2 signal I2;
the stop acknowledge signal SACK;
the command/data signal CMD/DATA;
the character detect signal CDET;
the special character signal SPEC;
the interrupt pending signal INTPND;
the output flag OUTFLG; and
the parity standardization signal PAR The same-not signal SAMEN applied to terminal D0 of data selector 44, is the product of the logic circuit including OR-gate OG1 and Exclusive-OR gates XOR3 and XOR4. It will be apparent to those familiar with the logic circuit art that the same-not signal SAMEN is TRUE as long as the input signals to each Exclusive-OR gate have truth states different from each other.

The zero-test signal EQZ is generated in the arithmetic logic subunit ALS to indicate that the combined output of the arithmetic logic unit chips 28A and 28B is equal to 0.

The carry out signal COUT is also developed in the arithmetic logic subunit ALS to indicate that the least significant bits LBSs generated by the file storage unit 30 have produced a carry out signal which means that the most significant bits should be increased by 1 to reflect a carry operation.

The DMA done signal DMADON is generated in the direct-memory-access logic subunit DMAL to indicate that a DMA cycle has been completed.

The rate error signal RATER is also generated in the direct-memory-access subunit DMAL and indicates that nonexistent memory has been addressed.

The interrupt signals I1 and I2 indicate the presence of data-service and end-of-block interrupt signals generated by one or more peripheral-unit controllers.

The stop acknowledge signal SACK is generated in the direct-memory-access logic subunit DMAL after being received from the computer unit CU and indicates that the central processor unit CPU has acknowledged a stop signal which is the first step in acquiring control of the main buses MB for a direct-memory-access operation.

The command/data signal CMD/DATA indicates whether the transfer operation taking place involves data signals or control signals, depending upon the truth condition of the function code signal on address bus line AB00.

Channel address signal CHARDR1 and interrupt vector signal INTVEC1 are applied to the two input lines of Exclusive-OR gate XOR4. The output signals of the two Exclusive-OR gates XOR3 and XOR4, are then applied to OR-gate OG1 which is in turn connected to data line D0 of data selector 44. The Same-not signal SAMEN applied to data line D0 indicates whether the peripheral-unit controller being addressed by the computer unit CU is the same controller that is generating an interrupt signal. The Same-not signal SAMEN will be TRUE if these channels are not the same and FALSE is they are the same.

Character detect signal CDET and special character signal SPEC indicate whether the incoming data signals are to be compared against a special character stored in the file storage unit or a standard carriage return character.

The interrupt pending signal INTPND indicates that an end-of-block interrupt signal to be transferred to the central processor unit is pending in the interrupt logic subunit ILS.

The output flag OUTFLG indicates that the computer unit CU is about to transfer signals to a controller. These signals may either be data signals or control signals.

The parity standardization signal PAR is applied to data selector 44 as a convenient means for testing that particular bit during the firmware operation. The truth state of that signal indicates whether seven bits or eight bits of each input data term are to be used for comparison purposes.

As shown in FIG. 9A, the output terminals of the data selectors 42 and 44 are connected at a common junction to the data terminal D of a D-type synchronizer flip-flop 46, such as a Texas Instruments Model 74S74 flip-flop. As its name implies, the purpose of the synchronizer flip-flop is to synchronize the data selection output with the 4 mHz clock signal generated in the Clock Signal Generator GEN and applied to the clock terminal C of the synchronizer flip-flop 46.

The output signal of synchronizer flip-flop 46 is applied to output terminal Q, which is connected as one input line to an Exclusive-OR gate XOR1. The other input line to the Exclusive-OR gate XOR1 is a read-only-memory ROM generated truth selection signal TTF. The purpose of the Exclusive-OR gate XOR1 is to provide a selectable or optional inversion capability so that the selected output of the data selectors 42 and 44 can be treated as having a TRUE logic state in either a high voltage or low voltage configuration in accordance with the truth selection signal TTF.

The output signal of the Exclusive-OR gate XOR1, called the condition met signal CM, is applied to one of the two terminals of a two-input AND-gate AG4. The other input AND-gate AG4 is a load signal LDS derived from the read-only memory units. As shown in FIG. 9B, the output signal of AND-gate AG4 is applied to the load terminals LOAD of the first, second, and third ROM address counters 48, 50, and 52 respectively. A signal having a truth state of FALSE at the load input LOAD of a ROM address counter loads the three counters and causes the output signals of the counter to agree with the input signals on terminals of the counters after the occurrence of the next ROM clock pulse RCLK and irrespective of the truth state of the enable signals applied to enable terminals EP and ET. ROM clock pulse RCLK is another clock signal generated in the Clock Signal Generator GEN.

The condition met signal CM is also applied to an OR-gate OGO (see FIG. 9A), the output signal which is applied to the enable terminals EP and ET of the second ROM address counter 50, and to the enable terminal EP of the first ROM address counter 48. The condition met signal CM is also tied to enable terminals EP and ET on third ROM address counter 52 through an inverter IN1. The count enable input terminals EP and ET of each counter must each have a TRUE signal applied to it before the counter is enabled for counting.

ROM address counters 48, 50, 52 may each be a Texas Instruments Model 74S163 synchronous 4-bit counter described in detail at pages S170 et seq., of the T.I. Supplement. As shown in FIG. 9B, the data inputs to the respective counters are the eight signals RB00 through BR07 applied from the result bus R-bus. ROM address counter 48 utilizes result bus lines RB05, RB06, and RB07 applied to terminals, A, B, and C respectively. Consequently, the first counter generates only three output signals. ROM address counter 50, on the other hand, utilizes signals on result bus R-bus lines RB01 through RB04. These four signals are applied to the four input terminals A, B, C, and D respectively of the second ROM address counter 50 which uses its full 4-bit capability. ROM address counter 52 uses only one input terminal A to which the signal on result bus line RB00 is applied. ROM address counter 52 therefore employs only one of its four output terminals. Unused counter terminals are not connected, that is, they are left floating.

If the load signal LDS and the condition met signal CM are both in a truth state of TRUE, then a FALSE signal will be applied to the three load terminals LOAD of ROM address counters 48, 50, and 52 respectively. As a result, the three counters will be loaded with the signals appearing at the eight lines of the result bus RB00 through RB07 and will thereafter commence counting at this newly loaded count. This process corresponds to a jump operation in the firmware program discussed below in the Operation section of this description.

If the load signal LDS is in a TRUE condition, and the condition met signal CM is a in a FALSE condition, or if both signals are in a FALSE condition, then the signals applied to the load terminals of the three counters 48, 50, and 52 will all be in a load disabling condition which prevents the loading of these counters with a new address. Furthermore, the enable terminals EP and ET of the counters 48 and 50 will also be in a disabled state preventing those two counters from counting. However, because of inverter IN1, the FALSE condition met signal CM is applied in a TRUE state to the terminals EP and ET of the third counter 52, thereby enabling counter 52 to commence counting at the occurrence of the next clock pulse. Furthermore, the output of counter 52 is tied through OR-gate OGO to the enable terminals of the first and second counters 48 and 50 respectively, which are thereby enabled for counting purposes as soon as the output of ROM address counter 52 goes TRUE. Thus, the counters will increment, that is, go to the next following count, if the condition met signal CM is in a FALSE condition irrespective of the truth state of the load signal LDS.

If the condition met signal is in a TRUE condition and the load signal LDS is in a FALSE condition, the ROM address counters 48, 50, and 52 will not be enabled for loading. The ROM address counters 48 and 50 will have the appropriate signals at their enable terminals EP and ET to enable incrementing. However, ROM address counter 52 will not be enabled for counting because inverter IN1 will apply a FALSE signal to the enable terminals EP and ET of counter 52. As is well known in the art, keeping the least significant bit LSB of a term fixed while allowing the remaining bits of a term to change, is one method for changing a count, represented by that term, by two at a time. Thus, this process corresponds to a skip operation where the count produced is the second next following count. Thus, a condition met signal CM in a truth state of TRUE, and a load signal LDS in a truth state of FALSE, produces a skip operation in the ROM address counter 38.

The output terminals of the ROM address counters 49, 50, and 52 are applied to eight lines comprising a common ROM address bus, the lines of which are each connected to eight input terminals of each of the six read-only memory ROM elements 54, 56, 58, 60, 62, and 64. These ROM elements may be Texan Instruments Model 74S287 1024-bit programmable read-only memory units with tri-state output capability. This particular device is described beginning at page S-279 of the Texas Instruments Supplement mentioned previously. Each of the ROM elements 54, 56, 58, 60, 62, and 64 constitutes one of these commercially available 256-word-by-4-bit read-only memory devices. Each ROM element has eight input address terminals to which are connected the eight lines on the common ROM address bus. Thus, the truth states of the eight signals applied to all ROM elements determine the truth states of the four signals appearing respectively at the four output terminals of each ROM element in accordance with a preprogrammed microcode in each element.

Of the four output signals derived from the ROM element 54, three, namely ROM coded signals RCS1, RCS2, and RCS3, are applied to a ROM output decoder 66. Decoder 66 decodes ROM coded signals RCS1, RCS2 and RCS3 and produces any one of six signals utilized in the arithmetic logic subunit ALS to determine which signals are to be applied to the source bus S-bus. These six signals are the select ROM signal SELROM, the select interrupt vector location signal SELINTLOC, the select data bus LSB buffer signal SELRBUF1, the select data bus MSB buffer signal SELRBUF2, the file enable signal FILEN, and the select DMA buffer signal SELDMABUF.

The select ROM signal SELROM is used within the read-only memory array 40 to selectively enable and disable the ROM output decoder 68 and the ROM output register 70 depending on its truth state. It is also applied to the 2-to-1 multiplexer 34 in the arithmetic logic subunit ALS (see FIG. 8B). The select interrupt vector location signal SELINTLOC is also applied to the 2-to-1 multiplexer 34 in the arithmetic logic subunit ALS where together with the select ROM signal SELROM, it determines which of the two sets of input signals will be applied to the output of the multiplexers (see FIG. 8B).

As indicated in FIG. 8A, the select data bus LSB buffer signal SELRBUF1 enables the data buffer 1 in the arithmetic logic subunit ALS. The select data bus MSB buffer signal SELRBUF2 enables the data buffer 2 in the arithmetic logic subunit ALS. The select DMA buffer signal SELDMABUF enables the DMA buffer in the arithmetic logic subunit ALS. The file enable signal FILEN is applied to the file memory unit 30 in the arithmetic logic subunit ALS (see FIG. 8B).

The fourth signal generated by the ROM element 54 is an arithmetic logic circuit mode bit signal M which is transferred to the arithmetic logic subunit ALS for controlling the operating mode of the ALU-chips 28A and 28B (see FIG. 8A).

The second ROM element 56 generates four signals comprising ALU control bits AS2, AS1, and AS0, and a carry-in signal CIN, all of which are applied to the arithmetic logic chips ALU 28A and 28B in the arithmetic logic subunit ALS for control of the operations taking place therein (see FIGS. 8A and 9B).

ROM element 58 also generates four signals, including the accumulator control signal ACC, which is applied to the arithmetic logic chips 28A and 28B also for control of operation therein, and the write file signal WF which, together with the file enable signal FILEN, selects one of two sets of file chips, either 30A and 30B, or 30C and 30D, as shown in FIG. 8B. The third and fourth signals generated by ROM element 58 include the load signal LDS which is used within the distributor microengine subunit DMS to enable the ROM address counters 48, 50, and 52 to load a new count, and the test-tree signal TT3 which is also applied within the distributor microengine subunit DMS as shown in FIG. 9A to select one of the two data selector units 42 or 44.

ROM element 60 develops four signals, including test-tree signals TT0-TT2 which, as indicated previously in conjunction with FIG. 9A, are used to select one of the eight possible data signals applied to each of the two data selector units 42 and 44. The fourth signal is the true/false signal TF which is applied to the inverting Exclusive-OR gate XOR1 shown in FIG. 9A to selectively invert the output of synchronizer flip-flop 46.

ROM element 62 develops four signals, including three file address bit signals FA0-FA2 which are transferred to the arithmetic logic subunit and to the file storage unit for use as part of a literal or for addressing information stored in the file storage unit 30, as shown in FIG. 8B.

The fourth output signal of ROM element 62 and the four additional output signals of ROM element 64, together comprise ROM signals ROM0-ROM4. These five ROM signals are applied to the ROM output decoder 68 and to the ROM output register 70. ROM signals ROM0-ROM4 are also applied to the 2-to-1 MUX 34 in the arithmetic logic subunit ALS. In addition, ROM signal ROM3 is applied to 2-to-1 multiplexer 94 in the interrupt logic subunit ILS (see FIG. 7C). The functions of ROM signals ROM0-ROM4 are described below and in the Operation section of this description.

ROM output decoder 68 generates any one of eight output signals in response to the three input signals ROM0, ROM1, and ROM2 generated by ROM element 64. These output signals of ROM output decoder 68 are the load address register 1 signal LDADR1, load address register 2 signal LDADR2, the load control register signal LDCONT, the load output buffer signal LDOUTBUF, the clock multiplexer signal CLKMUX, the reset input/output flag signal RSTIOF, the set interrupt signal SETINT and the reset stop signal RSTSTP.

The ROM output register 70 generates up to four signals at a time, which include the enable command signal ENCMD, the enable select signal ENSELT, the enable reset signal ENRST, and the enable output signal ENOTPT.

The load address register 1 signal LDARDR1 and the load address register 2 signal LDADR2 are applied to the lower and upper byte address registers respectively, comprising the memory address registers 88 in the address-decoder and control-logic subunit ADCL. These two signals, LDADR1 and LDADR2, load the memory address registers with the memory address word used to select specific memory cell locations in the main-memory unit MMU. The load control signal LDCONT is applied to Opcode register 14 in the data transfer subunit DTS as a clock signal for that register (see FIG. 7A). The Opcode register 14 stores enable signals which are used within the data transfer subunit DTS for enabling input drivers and output drivers. It also stores additional enabling signals which correspond to the carriage return detection bit and special character detection bit of the command word. These signals are applied to the test-tree logic in the distributor microengine subunit DMS.

The load output buffer signal LDOUTBUF (see FIG. 9B) is applied to the output buffer drivers in the data transfer subunit DTS (see FIG. 7A), where it is used for transferring data on the result bus R-bus to the output drivers for transfer over input/output bus IOB data lines D0-D7 to a selected peripheral-unit controller PUC.

The clock multiplexer signal CLKMUX is used as a reset signal applied to the Opcode register 14 in the data transfer subunit DTS. In addition, the clock multiplexer CLKMUX is applied to the interrupt logic subunit ILS where it is used as a synchronizing clock signal (see FIG. 7C).

The reset input/output flag signal RSTIOF is a control signal that is transferred to the address-decoder and control-logic subunit ADCL where it is used to reset the output flag OUTFLG after the multiplexer DMA-MUX completes an operation initiated by a central processor unit CPU output signal.

The set interrupt signal SETINT is also applied to the interrupt logic subunit ILS where it is used to enable end-of-block interrupt signal processing and the transfer of interrupt vector address bits onto the data bus.

The reset stop signal RSTSTP is used within the direct-memory-access logic subunit DMAL to release the control of the main bus MB by the DMA multiplexer DMA-MUX.

The enable control signals, enable command ENCMD, enable select ENSELT, enable reset ENRST, and enable output ENOTPT, are each applied to the channel control drivers in the address-decoder and control-logic subunit ADCL where they are available to be amplified by the drivers and transferred to any of the peripheral-unit controllers PUCs to which the DMA-multiplexer DMA-MUX is operatively connected.

The ROM signals ROM0-ROM4 are applied to the A terminals of the 2-to-1 multiplexer 34 in the arithmetic logic subunit ALS. These signals and file control signals FA0-FA2, when selected in accordance with the ROM array output signals, may be applied to the source bus S-bus as a literal term and acted upon by the arithmetic logic chip ALU and by the accumulator.

In summary, the distributor microengine subunit comprises a plurality of read-only memory units ROMs, controlled by ROM address counters and a test-tree logic circuit for the generation of a plurality of control signals. Some of the control signals are applied to various subunits within the multiplexer DMA-MUX and some are fed back back within the distributor microengine subunit DMS to control the sequence of operations that take place within the DMA-MUX for the transfer of data between a plurality of distributed peripheral-unit controllers PUCs and the main-memory unit MMU of a computer unit CU. Six read-only memory elements, constituting a read-only memory array, are programmed by means of microcode (also called firmware), to accomplish the required sequence of operations to control the multiplexer and the data transfer operations.

Address-Decoder and Control-Logic Subunit

Figure 7C:
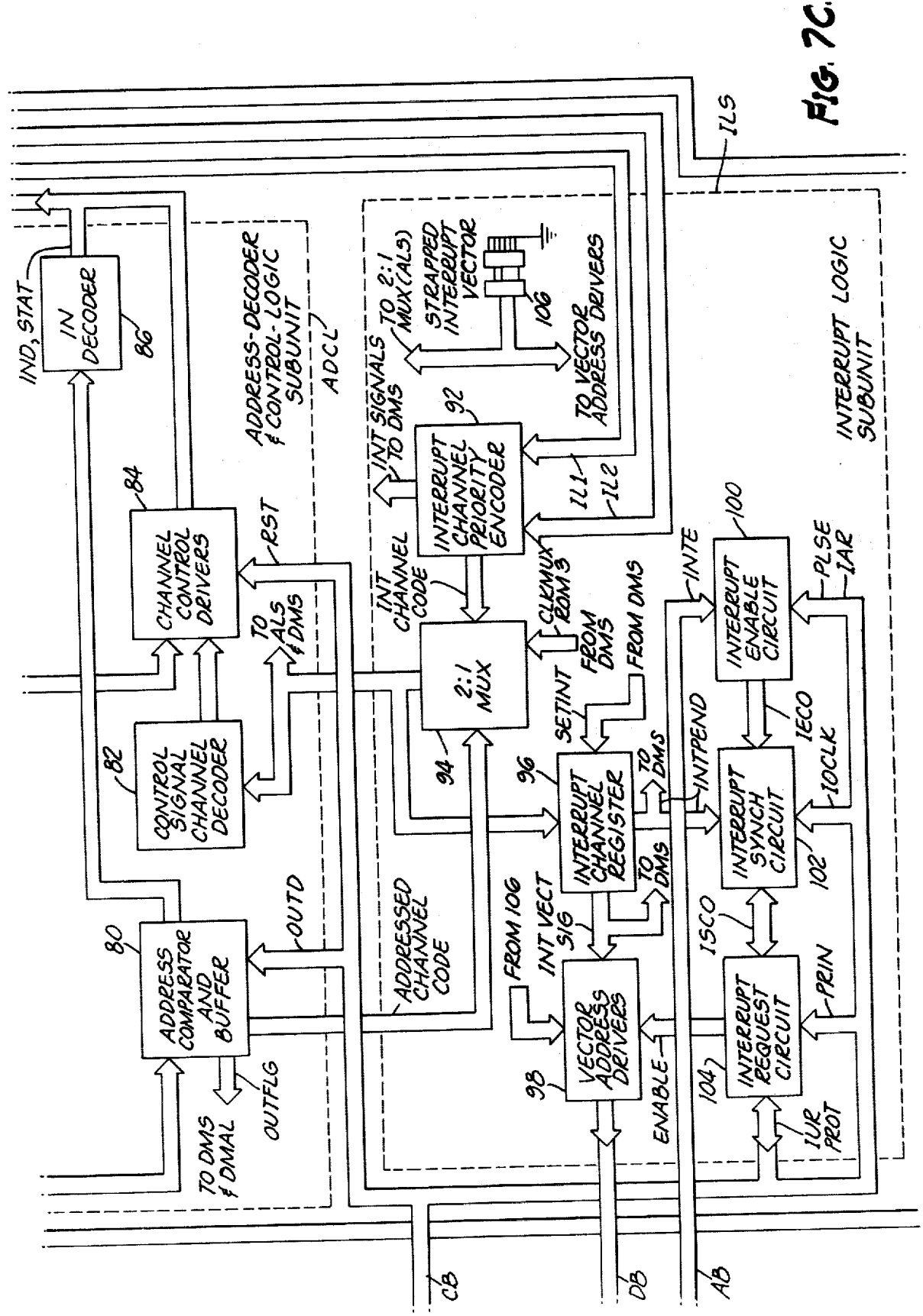

The address-decoder and control-logic subunit ADCL is shown at the lower portion of FIG. 7B and the upper portion of FIG. 7C. This subunit ascertains whether or not the computer unit CU is addressing the particular multiplexer DMA-MUX, it determines which of the peripheral-unit controllers the computer unit is addressing, it determines whether the multiplexer DMA-MUX will transfer data signals or control signals, it determines what type of control signal, if any, is being generated for transmission to a selected peripheral-unit controller PUC, and it provides means by which the signals used to address a particular location in the main-memory unit MMU of the computer unit CU, may be stored and transferred over the address bus AB to the main-memory unit MMU.

To accomplish these functions, the address-decoder and control-logic subunit ADCL receives signals over the control bus CB, the address bus AB, and the result bus R-bus of the arithmetic logic subunit ALS. In addition, the address-decoder and control-logic subunit ADCL transfers address signals over the address bus AB to the computer unit CU and it also transfers control signals over the input/output buses IOBs to the various peripheral-unit controllers PUCs controllers PUCs connected to the multiplexer DMA-MUX.

The address-decoder and control-logic subunit ADCL, like its counterpart in the IMA multiplexer, includes an address comparator, a channel decoder, and channel drivers. The address comparator and buffer 80 receives signals from the computer unit over the address bus AB. These signals represent the address of the multiplexer selected by the computer unit in accordance with software instructions.

The address comparator and buffer 80 generates an output signal data pulse DAPLSE which is transferred to the arithmetic logic subunit ALS and the direct-memory-access logic subunit DMAL if, and only if, the four address signals received over the address bus AB correspond to the address for the particular multiplexer DMA-MUX that has been software programmed into the computer unit CU. The address comparator and buffer 80 is hardware programmed by jumpers installed within the address comparator portion to respond only to the address of the multiplexer DMA-MUX. Unless the output signal DAPLSE of the address comparator and buffer 80 is at a high level, that is, a TRUE logic level, none of the data buffers in the arithmetic logic subunit ALS and none of the data drivers is enabled and therefore there is no transmission of data signals to any of the peripheral-unit controllers PUCs connected to the multiplexer DMA-MUX. In the embodiment disclosed herein, the address comparator comprises four 2-input-line Exclusive-OR gates and a four-input-line AND-gate. The four address signals received on address bus lines AB03-AB06 are applied respectively to one of the two input lines of the Exclusive-OR gates, the second input lines of which are connected to either +5 volts or ground, depending upon whether or not a jumper is installed. The output lines of the four Exclusive-OR gates are applied to the four-input-line AND-gate. The truth value of the output signal of the AND-gate is TRUE only when the four address signals have the selected combination of truth values that will generate TRUE signals at the output terminal of each of the Exclusive-OR gates.

The address comparator buffer 80 also includes a quadruple D-type flip-flop, such as the Texas Instruments Model 74LS175 described in detail beginning at page 363 of the TI Data Book previously mentioned. This buffer portion of the address comparator and buffer 80 stores the address bits on lines AB00, AB01, and AB02 for use during the data transfer operation associated with a specified peripheral-unit controller. Another input signal to the buffer portion of address comparator and buffer 80 is the out-data signal OUTD generated by the computer unit CU and transferred to the multiplexer DMA-MUX over the control bus C-BUS.

Two lines of the address bus, namely, AB01 and AB02 are connected to the address comparator and buffer 80 to transfer two signals, or bits, the truth states of which correspond to the address of a selected peripheral-unit controller that is connected to a selected peripheral unit PU. The signal on address bus line AB00 is a function code indicating whether the transfer about to take place between the computer unit CU and the selected peripheral-unit controller PUC is a transfer of data signals or of control signals.

The above described components of address comparator and buffer 80 are not shown in FIG. 7C, but their interconnection and operation are more than adequately described to enable one of ordinary skill in computer circuit arts and logic circuit arts to practice this invention. In fact, this is true of all portions of the invention shown in block form in the accompanying drawings.

The buffer portion of the address comparator and buffer 80 generates output signals which are transferred to a 2-to-1 multiplexer 94 in the interrupt logic subunit ILS. The 2-to-1 MUX 94 receives two sets of coded signals, one set from the address comparator and buffer 80 in the address-decoder and control-logic subunit ADCL and another set from the interrupt channel priority encoder within the interrupt logic subunit ILS, as will be discussed below. The 2-to-1 MUX 94 produces output signals that correspond either to the input signals from the address comparator and buffer 80 or to the interrupt channel priority encoder depending upon the truth state of a selection signal ROM3 transferred from the distributor microengine subunit DMS. When the selection signal ROM3 causes the output signals of the 2-to-1 MUX 94 to correspond to the output signals of the address comparator and buffer 80, those output signals of the 2-to-1 MUX 94 correspond to the address of the peripheral-unit controller channel selected by the computer unit CU in accordance with the software program. The output signals of the 2-to-1 MUX 94 are transferred to channel decoder 82 in the address-decoder and control-logic subunit ADCL. Two coded signals, corresponding to either a controller that has generated an interrupt signal or a controller being addressed by the computer unit CU, are decoded to generate four channel signals, each corresponding to one of the respective peripheral-unit controllers to which the multiplexer DMA-MUX may be connected. Channel decoder 82 may be a Texas Instruments Model 74S139 decoder which is described in substantial detail beginning at page 274 of the TI Data Book.

The output signals of the channel decoder 82 are transferred to the tri-state channel control drivers 84 to generate amplified control signals corresponding to a selected peripheral-unit controller PUC for the data transfer operation taking place. Other input signals to the channel control drivers 84 include the control enable signals generated in ROM array 40 of the distributor microengine subunit DMS. These control enable signals enable the appropriate driver corresponding to the particular control signal to be transferred at that time. A reset signal RST transferred directly from the computer unit over the control bus CB to the channel control drivers 84, permits resetting of the channel control drivers in response to a reset switch at the control console CC of the computer unit CU or at the beginning of a software program sequence when all multiplexer DMA-MUX circuits are usually reset for initiation of a data transfer operation. The reset signal RST also clears the output flag OUTFLG and the direct-memory-access flag signal DMAFLG.

The address comparator and buffer 80 also produces a plurality of output signals which are transferred to an in-decoder 86. The in-decoder 86 generates data-in control signals IND and status control signals STAT respectively, which are transferred without substantial delay to the respective peripheral-unit controllers to strobe either data signals or status signals onto the input/output bus IOB. The in-decoder 86 may be a read-only memory unit, such as a Texas Instruments Model 74S288 having tri-state output capability. Control signals IND0 through IND3 and STAT0 through STAT3 are generated in this direct manner, separately from other control signals, so that the computer unit CU may request input data or status information from a selected peripheral-unit controller without any substantial delay within the multiplexer DMA-MUX.

The portions of the address-decoder and control-logic subunit ADCL described above, are similar to the corresponding subunit of the indirect-memory-access multiplexer IMA-MUX described in Applicants' prior applications. The respective purposes are essentially the same, namely, to provide means to "recognize" address bits or address signals transferred from the computer unit CU to the multiplexer DMA-MUX over the address bus AB, which address signals correspond to that particular multiplexer and to a particular peripheral-unit controller to which that multiplexer is connected. They also provide means for generating channel signals and control signals to control signal transfer to the appropriate peripheral-unit controller in accordance with the software program. However, unlike the address-decoder and control-logic subunit of the multiplexer IMA-MUX, the address-decoder and control-logic subunit ADCL of the direct-memory-access multiplexer DMA-MUX, also includes memory address registers 88 and memory address drivers 90 which are used to transfer address information over the address bus AB back to the computer unit CU to address locations in the main-memory unit MMU during direct-memory-access data transfers.

There are two sets of memory address registers in memory address register 88, namely, address register 1, ADR1, and address register 2, ADR2. Each such set is an 8-bit device, such as a Texas Instruments Model 74LS273 Octal D-type flip-flop which is described beginning at page S260 of the TI Supplement. The data input signals to the memory address registers 88 are transferred from the result bus R-bus of the arithmetic logic subunit ALS. One of the address register sets is loaded with the most significant byte MSB and the other is loaded with the least significant byte LSB. The two bytes combined form a 15-bit address and a sixteenth signal SLB which indicates whether the upper or lower byte in the main-memory unit MMU is being addressed.

These two registers, which comprise memory address registers 88, are loaded with one byte at a time in accordance with the control signals load address register 1 LDADR1 and load address register 2 LDADR2, both of which are generated by the ROM array 40 in the distributor microengine subunit DMS. The sixteen bits are transferred to the computer unit at one time when the enable bus signal ENBUS, generated in the DMA logic subunit DMAL, is in a truth state of TRUE. This address signals transfer operation is accomplished by means of memory address drivers 90. The memory address drivers 90 are a plurality of tri-state drivers, such as National Semiconductor Model 8098.

In summary, the address-decoder and control-logic subunit ADCL of the direct-memory-access multiplexer DMA-MUX provides means for recognizing a multiplexer address, for determining the peripheral-unit controller channel being addressed during a data signal or control signal transfer operation, and also for transferring both bytes of an address word to the computer unit CU and the main-memory unit MMU for addressing specific memory cell locations within the main-memory unit.

Interrupt Logic Subunit

The interrupt logic subunit ILS is shown in FIG. 7C immediately below the address-decoder and control-logic subunit ADCL.

As shown on the right side of FIG. 7C, two sets of lines IL1 and IL2 are employed by the multiplexer DMA-MUX to receive interrupt signals from the peripheral-unit controllers over the input/output buses IOBs. Since each peripheral-unit controller PUC can generate two interrupt signals, namely, a data-service-interrupt signal I1 and an end-of-block interrupt signal I2, there are a total of eight lines, four IL1 lines from four peripheral-unit controllers for transferring data-service-interrupt signals and four IL2 lines from four peripheral-unit controllers for transferring end-of-block interrupt signals.

The two sets of four interrupt signals I1 and I2 are each applied to interrupt-channel-priority encoder 92. Interrupt-channel-priority encoder 92 generates a unique 3-bit address which corresponds to one of the peripheral-unit controllers that has generated an interrupt signal and which also corresponds to whether the signal generated is a data-service-interrupt signal, or an end-of-block interrupt signal.

When two or more interrupt signals are transferred to the multiplexer DMA-MUX and are present at the input lines to the DMA-multiplexer concurrently, the priority encoder 92 generates an address corresponding to the peripheral-unit controller channel having the highest priority interrupt signal. Thus, the priority of peripheral units is established by the physical order in which the respective peripheral-unit controllers are connected to the multiplexer DMA-MUX. The order of priority among the peripheral units connected to a particular multiplexer, is easily changed by simply changing the physical order in which the connector plugs of the respective input/output buses IOBs are connected to the respective mating plugs on the multiplexer printed circuit board.

In the present embodiment, the connection sequence results in channel zero having the highest priority for interrupt signals and channel three having the lowest priority for interrupt signals. Furthermore, the connecting configuration gives all data-service-interrupt signals priority over all end-of-block interrupt signals. Therefore, if any of the data-service-interrupt lines is activated by an interrupt signal produced by any one of the peripheral-unit controllers connected to the multiplexer DMA-MUX, that data-service-interrupt signal I1 is processsed before the computer unit CU may respond to any simultaneously transmitted end-of-block interrupt signal I2.

The interrupt-channel-priority encoder 92 generates two sets of signals. One set indicates whether the pending interrupt is a data-service-interrupt signal I1 or an end-of-block interrupt signal I2. This set of signals is transferred to the test-tree logic circuit 36 of the distributor microengine subunit DMS. The second set of signals generated by the interrupt-channel-priority encoder 92 comprises the interrupt channel code which indicates which particular peripheral-unit controller channel is generating an interrupt signal. This set of signals is transferred to the 2-to-1 MUX 94 within the interrupt logic subunit ILS. As previously indicated in conjunction with the discussion of the address-decoder and control-logic subunit ADCL, a second set of input signals to the 2-to-1 MUX 94 is the addressed channel code derived from the address comparator and buffer 80 in the address-decoder and control-logic subunit ADCL.

By means of the test-tree logic circuit 36, the ROM array 40 can detect the presence of pending interrupt signals. In response, it generates a ROM3 signal of the proper truth state to cause the 2-to-1 MUX 94 in the interrupt logic subunit ILS to transfer the interrupt channel code to its output terminals. The output terminals of the 2-to-1 MUX 94 are connected to the control signal channel decoder 82 in the address-decoder and control-logic subunit ADCL. They are also connected to the file storage unit 30 in the arithmetic logic subunit ALS and also to the test-tree logic circuit 36 in the distributor microengine subunit DMS. The output signals of the 2-to-1 MUX 94 are also connected to the interrupt channel register 96 which stores interrupt channel signals temporarily before they are applied to the vector address drivers where they become part of the interrupt vector address during end-of-block interrupt signal processing. The output signals INTVEC1 and INTVEC2 of the interrupt channel register 96 are also transferred to the distributor microengine subunit DMS as input signals to test-tree logic circuit 36.

Interrupt channel register 96 also generates an interrupt pending signal INTPEND that is used as a flag signal within the interrupt logic subunit ILS in a mann to be described below and that is also transferred to test-tree logic circuit 36 in the distriutor microengine subunit DMS to signal the presence of a pending end-of-block interrupt signal ready for servicing by the central processor unit CPU.

Vector address drivers 98 receive signals from the interrupt channel register 96 and from the strapped interrupt vector connector 106. The strapped interrupt vector signals and the channel coded interrupt vector signals are combined to form a complete vector address. The complete vector address is transferred over the data bus DB to the computer unit CU in response to an end-of-block interrupt signal when the vector address drivers 98 are enabled by the interrupt request circuit 104, as will be explained below.

The remaining interrupt logic circuitry represented in FIG. 7C, includes an interrupt enable circuit 100, an interrupt synchronization circuit 102, and an interrupt request circuit 104.

Interrupt signal addresses are not accepted by the computer unit CU until the multiplexer DMA-MUX generates an interrupt request signal IUR which is transferred to the computer unit and until the computer unit generates an interrupt address request signal IAR which is transferred to the multiplexer. The computer unit CU issues an enable signal INTE to the interrupt enable circuit 100 over address bus line AB12 after the computer unit has processed any prior end-of-block interrupt signal. However, the computer unit CU may also be programmed by means of software to selectively enable and disable the interrupt enable circuit 100, according to which peripheral-unit controllers are generating interrupt signals. In this way, selected interrupt signals can be masked or ignored in accordance with software programming.

When the interrupt enable circuit 100 is enabled by the computer unit, it generates an output signal IECO which is applied to the interrupt synchronization circuit 102. The interrupt synchronization circuit 102 will in turn generate an output signal ISCO if the interrupt pending signal INTPEND has been transferred by the interrupt channel register 96. The interrupt synchronization circuit 102 generates the output signal ISCO which is transferred to the interrupt request circuit 104. The interrupt request circuit 104 will then, and only then, generate an interrupt request signal IUR at its output terminal. The interrupt request signal IUR is transferred onto a common interrupt request line that is part of the control bus CB. The interrupt request signal is, in effect, a signal employed by the multiplexer DMA-MUX to "notify" the computer unit CU that an end-of-block interrupt signal has been generated by a peripheral-unit controller and is available for processing by the computer unit. If two or more peripheral-unit controllers PUCs, each connected to a different multiplexer, generate interrupt signals at about the same time, the computer unit CU recognizes the highest priority multiplexer that has received an interrupt signal and that has generated an interrupt request signal IUR.

Thus, in addition to the interrupt priority system established for multiple interrupt signals generated by a plurality of peripheral-unit controllers, each of which is connected to the same multiplexer DMA-MUX, there is also an external priority system established for a plurality of multiplexers or for other combinations of input/output systems, some of which do not use a distributed input/output system DIOS, some of which use a multiplexer of the IMA type, such as IMA-MUX, and some of which use a multiplexer of the DMA type, such as DMA-MUX. By being dependent upon the external priority system, the interrupt request signal IUR is recognized by the computer unit CU only when higher priority input/output devices are not generating interrupt signals. Furthermore, when the multiplexer generates an interrupt request signal IUR, all lower priority device interrupt circuitry is disabled by the higher priority multiplexer DMA-MUX.

Shortly after the interrupt request signal IUR is generated, the computer unit CU accepts the interrupt address signals on the data bus DB and it is during this time that the interrupt address signals are directed or vectored to preselected addresses in the main-memory unit MMU.

The memory cells in the main-memory unit MMU, to which the particular interrupt has been vectored, contain signals representing information which has been preprogrammed to provide a sequence of instructions.

Unlike the indirect-memory-access multiplexer IMA-MUX, which has been described in detail in Applicants' prior applications, and in which the interrupt logic subunit includes means for processing all interrupt signals, that is, end-of-block interrupt signals as well as data-service-interrupt signals, the interrupt logic subunit ILS of the direct-memory access multiplexer DMA-MUX processes interrupt signals for transfer of a vector address to the computer unit by means of the data bus DB only when those interrupt signals are end-of-block interrupt signals. Unlike the indirect-memory-access multiplexer IMA-MUX, the direct-memory-access multiplexer DMA-MUX processes data-service interrupt signals internally. Accordingly, the interrupt logic subunit of the DMA-MUX communicates directly with the computer unit CU only in conjunction with end-of-block interrupt signals. Unlike the Applicants' prior disclosed multiplexer, which is an indirect-memory-access type, the direct-memory-access multiplexer of this invention utilizes the distributor microengine subunit DMS for the processing of data-service interrupt signals. This difference arises from the fact that the transfer of data between a peripheral unit and the main-memory unit of the computer unit, is accomplished by means of direct access to the memory unit and does not involve the central processor unit CPU for each transfer operation.

Thus, when a data-service interrupt signal I1 is received from a peripheral-unit controller, information indicating the channel of the peripheral-unit controller from which the interrupt signal was received and the fact that such an interrupt signal is present, is conveyed by the interrupt logic subunit ILS to the distributor microengine unit DMS in response thereto. In accordance with its firmware program, the distributor microengine subunit DMS generates control signals which cause interrupt vector address signals to be transferred directly to the main-memory unit MMU over the address bus AB. Each time a peripheral-unit controller generates a data-service interrupt signal, an Auto I/O block for that controller, which is temporarily stored in the file storage unit 30 designated for that peripheral-unit controller, is updated as the data transfer operation progresses. Accordingly, each time a peripheral-unit controller generates a subsequent data-service interrupt signal, the buffer address portion of the Auto I/O block for that particular peripheral-unit controller is updated to address the subsequent memory location in the main-memory unit MMU.

Each time a peripheral-unit controller generates a data-service interrupt signal or an end-of-block interrupt signal that is serviced by the multiplexer and computer unit respectively, that interrupt signal is reset by means of a command signal CMD transferred from the multiplexer to the peripheral-unit controller over the input/output bus IOB. In the indirect-memory-access multiplexer IMA-MUX, the command signal CMD, used to reset the interrupt signals at the respective peripheral-unit controllers, is generated in the interrupt logic subunit ILS. In the invention disclosed herein, namely, the direct-memory-access multiplexer DMA-MUX, resetting command signals CMD are generated by the distributor microengine subunit DMS in accordance with the firmware microcode, programmed into the ROM array 4C.

In the multiplexer IMA-MUX, the central processor unit CPU responds to the operation to be performed and transfers data signals, previously stored in the main-memory unit MMU, to the selected peripheral-unit controller PUC. After each data transfer, the buffer address pointer is incremented and the transfer count is decremented by the central processor unit CPU. When the transfer count equals zero, indicating that the last term of a particular data block has been transferred, the central processor unit CPU is programmed to fetch an instruction from the main-memory unit, which causes generation of a double-duration command signal CMD to reset the interrupt signal in the appropriate peripheral-unit controller. However, this process of transferring data signals into or out of the computer unit using programmed Auto I/O instructions, including buffer pointers and transfer counts, is performed in a different manner in the direct-memory-access multiplexer DMA-MUX of this invention. In the direct-memory-access multiplexer DMA-MUX, the above described operation of the central processor unit CPU is performed within the multiplexer. The process of incrementing the buffer address pointer and decrementing the transfer count as each term of data is transferred into or out of the main-memory unit MMU, is accomplished within the multiplexer DMA-MUX. Accordingly, the data-service interrupt signals I1 are processed entirely within the multiplexer DMA-MUX by means of the distributor microengine subunit DMS operating in conjunction with the arithmetic logic subunit ALS and other subunits of the multiplexer DMA-MUX.

General operation per se and configuration per se of the computer unit CU that relate to interrupt signal processing and the use of automatic input/output instructions within a computer unit, are old in the computer art and are not to be considered necessarily within the scope of the invention. Therefore, a detailed description of interrupt signal processing and automatic input/output instructions that are generated in response thereto within the computer unit CU, is not included herein. Such detailed descriptions are available, however, from digital computer manufacturers. One such detailed explanation may be found in sections 4 and 8 of a document entitled "NAKED MINI LSI SERIES COMPUTER HANDBOOK" No. 91-20400-00AZ, October, 1974, published by Computer Automation, Inc. of Irvine, Calif. Additional explanation of automatic input/output instruction processing by a computer unit may be found in chapter 13 of "Computer Technicians Handbook" by Bryce Ward, published by the Tab Book Co. in 1971. The general concepts of interrupt signal processing and priority interrupt systems are discussed in Chapter 5 of "Minicomputers for Engineers and Scientists" by Granino A. Korn, published by McGraw-Hill, Inc. in 1973.

With respect to end-of-block interrupt signals, the processing of such signals within the interrupt logic subunit ILS of the DMA-multiplexer DMA-MUX, is essentially the same as the processing of all interrupt signals by the interrupt logic subunit of the indirect-memory-access multiplexer described in more detail in Applicants' prior applications. Accordingly, the detailed description of Interrupt Logic in those prior applications, is incorporated herein by reference. Suffice it to say the end result of the processing of interrupt signals by the direct-memory-access multiplexer is the same as the end result by the processing of such signals by the indirect-memory-access multiplexer. The difference resides in the type and location of the circuits in which the processing takes place. In both cases, the command signal CMD is generated by the multiplexer to serve the purpose of resetting a peripheral-unit controller interrupt signal. This command signal CMD is 250 nanoseconds in duration, that is, one machine cycle, for the purpose of resetting data-service-interrupt signals and 500 nanoseconds in duration, that is, two machine cycles, for resetting data-service-interrupt signals after a final byte of data has been transferred.

Direct-Memory-Access Logic Subunit

The direct-memory-access logic subunit DMAL is the subunit of the direct-memory-access multiplexer DMA-MUX that is used to acquire access to the main-memory unit MMU by communicating with the computer unit CU and by transferring and receiving the required control signals for enabling a direct transfer of data signals into or out from the main-memory unit.

In order to initiate a direct-memory-access operation, the direct-memory-access logic subunit DMAL acquires control over the main buses MB of the computer unit. The signals involved in main bus acquisition include the stop processor signal STOP and the stop acknowledge signal SACK.

When a direct-memory-access operation is about to take place, the direct-memory-access logic subunit DMAL drives the stop signal STOP TRUE. The central processor unit CPU responds to a TRUE stop signal and immediately begins preparing to relinquish the control of the main buses MB. After performing required internal housekeeping associated with relinquishing its control over the main buses MB, the central processor unit CPU drives the stop acknowledge signal TRUE.

Once the stop acknowledge signal SACK becomes TRUE, the multiplexer DMA-MUX is free to commence a transfer operation directly with the main-memory unit MMU. Repeated transfers with the main-memory unit using direct-memory-access, is accomplished on a request basis wherein control of the main buses MB by the direct-memory-access logic subunit DMAL is maintained as long as there are communications pending with the main-memory unit MMU. Otherwise, it releases the stop signal STOP when the current operation is completed as signaled by the trailing edge of the memory acknowledge signal MACK transferred from the computer unit CU to the multiplexer DMA-MUX by means of the control bus CB.

Once control over the main buses MB is acquired by the direct-memory-access logic subunit DMAL, the multiplexer DMA-MUX may then commence either a read operation in which data stored in selected locations in the main-memory unit MMU is read out to be transferred to a peripheral unit, or a write operation in which data is transferred from a peripheral unit into selected locations in the main-memory unit. For a read operation, the direct-memory-access logic subunit DMAL first generates an enable bus signal ENBUS that is transferred to the address-decoder and control-logic subunit ADCL where it enables the memory address drivers 90 (see FIG. 7B). This places the desired memory unit address on the address bus AB. Subsequently, the memory start signal MST is driven to a TRUE truth state and the read signal RD is also driven TRUE. The main-memory unit begins execution of a memory cycle when the memory start signal MST becomes TRUE and after it has finished any previous operation. When the addressed location of the main-memory unit has been accessed, the contents of the addressed memory location are placed on the data bus DB and the memory acknowledge signal MACK becomes TRUE. The data on the data bus DB remains stable until the memory start signal MST goes FALSE.

Upon receiving the memory acknowledge signal in its TRUE truth state, the direct-memory-access logic subunit DMAL is free to disengage the address bus AB. After allowing for the settling time of the data bus DB, that is, the time for signals on the data bus to become stable, data signals on the data bus DB are strobed into the DMA buffer 24 in the arithmetic logic subunit ALS. If no further communications with the main-memory unit by means of the multiplexer DMA-MUX are pending, the memory start signal MST and the read signal RD are both changed to a truth state of FALSE. The main-memory unit changes the truth state of the memory acknowledge signal MACK on the trailing edge of the memory start signal MST and disengages the data bus DB on the trailing edge of the memory start signal MST or on the trailing edge of the read signal RD, whichever occurs first. Furthermore, the direct-memory-access logic subunit DMAL changes the truth state of the enable bus signal ENBUS to FALSE, thus disabling the memory address registers in the address-decoder and control-logic subunit and disengaging the address bus AB.

A write access sequence is similar to a read access sequence except that the read signal RD is held FALSE and data signals to be written into the main-memory unit are presented to the address memory location at the same time the memory start signal MST is generated. A write access operation is started by placing the memory unit address signals on the address bus AB. Subsequently, the memory start signal MST is driven TRUE, but the read signal RD is held in a FALSE state. Data signals to be written into the memory location addressed are then gated onto the data bus by enabling the input buffer 10 in the data transfer subunit DTS. The main-memory unit MMU indicates acceptance of the data being written into it by driving the memory acknowledge signal MACK to its TRUE state. When the memory acknowledge signal MACK then goes FALSE, the address bus AB and data bus DB are disengaged and the memory start signal MST is changed to a FALSE state. The memory acknowledge signal MACK then goes FALSE on the trailing edge of the memory start signal MST.

More detailed discussions of the timing relations of the signals employed in direct-memory-access transfers in one example of a typical computer unit, are provided in Section 8 of "Naked Mini LSI Series Computer Handbook" 91-20400-00A2, October 1974, published by Computer Automation, Inc., of Irvine, Calif.

Figure 10:
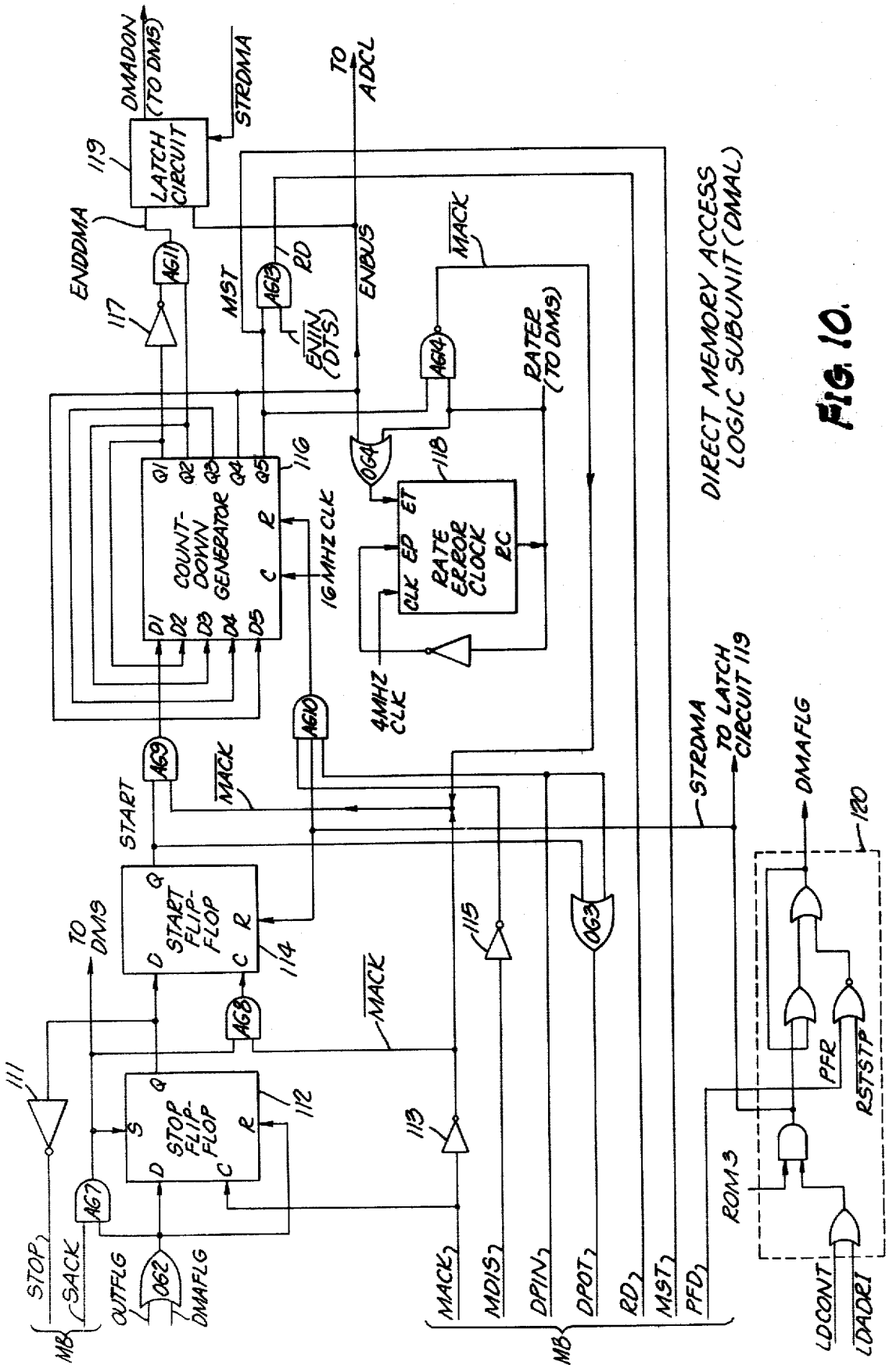
FIG. 10 is a detailed schematic block diagram of the direct-memory-access-logic circuits of this invention.

FIG. 10 is a block diagram of the direct-memory-access logic subunit DMAL indicating the means by which the stop process signal STOP, the stop acknowledge signal SACK, and the various other signals used in communicating with the computer unit CU and main-memory unit MMU are used during a memory acquisition cycle.

Generally, the direct-memory-access logic subunit DMAL consists of the following major components: A stop flip-flop 112; a start flip-flop 114; a count-down generator 116; a rate error clock 118; and a DMA reset and start logic circuit 120. This latter circuit 120 includes a plurality of logic gates used to respond to the various signals from the distributor microengine subunit DMS to initiate a DMA access operation. Various other logic gates and inverters are used throughout the direct-memory-access subunit DMAL for purposes which will become apparent with the description of FIG. 10, which follows.

At this point it is helpful to refer back to Table III and to note particularly the relevant signals on the control bus CB that play a part in the operation of acquiring and maintaining control of the main buses MB for a direct-memory-access operation.

Prior to a signal transfer operation, the computer unit CU generates a signal that by its truth state, indicates whether control signals or data signals are to be transferred to a peripheral unit. This indication is the truth state of a function code signal on address bus line AB00. In response thereto, the buffer portion of the address comparator and buffer 80 in the address-decoder and control-logic subunit ADCL generates a TRUE outflag signal OUTFLG. The outflag signal OUTFLG is one input signal to OR-gate OG2 shown at the upper left-hand corner of FIG. 10. The other input signal to OR-gate OG2 is the direct-memory-access flag signal DMAFLG. The direct-memory-access flag signal DMAFLG is generated by the DMA reset and start logic circuit 120 shown at the lower left-hand portion of FIG. 10. This signal DMAFLG is generated in response to a combination of a TRUE load control signal LDCONT, a TRUE load address register 1 signal LDADR1, and a TRUE ROM signal ROM3. This combination indicates that the direct-memory-access multiplexer DMA-MUX is ready to address a specific location in the main-memory unit MMU to either write in or read out information during a transfer operation. In other words, the most significant and least significant bits of the memory unit address have been loaded in the memory address registers and are ready to be transferred to the main-memory unit. The presence of these three signals at the input terminals to the DMA reset and start logic circuit 12C causes the generation of a start DMA signal STRDMA by the combination of logic gates which forms DMA reset and start logic circuit 120. The start DMA signal STRDMA is applied to the reset terminal of start flip-flop 114 and to one of the three input terminals of OR-gate OG3, the output of which is tied to the reset terminal of countdown generator 116.

If either the outflag signal OUTFLG or the DMA flag signal DMAFLG is TRUE, the output signal of OR-gate OG2 will be TRUE, causing the application of TRUE signals to the data terminal D and reset terminal R of the stop flip-flop 112. The output of OR-gate OG2 is also applied to one input terminal of a two input terminal AND-gate AG7. The other input signal to AND-gate AG7 is the stop acknowledge signal SACK that is transferred on the control bus CB. At first, the output of AND-gate AG7 will be FALSE since the stop acknowledge signal SACK will be FALSE prior to acquisition of the main buses MB by the direct-memory-access logic subunit DMAL.

Upon the application of a TRUE signal to the reset terminal R of stop flip-flop 112, the output terminal Q of stop flip-flop 112 generates a TRUE signal which is applied to the buffer 111 and becomes the stop signal STOP. This stop signal, when TRUE, causes the central processor unit CPU to stop at the completion of its current machine cycle. Subsequently, when the central processor unit CPU does stop and relinquishes control of the main buses MB to the direct-memory-access logic subunit DMAL, it generates a stop acknowledge signal SACK which causes the output signal of AND-gate AG7 to become TRUE.

A TRUE signal at the output terminal of AND-gate AG7 results in a TRUE signal being applied to the set terminal S of stop flip-flop 112 and also to one of the two input terminals of AND-gate AG8, the output of which is connected to the clock terminal of start flip-flop 114. The second input signal to AND-gate AG8, is an inverted memory acknowledge signal $\overline{MACK}$. The output terminal Q of stop flip-flop 112 is connected to the data terminal D of start flip-flop 114 and the output terminal Q of start flip-flop 114 is connected to one input line of a two-input AND-gate AG9, the output terminal of which is connected to the D1 terminal of countdown generator 116. The second input signal to the AND-gate AG9 is the inverted memory acknowledge signal $\overline{MACK}$.

The start DMA signal STRDMA, generated by the DMA reset and start circuit 120, is applied to one input line of a three input line AND-gate AG10. The second input line of AND-gate AG10 is connected to the output of an inverter 115 to which is applied the memory disable signal MDIS. The DMA priority-in signal DPIN is applied to the third input line to AND-gate AG10 which is connected to the appropriate terminal of the control bus CB. If the signals on the three lines forming the input terminals to AND-gate AG10 are all TRUE, the output signal of AND-gate AG10 is TRUE, thus enabling the countdown generator 116.

At the start of a DMA cycle, either the DMA flag signal DMAFLG or the outflag signal OUTFLG are in their TRUE states. As a result, the stop signal is generated and upon completion of its current machine cycle, the central processor unit CPU generates a stop acknowledge signal SACK. Furthermore, a TRUE start DMA signal STRDMA resets start flip-flop 114. As a result, the start flip-flop 114 generates a start signal START which is applied to AND-gate AG9. The output signal of AND-gate AG9, when TRUE, initiates the operation of countdown generator 116 by driving the signal at terminal D1 TRUE. Thus, either the DMA flag signal or the outflag signal initiate acquisition of control of the main buses MB, and the start DMA signal STRDMA initiates a direct-memory-access cycle.

As shown in FIG. 10, the output terminal Q1 of countdown generator 116 is connected to the data terminal D2, output terminal Q2 is connected to the data terminal D3, and so on, whereby output terminals Q4 and Q5 present output pulses having a TRUE truth state only after a predetermined period of time subsequent to the application of a TRUE signal at data terminal D1. This predetermined period of time between the application of a TRUE signal at terminal D1 and the generation of a TRUE signal at output terminals Q4 and Q5, is a function of the clock rate which in this case is a 16 megaHertz clock signal generated in the clock signal generator GEN. Since the period of a 16 megaHertz clock signal is approximately 67 nanoseconds, that 67 nanosecond period will be the period between generation of TRUE output signals at Q1 and Q2 and also between the time TRUE output signals are generated between terminals Q2 and Q3, and so on. Accordingly, the total time delay between the generation of a TRUE signal at output terminal Q1 and generation of a TRUE signal at output terminal Q4 is about 200 nanoseconds and the equivalent period for the difference between the time a TRUE signal is generated at terminal Q1 and at terminal Q6 is about 267 nanoseconds.

The Q1 and Q2 output terminals of countdown generator 116 present signals that are applied to inverter 117 and also to AND-gate AG11. The output of AND-gate AG11 is the end DMA signal ENDDMA. The output signal of the countdown generator 116 at output terminal Q4, is the enable bus signal ENBUS. The enable bus signal is transferred to the address-decoder and control-logic subunit ADCL to enable memory address drivers to transfer address signals to the main-memory unit MMU. The output signal of countdown generator 116 at output terminal Q5, is the memory start signal MST. The signals appearing at output terminals Q4 and Q5 are input signals to AND-gate AG13 along with a third signal, the enable-in not signal $\overline{ENIN}$, which is transferred to the direct-memory-access logic subunit DMAL from the data transfer subunit DTS. The output signal of AND-gate AG13 is the read signal RD.

The DMA priority in signal DPIN is applied to AND-gate AG10 and must be TRUE for the countdown generator to be enabled. As previously indicated, the DMA priority-in signal DPIN is TRUE only when no higher priority DMA device has acquired the main buses MB. The DMA priority-in signal DPIN is also applied to one input of OR-gate OG3. The second input signal to OR-gate OG3 is the start signal START. Accordingly, as long as no higher priority DMA devices have access to the main buses MB and the direct-memory-access logic subunit DMAL of the multiplexer DMA-MUX does have access to the main buses MB, the output of OR-gate OG3 will be TRUE corresponding to a TRUE DMA priority-out signal DPOT. This signal, in its TRUE state, prevents all lower priority DMA devices from acquiring access to the main buses MB until all higher priority DMA devices, including the direct-memory-access logic subunit DMAL of multiplexer DMA-MUX, have vacated that access.

Each time a direct-memory-access sequence is performed in which the enable bus signal ENBUS and memory start signal MST are generated either to read data out of the memory unit or to write data into the memory unit, the memory unit acknowledges that the data has been accepted in a write mode or is on the data bus DB during a read mode. This acknowledgement is in the form of the memory acknowledge signal MACK. Receipt of the memory acknowledge signal MACK inhibits the output signals of start flip-flop 114 and countdown generator 116 until a new start DMA signal STRDMA is applied to restart the cycle of acquiring access to and using the main buses MB. This cycle is referred to as the DMA cycle. The purpose of rate error clock 118 is to generate this resetting memory acknowledge signal after a predetermined period of time has elapsed without receipt of a memory acknowledge signal. In the present embodiment, rate error clock 118 is enabled to begin its counting sequence when the enable bus signal ENBUS is driven to a TRUE logic state. From the time it is enabled, four microseconds may elapse before the rate error clock 118 generates a TRUE ripple carry signal or at its ripple carry output terminal RC. If, before the elapse of that four microsecond period, the enable bus signal ENBUS is reset as a result of a memory acknowledge signal MACK having been received from the main-memory unit, the rate error clock is reset and plays no role in the direct-memory-access cycle. If, on the other hand, the enable bus signal ENBUS is not reset within the four microsecond period, the rate error clock 118 will, after the elapse of the four microsecond period, produce a TRUE output signal at its ripple carry output terminal RC. This output signal is the rate error signal RATER.

The rate error signal RATER is applied to one input terminal of two input AND-gates AG14, the second input signal to which is the memory start signal MST available at output terminal Q5 of countdown generator 116. The output signal of AND-gate AG14 is applied to the same lines to which the memory acknowledge signal MACK is applied and thus serves as a substitute memory acknowledge signal which resets the start flip-flop 114 and countdown generator 116 as if a genuine memory acknowledge signal MACK had been received. The rate error signal RATER is applied to the test tree-logic circuit 36 of the distributor microengine subunit DMS to signal the distributor microengine subunit that no memory acknowledge signal has been received from the main-memory unit after a waiting period of four microseconds, as previously described. This will occur if a nonexistent portion of memory has been addressed by the multiplexer DMA-MUX. The rate error signal is also applied to one input line of OR-gate OG4. The enable bus signal ENBUS is applied to the other input line of OR-gate OG4, the output line of which is connected to the enable terminal ET of the rate error clock 118. This circuit enables the ripple carry output signal of the rate error clock 118 whenever either of the two input signals to OR-gate OG4 are TRUE and permits a duration for the rate error signal RATER greater than the duration of the enable bus signal ENBUS.

In summary, the direct-memory-access subunit DMAL is a device which acquires control of the main buses MB for a period sufficiently long to transfer address signals and data signals to the main-memory unit MMU in the computer unit CU.

Figure 7D:
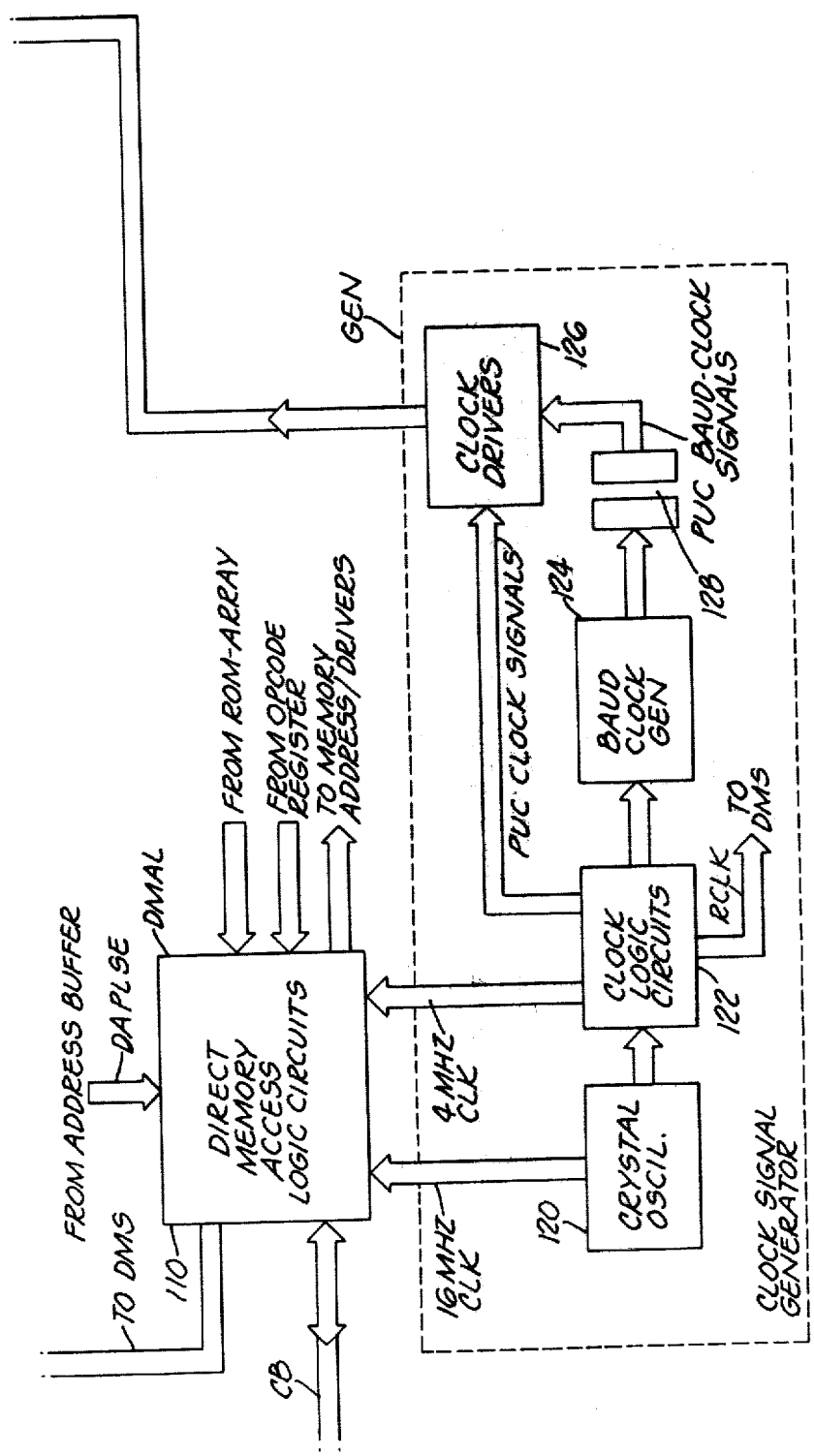

The clock signal generator GEN is shown generally in FIG. 7D. The clock signal generator GEN includes a 16 mHz crystal oscillator 120, clock logic circuits 122, baud clock generator 124, clock drivers 126, and a baud clock signal jumper plug 128. Crystal oscillator 120 produces a stable, accurate 16 megaHertz clock signal that is applied to the direct-memory-access logic circuits as previously discussed, and is also transferred to the clock logic circuits 122. Clock logic circuits 122 employ a hexagonal D-type flip-flop in a countdown generator configuration to generate a four megaHertz clock signal used throughout the multiplexer DMA-MUX, a four megaHertz ROM clock signal RCLK transferred to the distributor microengine subunit DMS, and another four megaHertz signal CLK transferred to the peripheral-unit controllers by means of clock drivers 126 and the input/output buses IOBs. One such flip-flop suitable for use in clock logic circuits 122, is a TI Model SN74S174 Hexagonal D-Type Flip-Flop with clear described at page 363 of the TI Data Book. This four megaHertz squarewave signal CLK is used as the basic block signal in all peripheral-unit controllers PUCs.

Another 4 mHz output signal of clock logic circuits 122 is transferred to the baud clock generator 124 where a plurality of different frequency baud signals is generated by means of counters configured for dividing frequencies in accordance with well known techniques. These baud signals have frequencies in the range of 75 Hertz to 9600 Hertz. They are applied to jumper plug 128 where they may be selected in accordance with jumper wires and transferred to clock drivers 126 for transfer to the serial-peripheral-unit controllers SPUCs connected to the multiplexer DMA-MUX.

SUMMARY OF DMA-DIOS

What has been described herein is a distributed input-/output system that is used to interconnect a digital computer unit and a plurality of peripheral units, wherein each of the peripheral units is connected to a peripheral-unit controller having a read-only memory unit programmed with a firmware microcode that is used to control the transfer of control signals and data signals to and from the peripheral unit. Each of the plurality of peripheral-unit controllers may be connected to a direct-memory-access multiplexer that is in turn connected to the computer unit and is adapted to transfer data signals and address signals directly to the computer unit's memory unit by simulating the operation of the central processor unit of the computer unit.

This direct-memory-access multiplexer DMA-MUX includes a data transfer subunit that controls the transfer of data signals between the peripheral-unit controllers connected to the multiplexer DMA-MUX and the computer unit.

It also includes an arithmetic logic subunit that simulates the arithmetic logic capability of the central processor unit CPU.

Also included is a distributor microengine subunit which is a firmware programmed processor that simulates the control operations of the central processor unit;

an address-decoder and control-logic subunit that controls the decoding of address signals transferred from the computer unit for the transfer of control signals to peripheral-unit controllers, and which also controls the transfer of address signals to the main-memory unit of the computer unit;

an interrupt logic subunit that receives interrupt signals from the peripheral-unit controllers and initiates and controls interrupt signal processing in response to the received interrupt signals;

a direct-memory-access logic subunit that controls the communications with the computer unit for the purpose of acquiring control of the main buses and for providing direct access to the main-memory unit;

and a clock signal generator which generates system clock signals and baud clock signals for use by multiplexer and peripheral-unit controller circuits.

Signal flow between the direct-memory-access multiplexer DMA-MUX and a plurality of peripheral-unit controllers PUCs, is identical to the signal flow between an indirect-memory-access multiplexer and a plurality of peripheral-unit controllers. Therefore, the peripheral-unit controllers need not receive signals that indicate the type of multiplexer to which they are connected. Similarly, the software program used in the computer unit to control input/output operations is the same irrespective of whether the distributor input/output system DIOS employs a multiplexer of the direct-memory-access type or of the indirect-memory-access type. This compatibility is one of the important advantages of the invention herein disclosed because it permits use of either type of multiplexer in conjunction with any compatible computer unit that employs direct-memory-access capabilities. This compatibility feature also permits substitution of one multiplexer type for another, the decision being based solely on the data bandwidth required to communicate with one of more of a plurality of peripheral units.

OPERATION

Before input/output operations involving a distributed input/output system DIOS commence, various portions of the main-memory unit MMU are programmed by employing a peripheral unit that is capable of introducing data into the computer unit and into the main-memory unit. In addition, read-only memory units in microengines in each peripheral-unit controller PUC and in the multiplexer DMA-MUX are programmed by means of firmware microcodes.

Typically, software programming is accomplished by means of an input data device, such as a standard card reader or standard paper-tape reader. Typically, the microcoded firmware is introduced into the microengines by installing read-only memory devices, each programmed either by the manufacturer of the integrated circuit chip constituting the memory device, or by the computer manufacturer, or by an end user of the computer system.

Once the distributed input/output systems are made operational by software programming of the computer unit and by firmware programming of each peripheral-unit controller PUC and each multiplexer DMA-MUX, a user's main-line program may be entered into the computer unit CU by any one of the peripheral units connected to a distributed input/output system that is capable of transferring data into the computer unit. Such devices include a standard tape transport, card reader, a standard paper-tape reader, a teletypewriter, a magnetic unit, or a cathode-ray-tube-terminal unit CRT. Alternatively, a peripheral unit connected directly to the computer unit, and that may have been used to program the main-memory unit for operation of the distributed input/output system, may also be used to enter a user's main-line program into the computer unit.

The foregoing description of the direct-memory-access multiplexer and the distributed input/output system in which it is employed, is sufficient to enable one of ordinary skill in the computer art to assemble a multiplexer of the direct-memory-access type and interconnect it with a digital computer unit and a plurality of peripheral-unit controllers. It is also desirable for the practice of the invention herein disclosed, to know how the distributor microengine subunit may be programmed to perform the functions of controlling the signal flow within the multiplexer and between the multiplexer and the computer unit and between the multiplexer and a plurality of peripheral-unit controllers.

Numerous examples of software programs that may be used in conjunction with digital computers connected to peripheral units by means of this invention, are presented in the "Distributed I/O System User's Manual", 91-53629-00A1 published by Computer Automation, Inc., April 1976. One of the novel features of this invention is that software programs that may be employed for use with this invention are also being employed for use with the indirect-memory-access distributed input/output system disclosed in Applicants' prior applications. Thus, both the direct-memory-access multiplexer DMA-MUX and the indirect-memory-access multiplexer IMA-MUX are compatible with the same digital computers and software programs.

The digital computers with which the disclosed embodiment of this invention may be used, and their operation, are sufficiently described in prior art publications, such as the "NAKED MINI LSI Series Computer Handbook", 91-20400-00A2, published by Computer Automation, Inc., October 1974.

The firmware programming of one embodiment of the invention is disclosed in a series of tables, namely, Tables IV-X, including a program listing presented in Table X. FIGS. 12–28 also serve to provide a description of the operations of the direct-memory-access multiplexer in the form of flow charts which indicate the operation of many of the major program routines included in Table X.

It will be explained below in conjunction with Tables IV-X, that each such operation corresponds to at least one statement in the firmware program and also to at least one set of twenty-four binary signals generated at the output terminals of read-only memory array 40 in the distributor microengine subunit DMS.

As used in this description, the term routine means at least one identified firmware program statement and, more frequently, an identified plurality of firmware program statements in a particular sequence, which when executed in the multiplexer DMA-MUX, carry out a desired operation. Typically, input data transfers and output data transfers involve several such routines. For example, an input data transfer may involve a HOMEP2 routine in which the distributor microengine subunit DMS waits in an "idle loop" for instructions; an INT1 routine in which the distributor microengine subunit DMS responds to a data-service-interrupt signal by ascertaining whether the transfer operation to be performed is an input data transfer or an output data transfer and whether or not the transfer is one utilizing direct-memory-access capabilities; an IN routine to actually accomplish the data transfer operation; and an EOBIN routine to reset the interrupt signal, terminate transfer operations and return the distributor microengine subunit DMS to idle loop to wait for further instructions.

The major routines of one embodiment of a firmware program used in this invention are described below in conjunction with the flow charts of FIGS. 12–28. Each such flow chart includes a line number of Table X indicating where in that table the corresponding statement, or sequence of statements, begins. It will be noted that the flow chart of FIG. 23, namely, the flow chart that represents the IN routine, includes one or more line numbers of Table X for each block in the chart to indicate the particular firmware statements for the operations represented by each such block. This special treatment of the IN routine is for an even more detailed description of that routine in conjunction with the corresponding portion of Table X.

The HOME Routines

The HOME routine is entered from a power-up sequence or from the CPUOUT routine or at the termination of a data-service interrupt sequence that occurred at the end of either the RESET, MODE, SETSPECIAL, PROGRAM OUT, or NODMA1 routines. During the HOME routine, the output flag OUTFLG is reset and the distributor microengine subunit DMS enters the HOMEP1 routine.

The HOMEP1 routine is entered from the HOME routine or from the last microinstruction in the RESET, MODE, SETSPECIAL, PROGRAM OUT, or NODMA1 routines. The HOMEP2 instruction is placed in the accumulator, setting up the idle loop return address for data-service-interrupt processes.

The HOMEP2 routine is also known as the idle loop. The distributor microengine subunit waits in the idle loop until it detects the presence of a data-service-interrupt signal pending, a pending end-of-block interrupt signal, or a pending CPU output signal. If a data-service-interrupt signal is pending, a jump is made to the appropriate data-service routine as specified by that interrupting channel's START wood stored in the appropriate part of the file storage unit. If the output flag is TRUE, the program jumps to the CPU output routine. If an end-of-block signal is pending, the distributor microengine subunit DMS enters the INT2 routine.

Figure 12:
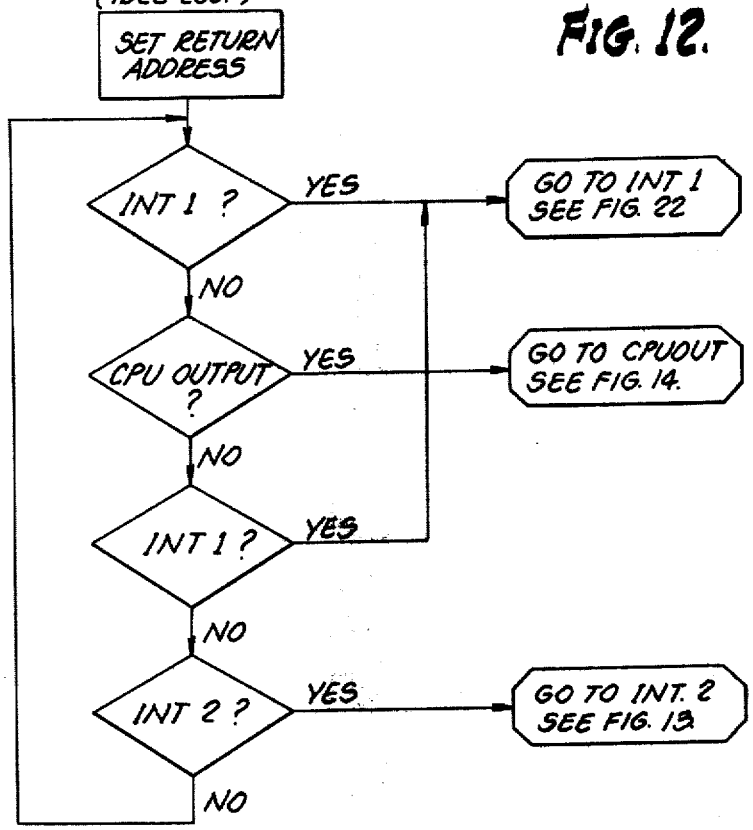

FIG. 12 is a flow chart representation of the operations taking place in the HOMEP2 routine. As indicated, the purpose of this routine is to check the three possible sources of signals that would initiate an operation in the direct-memory-access multiplexer DMA-MUX, namely, data-service-interrupt signals, end-of-block interrupt signals, and signals generated by the central processor unit CPU. This routine is also known as the idle loop in which the program circulates through statements which check whether or not such signals are pending. The first diamond-shaped block (hereinafter called a diamond) represents the statement corresponding to an operation in which a check is made for pending data-service-interrupt signals.

If a data-service-interrupt signal is pending, as indicated by the YES line to the right of the first diamond, the program jumps to an INT1 routine to service the pending data-service-interrupt signal. On the other hand, if no data-service-interrupt signal is pending, the subsequent program operation is the second diamond which corresponds to a check for CPU output signals. It will be understood that the phrase "a signal is pending" means that that signal is in a truth state of TRUE.

If the central processor unit CPU has generated an output signal, as indicated by the YES line to the right of the second diamond, the program jumps to a CPU-OUT routine. On the other hand, if the central processor unit CPU has not generated an output signal, the subsequent program operation is a check, that is, a test for any pending data-service-interrupt signals.

Finally, if neither data-service-interrupt signals nor central-processor-unit output signals are pending, the program performs a check for end-to-block interrupt signals indicated by the bottom diamond in FIG. 12. If an end-of-block interrupt signal is pending, as indicated by the YES line to the right of the bottom diamond, the program jumps to an INT2 routine. If, on the other hand, no end-of-block interrupt signals are pending, the program returns to the initial check for pending data-service-interrupt signals, as indicated by the top diamond in FIG. 12.

INT2 Routine

The distributor microeingine subunit DMS enters an end-of-block interrupt routine, that is, an INT2 routine, when an end-of-block interrupt signal is received from any of the peripheral-unit controllers PUCs. If the CPU interrupt flag INTPEND is set to a TRUE truth state, the distributor microengine subunit DMS returns to the idle loop since it cannot set an additional CPU interrupt signal if one is already pending. If the CPU interrupt flag INTPEND is not set to a TRUE truth state, the updated transfer count and updated buffer address data are restored to the appropriate memory-unit locations. The CPU interrupt flag INTPEND is generated in the interrupt channel register 96 in the interrupt logic subunit ILS, each time an interrupt request signal IUR is generated to signal the central processor unit CPU that an end-of-block interrupt signal needs to be processed. At the end of the end-of-block interrupt routine, a command signal CMD is transferred to the interrupting peripheral-unit controller to clear the EOB-interrupt line by resetting the interrupt signal, and the CPU interrupt flag is set. Before this routine is completed, the data-service-interrupt pending flag I1 is examined by the distributor microengine subunit DMS to ascertain whether or not any data-service-interrupt signals are pending. If a data-service-interrupt signal is pending during the end-of-block interrupt routine, the distributor microengine subunit DMS branches to the routine HOMEP1, aborting the INT2 sequence.

Figure 13:
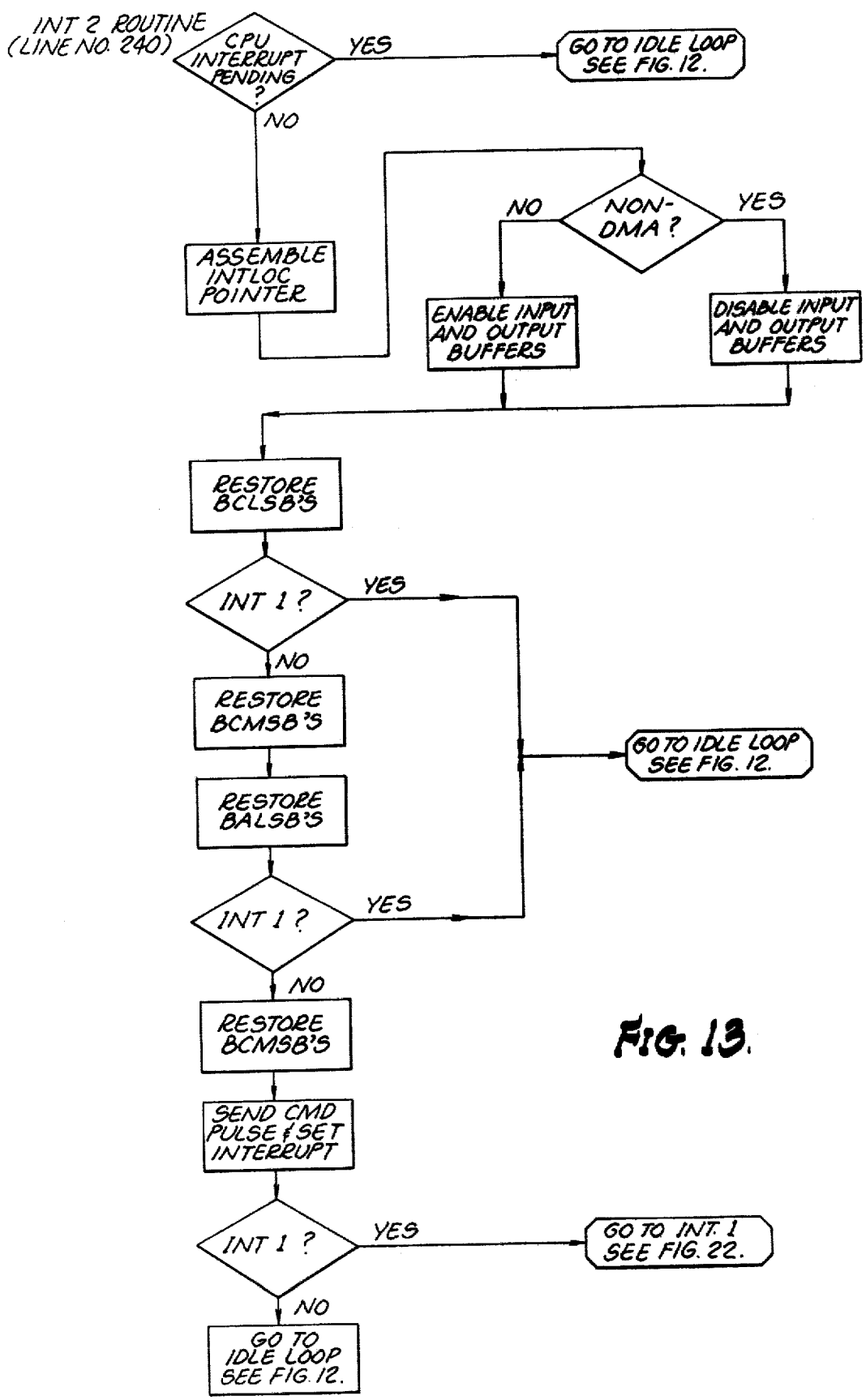

FIG. 13 is a flow chart representation of the operations performed in the INT2 routine, that is, the routine for servicing end-of-block interrupt signals. Because of the higher priority of data-service-interrupt signals as compared to end-of-block interrupt signals, the program intermittently checks for pending data-service-interrupt signals during the operation of the INT2 routine, and aborts the INT2 routine as soon as a pending data-service-interrupt signal is detected. As indicated in FIG. 13, this checking for a pending data-service-interrupt signal is performed three times before the completion of an INT2 routine.

The first step performed in the INT2 routine, as indicated by the top diamond in FIG. 13, is a check for a pending CPU interrupt flag INTPEND. If a CPU interrupt signal is pending, as indicated by the YES line to the right of the top diamond, the program returns to the idle loop, that is, the HOMEP2 routine. If, on the other hand, there is no CPU interrupt signal pending, the next operation performed in the INT2 routine is the operation of assembling the interrupt location pointer, that is, the interrupt vector signals that address the appropriate portion of the main-memory unit for restoration of the Auto I/O block corresponding to a specific peripheral-unit controller PUC. At the completion of this assembly operation, the program then performs a test for DMA operations. This test depends on the truth state of the signal on data bus line DB15 forming part of a command word and stored in the file storage unit 30.

If the transfer being terminated is a non-DMA operation, that is, an indirect-memory-access operation as indicated by the YES line, the next operation is a disabling of both the input buffers 10 and the output buffers 12 in the data transfer subunit DTS (see FIG. 7A). This disabling prevents the output buffers 12 from transferring byte count and buffer address signals to the main-memory unit MMU. On the other hand, if the transfer being terminated is a DMA operation, both the input buffers and the output buffers are enabled. This enables the output buffers 12 to put updated byte count and buffer address data signals on the input/output buses IOBs and thus also applies those data signals to the input terminals of the input buffer 10. Accordingly, enabling the input buffers results in a transfer of those updated signals to the location of the main-memory unit addressed by the assembled interrupt location pointer. This is a "turn-around" process that permits signals on the result bus R-bus to be transferred into the main-memory unit MMU.

The next operation in the INT2 routine is a restoration of the least significant bits of the transfer count into the appropriate portion of the addressed location in the main-memory unit MMU. When this is completed, the program performs another check for pending data-service-interrupt signals. If none are pending, the next operation is the restoration of the most significant bits of the buffer address. When this is completed, the least significant bits of the buffer address are then restored in the main-memory unit MMU. Then another check is made for pending data-service-interrupt signals. If none are pending, the most significant bits of the transfer count are restored in the main-memory unit and then the interrupt resetting command signal CMD is transferred to the selected peripheral-unit controller and the interrupt logic subunit ILS is enabled to indicate to the central processor unit CPU that the servicing of the end-of-block interrupt signal has been completed and that all portions of the Auto I/O block have been restored in the main-memory unit MMU. Then another check is made for pending data-service-interrupt signals and if none are pending, the program returns to the idle loop, that is, the HOMEP2 routine (see FIG. 12).

CPUOUT Routine

The distributor microengine subunit enters a CPU-OUT routine when the outflag has been recognized in a TRUE state, indicating that the central processor unit CPU has executed an output signal to the multiplexer DMA-MUX. In this routine, the distributor microengine subunit DMS checks to see whether or not an output command or an output data instruction was executed and if an output data instruction was executed, the distributor microengine subunit DMS jumps to the POUT routine. If an output data instruction was not executed, the distributor microengine subunit examines data bits DB08, DB09, DB10, DB15, and DB14 of the command word to ascertain what type of operation is to be performed. The distributor microengine subunit DMS then jumps to the appropriate routine. If, however, the examined data bus signals do not correspond to a valid instruction, the distributor microengine subunit jumps to the HOME routine.

Figure 14:
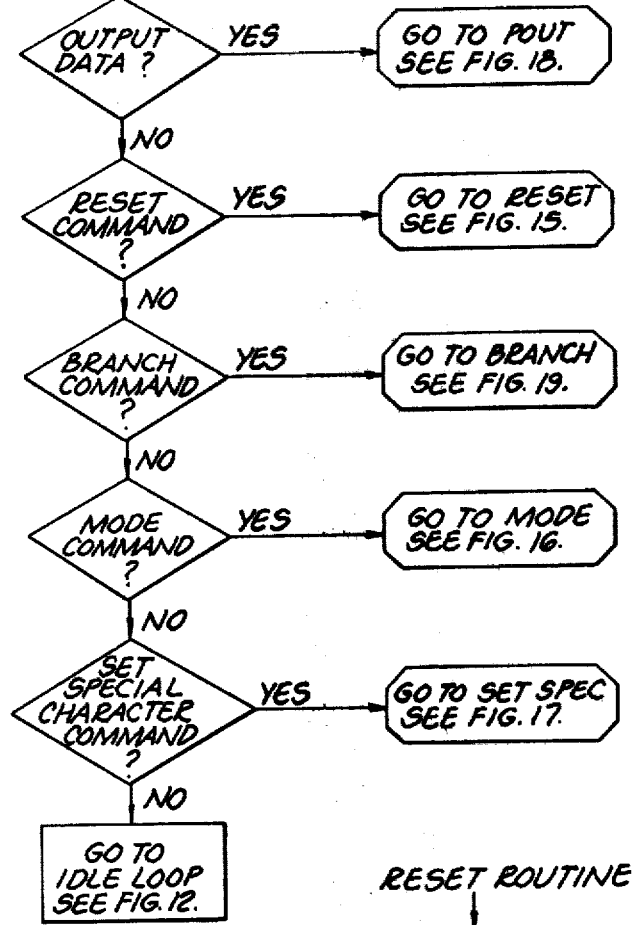

FIG. 14 represents a flow chart description of the CPUOUT routine. As indicated in FIG. 12, the CPUOUT routine is entered from a HOMEP2 routine upon detection of a CPU output signal.

The first operation in the CPUOUT routine is a check for an output data signal, as indicated in the uppermost diamond in FIG. 14. Accordingly, if the signals generated by the central processor unit CPU are data signals as indicated by the YES line to the right of the first diamond in FIG. 14, the program jumps to the POUT routine. On the other hand, if the signals being generated by the central processor unit CPU are control signals, the program then tests the truth state of the reset bit to determine whether or not the computer unit CU has initiated a reset signal. It will be recalled from Table II that the reset signal is on data bus line DB08. If a reset command is indicated, the program jumps to the reset routine as indicated by the YES line to the right of the reset command diamond in FIG. 14. On the other hand, if not reset command is indicated, the program checks for a branch command to determine whether or not a branch address is being issued to a selected peripheral-unit controller. If a branch command is being issued, the program jumps to the branch routine as indicated by the YES line to the right of the branch command diamond in FIG. 14. The way in which branch address signals are utilized within a peripheral-unit controller PUC, is described fully in Applicants' prior applications.

On the other hand, if a branch command is not indicated, the program then checks for mode signals by checking the truth state of the signal on data bus line DB10. If a mode command is indicated, the program jumps to the mode routine as indicated by the YES line to the right of the mode command diamond in FIG. 14. On the other hand, if no mode command is indicated, the program then checks the set special character bit on data bus line DB15 to determine whether or not the central processor unit CPU is setting the special character for comparison with incoming data bytes in conjunction with the selected peripheral-unit controller. If the set special character bit is TRUE, the program jumps to the SETSPC routine, as indicated by the YES line to the right of the set special character command diamond in FIG. 14. However, if the special character bit is FALSE, the CPUOUT routine is terminated and the program returns to the idle loop.

RESET Routine

The distributor microengine subunit DMS enters the reset routine when a reset command is to be executed. The distributor microengine subunit DMS first checks to see whether the peripheral-unit controller PUC that is being reset, has an end-of-block interrupt signal pending. If such a signal is pending, the interrupt signal is cleared. The reset control signal is then enabled. Before terminating this routine, the distributor microengine subunit DMS puts the ROM input address corresponding to the HOME routine into the accumulator 26 and then checks, or tests, for pending data-service-interrupt signals. If none are pending, the output signal OUTFLG is reset and the contents of the accumulator are incremented by 1 and loaded into the ROM address counter causing the distributor microengine subunit DMS to enter the HOMEP1 routine. If, on the other hand, one or more data-service-interrupt signals is pending, the distributor microengine subunit DMS fetches the corresponding channel START file in the file storage unit 30 and jumps to the data-service routine.

Figure 15:
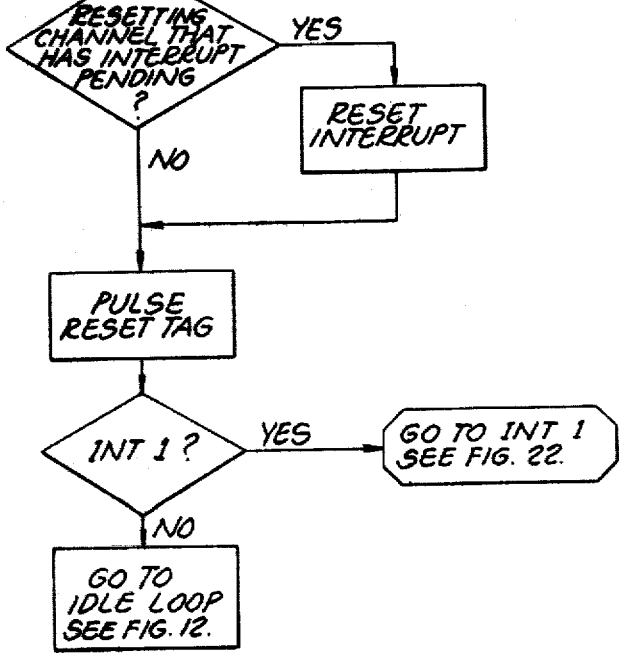

FIG. 15 is a flow chart representation of the reset routine. As shown in FIG. 15, the first operation is a check whether or not the peripheral-unit controller PUC to be reset also has an interrupt signal pending. If the answer is yes, as indicated by the YES line to the right of the first diamond in FIG. 15, the interrupt signal is reset. The next operation is to pulse the reset tag, that is, the reset signal to be transferred over the input/output bus IOB to the selected peripheral-unit controller. The program then checks for pending data-service-interrupt signals. If there is such a signal pending, the program jumps to the INT1 routine. If no data-service-interrupt signal is pending, the program then returns to the idle loop.

MODE Routine

The MODE routine is entered when a mode signal is to be executed. The least significant bits of the command word are transferred from the data buffer 1 to the output buffer, the contents of which are then transferred to the peripheral-unit controller along with the select control signal SELT. Before terminating the routine, the distributor microengine subunit DMS puts the ROM input address corresponding to the HOME routine into the accumulator 26 and checks for pending data-service-interrupt signals. If none are pending, the output flag is reset and the contents of the accumulator added to 1 and loaded into the ROM address counter 38 (see FIG. 9B), causing the distributor microengine subunit DMS to jump to the HOMEP1 routine. If, on the other hand, a data-service-interrupt signal is pending, the corresponding channel's START file, stored in the file storage unit 30, is fetched and the distributor microengine subunit DMS jumps to the appropriate data-service routine.

Figure 16:
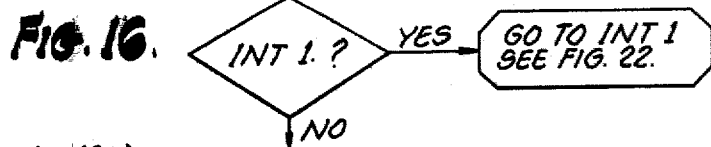

FIG. 16 is a flow chart representation of the mode routine. As indicated in FIG. 16, the first operation in the mode routine is the placement of the mode data on the input/output bus to be transferred to the selected peripheral-unit controller and to pulse the select tag, that is, transfer the select signal SELT to the same peripheral-unit controller where the mode bits are loaded into the mode register in the selected peripheral-unit controller PUC (see FIGS. 4, 5, and 6). The program then checks for any pending data-service-interrupt signals and jumps to the INT1 routine if any such data-service-interrupt signals are detected, as indicated by the YES line to the right of the diamond in FIG. 16.

If no such interrupt signals are pending, the program returns to the idle loop.

SETSPC Routine

The set special routine SETSPC is performed when a set special character command is to be executed. This special character is transferred from data buffer 1 to the special character file portion of the file storage unit 30. The ROM input address corresponding to the HOME routine is stored in the accumulator and the data-service-interrupt pending flag is tested. If no data-service-interrupt signals are pending, the output flag OUTFLG is reset and a jump operation to the HOMEP1 routine is executed. If, on the other hand, a data-service-interrupt signal is present, the distributor microengine subunit DMS jumps to the appropriate data-service routine, as specified by that channel's START file that has previously been stored in the file storage unit 30.

Figure 17:
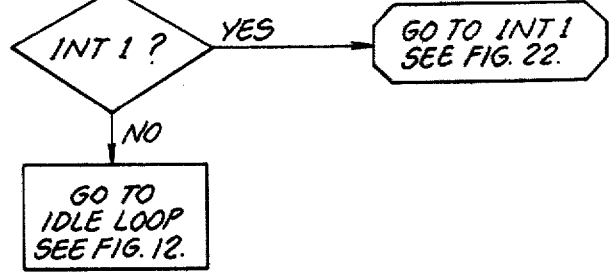

FIG. 17 is a flow chart representation of the SETSPC routine. As indicated in FIG. 17, the first operation in the SETSPC routine is to load the appropriate portion of the file storage unit 30 with the 8-bit special character transferred from the computer unit CU. Each input-data term of the selected peripheral-unit controller may then be compared with a particular special character stored in the file storage unit 30 to determine whether or not the equivalent term is being transferred into the computer unit CU. After loading the special character in the file storage unit, the program checks for pending data-service-interrupt signals and goes to the INT1 routine if any such signals are pending, as indicated by the YES line to the right of the diamond in FIG. 17. If no such signals are pending, the program then returns to the idle loop.

POUT Routine

The program out routine POUT is executed when an output-data-service sequence is to be executed. The data signals stored in the data buffer 1 are transferred to the output buffer 12 and then to the peripheral-unit controller PUC in conjunction with an output control signal OTPT. The ROM input address corresponding to the HOME routine is placed in the accumulator 26, the data-service-interrupt pending flag is tested and if no data-service-interrupt signals are pending, the out-flag signal OUTFLG is reset and the distributor microengine subunit DMS jumps to the HOMEP1 routine. If, on the other hand, a data-service signal is pending, a jump is taken to the appropriate data-service routine specified by that channel's START file stored in the file storage unit 30.

FIG. 18 is a flow chart representation of the POUT routine. As indicated in FIG. 18, data signals are placed on the input/output bus IOB for transfer to a selected peripheral-unit controller PUC and the output signal OTPT is driven into a TRUE condition to strobe the data into the selected peripheral-unit controller registers (see FIGS. 4, 5, and 6). The program then checks to see whether or not there are any data-service-interrupt signals pending. If there are such interrupt signals pending, the program goes to an INT1 routine, as indicated by the YES line to the right of the diamond in FIG. 18. However, if no such interrupt signals are pending, the program returns to the idle loop.

BRANCH Routine

The distributor microengine subunit enters the BRANCH routine when bit 09 of the output command word is TRUE. If bit 15 is also TRUE, the distributor microengine subunit DMS will go to the NODMA routine. If, on the other hand, only bit 09 is TRUE and bit 15 is FALSE, the distributor microengine subunit DMS continues with the BRANCH routine.

In the firmware program of Table X, the BRANCH routine includes the routines BRANCH1, BRANCH3, BRANCH6, and BRANCH9.

In the BRANCH1 routine, the distributor microengine subunit assembles the Auto I/O interrupt location address and fetches the byte of the Opcode in the Auto input/output location in the main-memory unit MMU. The least significant bits of the interrupt location are kept in temporary storage location TMP2 in the file storage unit 30 and the most significant bits are kept in the temporary storage location TMP3 in the file storage unit 30. At the end of the routine, the address of the next routine, BRANCH3, is stored in the accumulator 26. The distributor microengine subunit DMS then examines the data-service-interrupt pending flag. If a data-service-interrupt signal is pending, the distributor microengine subunit DMS jumps to service the interrupt signal. When all pending data-service-interrupt signals have been serviced, the distributor microengine subunit DMS returns to the BRANCH3 routine. If no data-service-interrupt signals are pending, the distributor microengine subunit DMS goes immediately to the BRANCH3 routine.

In the BRANCH3 routine, the distributor microengine subunit DMS accesses and stores both bytes of the byte count location. The character detection enable signal and the parity standardization enable signal are transferred from the command word to the channel STATUS word position in the file storage unit 30. At the end of the routine, the distributor microengine subunit DMS examines the interrupt 1 flag, that is, the I1 signal at the test-tree logic circuit 36. Prior to this, the address of the next routine, BRANCH6, is loaded into the accumulator 26. If an interrupt 1 signal is pending, the distributor microengine subunit DMS jumps to service this interrupt signal. When all data-service-interrupt signals have been serviced, the distributor microengine subunit DMS returns to BRANCH6. If no data-service-interrupt signal is pending, the distributor microengine subunit DMS goes immediately to BRANCH6.

The BRANCH6 routine results in the access and storing of the most significant byte and least significant byte of the buffer address location. The bits stored as part of the AUTOOP word of the file storage unit 30 are examined to determine whether the operation is to be an input data transfer or an output data transfer. If an input operation is indicated, the appropriate bit in the channel STATUS word stored in the file storage unit 30 is driven to a truth state of TRUE corresponding to an enable-in condition. Similarly, if the appropriate bit indicates an output operation, a bit corresponding to an enable-out signal in the channel STATUS word stored in the file storage unit 30, is driven to a TRUE truth state indicating an output operation is to be performed. At the end of the BRANCH6 routine, the address of the next routine, BRANCH9, is loaded into the accumulator. The distributor microengine subunit DMS then examines the interrupt 1 pending flag. If an interrupt 1 signal is pending, the distributor microengine subunit DMS branches to service that interrupt signal. When all interrupt 1 signals have been serviced, the distributor microengine subunit DMS returns to the BRANCH9 routine. If no interrupt 1 signals are pending, the distributor microengine subunit DMS goes immediately to the BRANCH9 routine.

The BRANCH9 routine completes the processing at the start of each direct-memory-access input/output operation. The START word in the file storage unit 30 is filled with the appropriate address for either an input or an output routine. The enable-in or enable-out signals will have already been set up in the channel STATUS word in the file storage unit 30. Accordingly, in the BRANCH9 routine, the distributor microengine subunit DMS tests the channel STATUS word to determine whether or not the enable-in flag has been set to a truth state of TRUE. If it has been, the address of the IN routine is stored in the START file. If it has not been, then the address of the OUT routine address is stored in the START file. When this testing is completed, the distributor microengine subunit DMS goes to the NODMA1 routine.

Figure 19A:
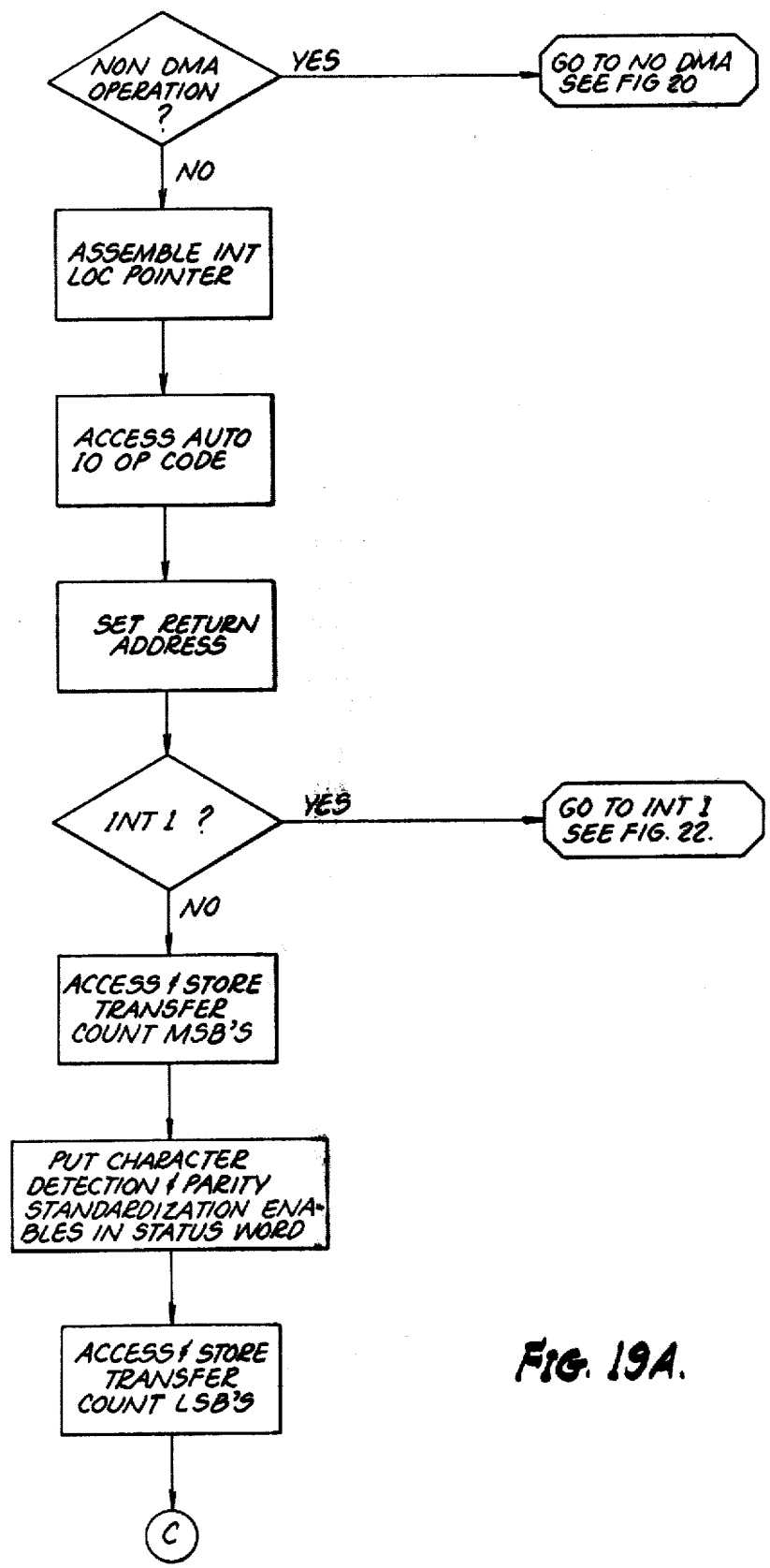
Figure 19B:
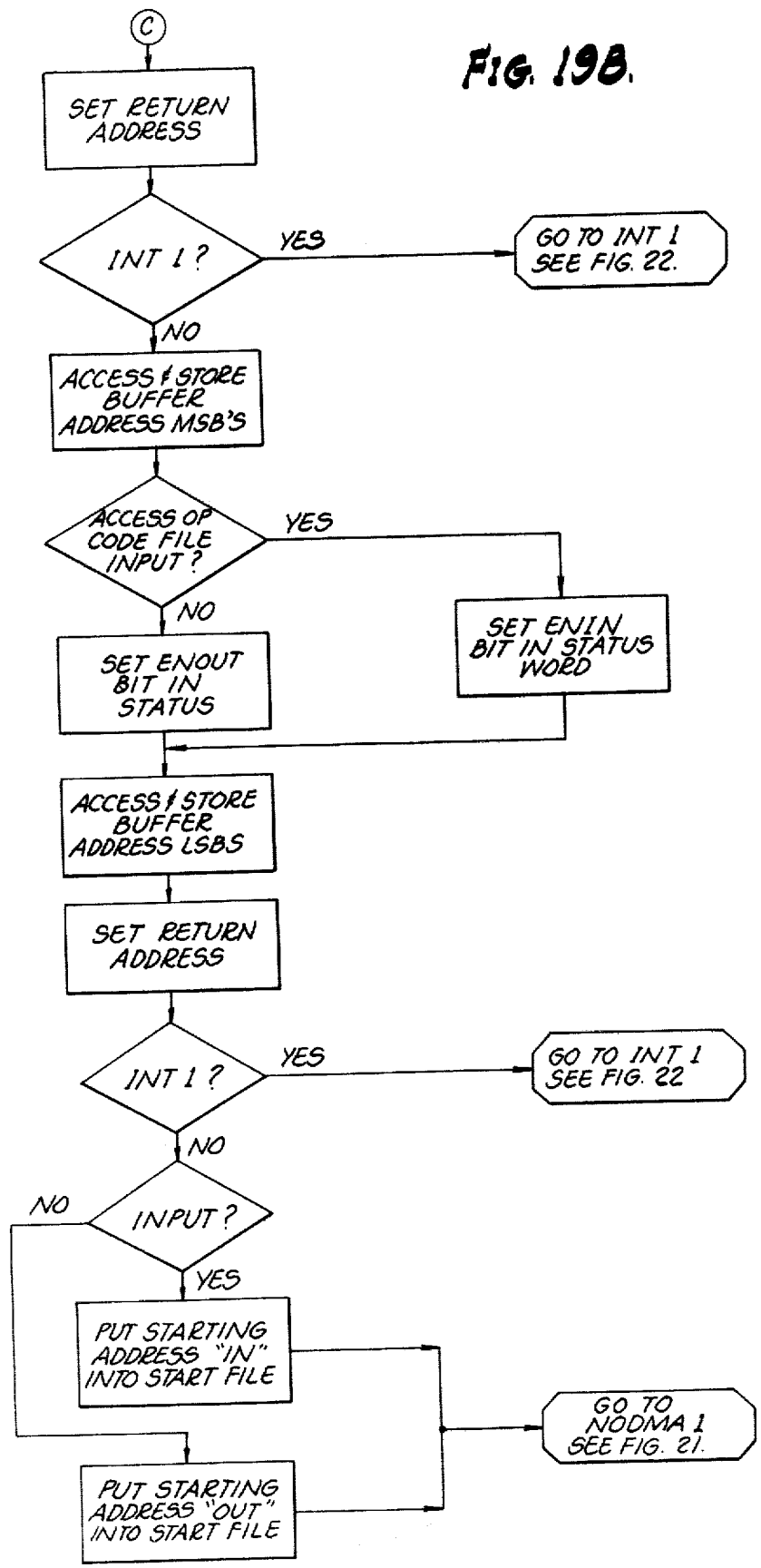

FIGS. 19A and 19B together comprise a flow chart representation of the BRANCH routine. The point of continuation between FIGS. 19A and 19B is indicated by Ⓒ shown at the bottom of FIG. 19A and at the top of FIG. 19B.

The BRANCH routine begins by checking the truth state of the signal on data bus line DB15 to determine whether or not the data transfer operation about to commence is to employ direct-memory-access capabilities. If the operation is not a direct-memory-access operation, as indicated by the YES line to the right of the first diamond in FIG. 19A, the program jumps to the NODMA routine. However, if the operation to be commenced is a direct-memory-access operation, the program then commences with the assembling of the interrupt location pointer. The interrupt location pointer is the address of the Auto I/O block for a selected peripheral-unit controller channel. Therefore, the interrupt location pointer makes it possible to perform the next operation in the BRANCH routine, namely, the operation of fetching the Auto I/O block.

After the Auto I/O block is fetched from the main-memory unit MMU and stored in the appropriate portion of the file storage unit 30 in the arithmetic logic subunit ALS, the return address for the current statement in the program is stored in the accumulator 26 and the program then checks for any pending data-service-interrupt signals. The return address is stored to avoid having to restart the BRANCH routine. A restart would be particularly disadvantageous in a BRANCH routine because, as indicated in FIGS. 19A and 19B, the BRANCH routine is relatively long and aborting and restarting each time a data-service-interrupt signal is detected would be inefficient. Accordingly, the return address of the current part of the program is stored in the accumulator 26 prior to each check of the data-service-interrupt signal so that after the data-service-interrupt signal check, if it is negative, or after the servicing of a data-service-interrupt signal, if it is positive, the program may return to the location of the return address and resume the BRANCH routine at the point at which it was interrupted.

As shown in FIG. 19A by the diamond in about the middle of the figure, if at this point in the program a pending data-service-interrupt signal is detected, as indicated by the YES line to the right of the diamond, the program jumps to the INT1 routine. However, if no such interrupt signals are pending, the progam then fetches and stores the most significant bits MSBs of the transfer count, then puts the character detection and parity standardization enable bits in the status word portion of the file storage unit 30 and then fetches and stores the least significant bits LSBs of the transfer count, as indicated at the bottom of FIG. 19A.

Referring now to the top of FIG. 19B, it is seen that the next operation in the BRANCH routine is the setting of the return address, that is, a storing of the present program instruction location prior to testing for pending data-service-interrupt signals.

After the check for pending data-service-interrupt signals, the BRANCH routine continues to fetch and store portions of the Auto I/O block. As indicated in FIG. 19B, the routine, after checking for data-service-interrupt signals, fetches and stores the most significant bits of the buffer address. The program then accesses or fetches the Opcode portion of the Auto I/O block stored in the file storage unit 30 to check whether or not the operation to be performed is an intput operation. If it is an input operation, the enable-in bit ENIN in the STATUS word stored in the file storage unit 30, is set to a TRUE condition. If an input operation is not indicated, that is, an output operation is indicated, then an enable-out bit ENOUT is set in the STATUS word stored in the file storage unit 30.

The program then continues by fetching and storing the least significant bits of the buffer address. At this point, it is again time for a check for data-service-interrupt signals. Therefore, the program stores the return address of the current point in the program and tests for pending data-service-interrupt signals. If none are pending, the BRANCH routine continues, whereby the appropriate starting address is placed into the START word location of the file storage unit 30 (see Table VII), depending upon whether the operation to be performed is an input or an output operation. In other words, the program address for either the OUT routine or the IN routine is loaded into the START word portion of the file storage unit 30, depending upon whether the data transfer operation to be performed is an input operation or an output operation. Once this is accomplished, the program then jumps to the NODMA1 routine.

NODMA Routine

In the NODMA routine, the distributor microengine subunit DMS loads the START file portion of the file storage unit 30 with a special ROM address used when DMA transfers are not employed. This permits a selected peripheral unit to operate in a programmed input/output mode. The Auto I/O control block is not accessed and the distributor microengine subunit DMS goes immediately to the NODMA1 routine to start the peripheral-unit controller.

FIG. 20 is a flow chart representation of the NODMA routine which consists of the operation of putting the starting address of the NODMA routine into the START file portion of the file storage unit 30 and then jumping to the NODMA1 routine.

NODMA1 Routine

The NODMA1 routine is entered at the end of the BRANCH9 routine and at the end of the NODMA routine. At this point in time, all preparation for the input/output operation will have been completed and the peripheral-unit controller PUC selected for a particular data transfer operation may then be started. Bit 10 of the command word is examined to determine whether the least significant bits of the command word contain both peripheral-unit controller branch address information as well as mode select information. If bit 10 is TRUE, the least significant bits of the command word are transferred to the peripheral-unit controller and the command signal CMD and select signal SELT are also transferred. If, on the other hand, bit 10 is FALSE, the least significant bits of the command word contain only branch address information. Accordingly, only the command signal CMD is transferred along with the branch address signals to the peripheral-unit controllers being addressed. At the end of this routine, NODMA1, the distributor microengine subunit DMS tests for pending interrupt 1 signals. If an interrupt 1 signal is pending, the distributor microengine subunit DMS branches to service that signal. If, on the other hand, there are no interrupt 1 signals present, the program jumps to the HOME routine. The output flag OUTFLG is reset and the distributor microengine subunit DMS enters an idle loop to wait for other tasks.

FIG. 21 is a flow chart representation of the NODMA1 routine. As shown in FIG. 21, the routine commences with a check for the status of the mode bit. If the mode bit is in a TRUE state, as indicated by the YES line to the right of the diamond at the top of FIG. 21, the next operation consists of transferring a branch address to the selected peripheral-unit controller along with the command signal CMD which starts the firmware program in the controller microengine unit MEU of the selected peripheral-unit controller PUC, and the data transfer operation associated with the peripheral unit to which that controller is connected.

On the other hand, if the check of the mode bit made at the beginning of the NODMA1 routine shows that the mode bit is FALSE, the next operation consists of transferring the branch address and mode signals to a selected peripheral-unit controller and then applying both the command signal CMD and the select signal SELT whereby the mode signals are loaded into the mode register of the selected peripheral-unit controller PUC (see FIGS. 4, 5, and 6). The firmware program stored in the controller microengine unit MEU of the selected controller then commences the transfer of data signals.

After the mode bit is tested and the command signal is transferred to the selected peripheral-unit controller PUC, with or without the select signal SELT, the return address of the idle loop is placed in the accumulator 26. The program then checks for data-service-interrupt signals and, if none are pending, returns to the idle loop.

INT1 Routine

INT1 routines may be entered from the idle loop, BRANCH routine, or upon the completion of a prior INT1 routine. Before entering an INT1 routine, an IN routine, an OUT routine, or a DMANOT routine, the return address of the program is placed in the accumulator 26. When the INT1 routine has been completed, and no other data-service-interrupts are pending, the distributor microengine subunit DMS returns to this stored address. If, on the other hand, additional data-service-interrupt signals are pending, the distributor microengine subunit DMS continues to service them until they are all serviced. When this is accomplished, the distributor microengine subunit DMS returns to the stored return address.

Figure 22:
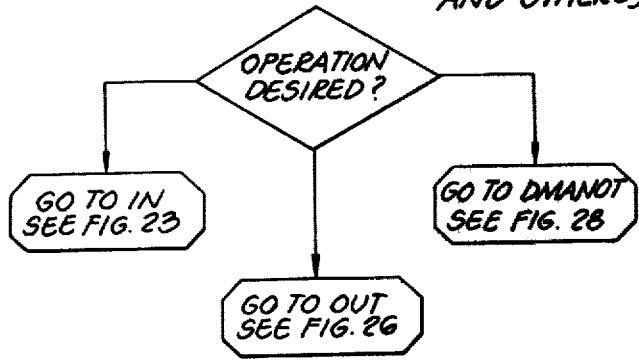

FIG. 22 is a flow chart representation of the INT1 routine. As indicated in FIG. 22, the INT1 routine consists of a 3-way test of the operation to be performed, namely, (1) whether or not it is an input operation, in which case the program branches to the IN routine, (2) whether or not it is an output operation, in which case the program branches to the OUT routine, and (3) whether or not it is a DMA operation. If it is not a DMA operation, the program branches to a DMANOT routine.

IN Routine

The distributor microengine subunit DMS enters the IN routine any time an interrupt 1 signal is recognized and an input operation is to be performed. The buffer address pointer portion of the Auto I/O block is fetched from the appropriate part of the file storage unit 30. It is then incremented and loaded into the memory address registers 88 in the address-decoder and logic-subunit ADCL. Once this address is loaded, a direct-memory-access cycle is initiated by the direct-memory-access logic DMAL (see FIG. 10). The transfer count is then decremented and examined to see if it has reached 0. If it has reached 0, the distributor microengine subunit branches to an EOB-interrupt routine. If it has not reached 0, the character detection enable signal is examined. If this signal is in a TRUE condition, the distributor microengine subunit DMS branches to the CHARD routine. If character detection is not enabled, the distributor microengine subunit DMS waits for the direct-memory-access cycle to be completed. When it is completed, the distributor microengine subunit DMS checks whether a nonexistent portion of the main-memory unit MMU has been addressed. This will be indicated by a TRUE rate error signal RATER. If a nonexistent part of the main-memory unit MMU has not been addressed, that is, if an existent part of the memory unit has been addressed, a 250 nanosecond command signal CMD is transferred from the multiplexer DMAMUX to the peripheral-unit controller PUC, indicating completion of the data-service-interrupt process and resetting of the interrupt signal generated by the peripheral-unit controller PUC. If, on the other hand, a nonexistent part of the main-memory unit has been addressed, the command signal CMD transferred to the peripheral-unit controller, is 500 nanoseconds in duration causing that peripheral-unit controller to generate an end-of-block interrupt signal. At the completion of the IN routine, the distributor microengine subunit DMS goes to the CHARD2 routine.

FIG. 23 is a flow chart representation of the IN routine. The IN routine consists of the following program operations. The buffer address is incremented and then loaded into the memory address registers 88 so that the next term of input data will be written into the properly addressed portion of the main-memory unit MMU. The STATUS word, previously stored in the file storage unit 30, is then loaded into the Opcode register 14 (see FIG. 7A) so that the data transfer operation can be executed in accordance with the computer unit instructions embodied in the Auto I/O opcode stored as the STATUS word in the file storage unit 30.

After the data signals are transferred to the main-memory unit MMU, the transfer count is decremented and the next operation in the program is a check of whether or not the transfer count has become equal to zero. A zero transfer count indicates that the last byte of data signals has been transferred into the main-memory unit MMU. If the transfer count has reached zero, the program jumps to the EOBIN routine.

If the transfer count is not equal to zero, the program then tests the character detection bit to determine whether or not the term of input data is to be compared with either a special character or a standard carriage return code. If such a comparison is indicated, as represented by the YES line to the right of the character detection diamond in FIG. 23, the program jumps to the CHARD routine. If, however, no such comparison is to be made, the program then performs a wait operation in which the program repeatedly jumps to the same operation, that is, it cycles to a particular statement until the DMA transfer of data signals into the main-memory unit is complete. When the transfer has been completed, the program tests for nonexistent memory access as indicated by the rate error signal RATER. If an attempt has been made to address non-existent memory, as indicated by the YES line to the right of the nonexistent memory access diamond, the program then generates a double-duration command signal of 500 nanoseconds which results in the generation of an end-of-block interrupt signal in the addressed peripheral-unit controller PUC.

Accordingly, data transfer operations with that particular peripheral-unit controller, are then terminated. On the other hand, if an existent portion of the memory unit has been accessed, a command signal of nominal duration, that is, 250 nanoseconds, is transferred to the selected peripheral-unit controller to reset the pending data-service-interrupt signal and the program then tests for additional pending data-service-interrupt signals. If one or more such signals are pending, the program jumps to the INT1 routine. Otherwise, the program goes to the return address that will have been previously stored in the TMP2 portion of the file storage unit.

CHARD Routine

The CHARD routine is entered when character detection has been enabled. The distributor microengine subunit DMS waits for the direct-memory-access cycle to be completed. The contents of the accumulator 26, namely, the signals that constitute the return microaddress, are temporarily stored in position TEMP2 of the file storage unit 30. The nonexistent memory error signal RATER is checked and the distributor microengine subunit DMS branches to the routine EOBIN, if the rate error signal RATER is TRUE. If it is not TRUE, the input data signals are loaded into the accumulator 26 and the special character bit in the STATUS word is examined to determine whether the character to be compared is the carriage return code or the special character.

If the carriage return bit is TRUE, the input data signals stored in the accumulator 26 are compared with the carriage return code. If, on the other hand, it is FALSE, the stored data signals are compared with the special character. If the contents of the accumulator 26 do not equal the special character, a 250 nanosecond command signal CMD is transferred to the peripheral-unit controller PUC, indicating that the data service operation is complete. If, however, equality does occur, the command signal CMD is 500 nanoseconds in duration, indicating that a terminal condition has been detected and that the peripheral-unit controller PUC should generate an end-of-block interrupt signal. Prior to the test for identity, the most significant bit, that is, the eighth bit, on the result bus R-bus is stripped, or masked, if either parity standardization is enabled or the input data signals are compared with the carriage return code. This bit stripping is performed in those two situations so that the test for identity between an incoming byte of data signals and a special character, or carriage return code, will not have an erroneous result because of an arbitrary parity bit.

The CHARD routine then performs a check for another pending data-service-interrupt signal. If an interrupt signal is pending, another data-service routine is executed. If no such signal is pending, the TMP2 portion of the file storage unit 30 is loaded into the accumulator 26, restoring the return address, and the contents of the accumulator 26 are loaded into the ROM address counter 38 forcing the distributor microengine subunit DMS to the return address.

FIG. 24 is a flow chart representation of the CHARD routine. As shown in FIG. 24, the first operation in the CHARD routine is that of waiting until the transfer of the data term has been completed. To accomplish this, the program repeatedly jumps to the same statement until the direct-memory-access operation is completed, as indicated by a DMA done signal DMADON transferred from the direct-memory-access logic subunit DMAL to the test-tree logic circuit 36 (see FIGS. 10 and 9A).

The program then performs a check of whether or not a nonexistent portion of the main-memory unit has been addressed. If it has, as indicated by the YES line to the right of the nonexistent memory accessed diamond, the program performs an operation to transfer a double-duration command signal CMD to the selected peripheral-unit controller PUC to terminate data transfer operations. On the other hand, if the addressed portion of the main-memory unit does exist, the program continues the CHARD routine with a check for carriage return detection.

If the special character bit is TRUE, the next step in the program compares the input term with the special character. However, if the special character bit is FALSE, the comparison is made with the carriage return code. These two alternative paths are shown by the YES and NO lines respectively, connected to the special character detection diamond in about the middle of FIG. 24.

The result of either comparison is a check of whether or not the input data term being compared with the special character or carriage return character is the same, as indicated by the truth state of the zero test sigal EQZ. However, if parity standardization has been enabled or if the comparison is made with a carriage return code, the most significant bit MSB of the signals on the result bus R-bus is masked before the zero test is performed. If the input data term is the same, the next program operation in the CHARD routine is the generation of a double-duration command signal CMD, that is, a command signal of 500 nanoseconds duration, to cause the selected peripheral-unit controller PUC to generate an end-of-block interrupt signal for termination of the data transfer operation. On the other hand, if the comparison of the input character with either the special character or the carriage return character indicates no identity, the next step in the program is to generate a nominal duration command signal CMD, that is, a command signal of 250 nanoseconds duration, to reset the data-service-interrupt signal.

Irrespective of which command signal is generated, 250 nanoseconds or 500 nanoseconds, the program next checks for additional pending data-service-interrupt signals. If any such signals are pending, the program jumps to the INT1 routine. However, if none are pending, the program jumps to the return address which will have been stored in the TMP2 portion of the file storage unit 30.

EOBIN Routine

The EOBIN routine is entered when the transfer count is decremented to 0 during an input operation or when a nonexistent memory error occurs in the CHARD routine. A double-duration command signal CMD is transferred to the peripheral-unit controller PUC and the program completes a jump to the CHARD1 routine.

Figure 25:
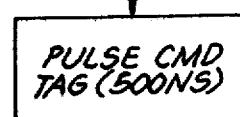

FIG. 25 is a flow chart representation of the EOBIN routine. As shown in FIG. 25, the routine first produces a double-duration command signal CMD, namely a command signal of 500 nanoseconds in duration, which resets the data-service-interrupt signal in the selected peripheral-unit controller PUC and cuases it to generate an end-of-block interrupt signal to terminate the input data transfer operation. The routine then checks for pending data-service-interrupt signals and jumps to the INT1 routine if any such additional signals are pending. If none are pending, the routine goes to the return address stored in the TMP2 portion of the file storage unit 30.

OUT Routine

The OUT routine is entered when a data-service-interrupt signal is recognized and an OUT operation is to be performed. The buffer address pointer is obtained from the file storage unit 30, incremented and loaded into the memory address registers 88 in the address-decoder and control-logic subunit ADCL. Once this address is loaded, a direct-memory-access cycle is initiated by the direct-memory-access logic subunit DMAL. The transfer count is then decremented and tested to see if it equals 0. If the transfer count has become equal to 0, the distributor microengine subunit DMS jumps to the EOBOUT routine. If it is not equal to 0, the distributor microengine subunit DMS proceeds with the OUT routine.

The distributor microengine subunit DMS waits for the memory cycle to be completed and then transfers the output data from the DMA buffer 24 in the arithmetic logic subunit ALS to the output buffer 12 in the data transfer unit DTS. The output signal OTPT and the command signal CMD are then generated to strobe output data into the peripheral-unit controller PUC and signal the peripheral-unit controller PUC that the data-service operation is complete. If a nonexistent memory error occurs, as indicated by the truth state of the rate error signal RATER (see FIGS. 9A and 10), the duration of the command signal CMD is extended to 500 nanoseconds.

At the termination of the OUT routine, the distributor microengine subunit DMS checks whether another data-service-interrupt signal is pending. If it is, another data-service sequence is executed. If it is not, the ROM address counter 38 is loaded with the contents of the accumulator 26.

Figure 26:
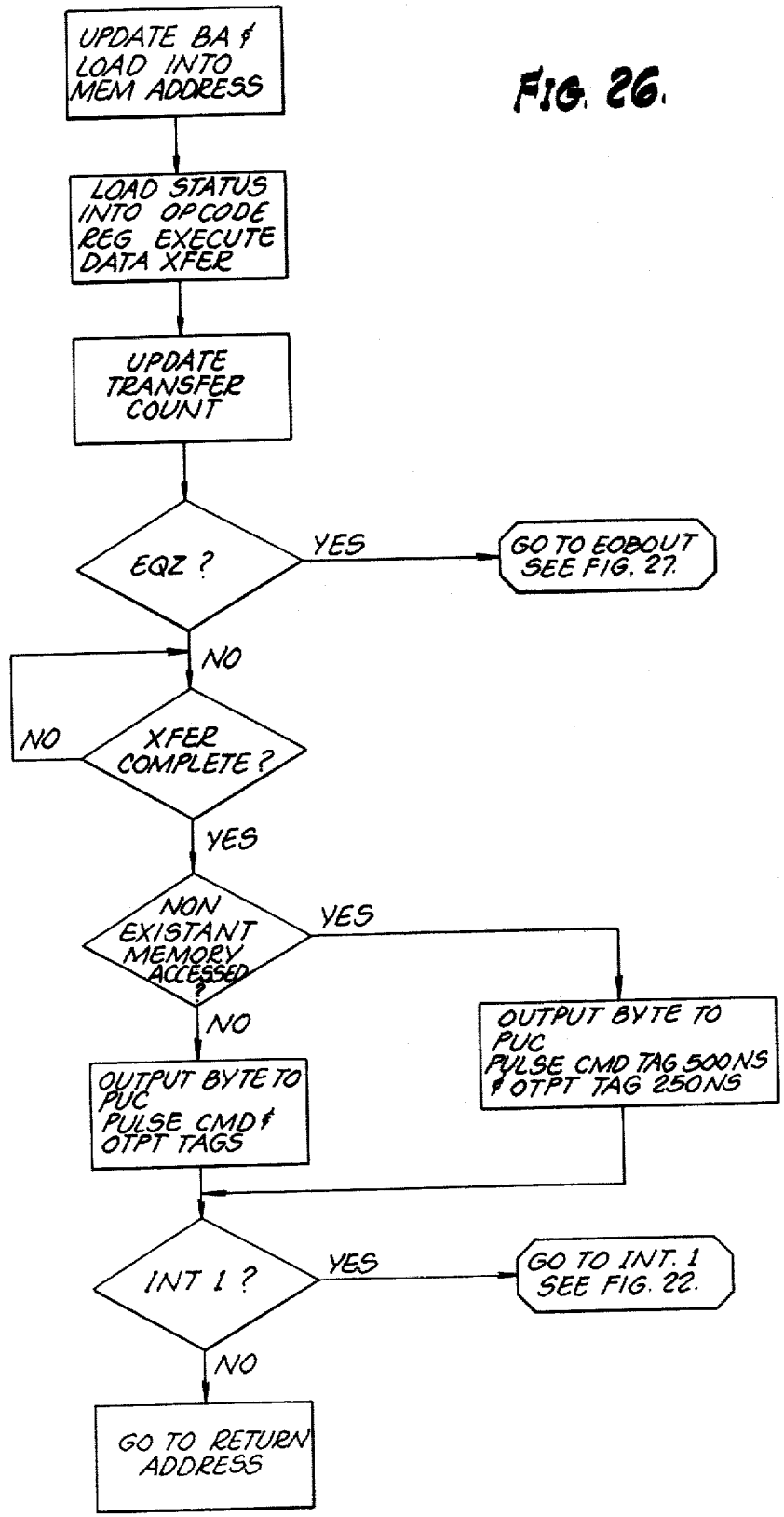

FIG. 26 is a flow chart representation of the OUT routine. As indicated in FIG. 26, the first operation performed in the OUT routine is the updating of the buffer address, that is, an incrementing of the buffer address pointer, and loading the buffer address pointer into the memory address registers 88 in the address-decoder and control-logic subunit ADCL. The OUT routine then loads the STATUS word stored in the file storage unit 30 into the Opcode register 14 to execute a data transfer. Then the transfer count is decremented and tested to determine whether or not it has reached zero. If it has reached 0, the program branches to the EOBOUT routine. If the transfer count is still not equal to 0, the next step in the program is a wait operation performed by repeated jumping to the same step until the output data transfer has been completed.

Then the program proceeds by testing for whether or not a nonexistent portion of the main-memory unit has been accessed. If it has, as indicated by the YES line to the right of the nonexistent memory-access diamond in FIG. 26, the next operation is to transfer the byte of output data signals to the peripheral-unit controller PUC, pulse the command signal CMD for a duration of 500 nanoseconds, and strobe the output data signals into the appropriate registers in the peripheral-unit controller PUC by means of the output signal OTPT. On the other hand, if nonexistent memory has not been accessed, the operation proceeds by transferring data onto the input/output bus IOB of the selected peripheral-unit controller PUC and strobing the data into the peripheral-unit controller PUC by means of the output signal OTPT and also generating the nominal duration command signal, that is, a command signal of 250 nanoseconds duration to reset the pending interrupt signal in the selected peripheral-unit controller PUC.

In either case, the routine then continues by checking for pending data-service-interrupt signals. If any such signal is pending, the program jumps to an INT1 routine. However, if none are pending, the program jumps to the return address stored in the accumulator 26.

EOBOUT Routine

The EOBOUT routine is entered when the transfer count becomes equal to 0 during an output operation. After waiting for the ongoing direct-memory-access cycle to be completed, the distributor microengine subunit DMS loads the contents of the DMA buffer 24, in the arithmetical logic subunit ALS, into the output buffer 12 of the data transfer subunit DTS. The output signal OTPT and command signal CMD are generated with a command signal duration of 500 nanoseconds. At the end of the routine, the distributor microengine subunit DMS checks whether another data-service-interrupt signal is pending. If it is, another data-service sequence is executed. If it is not, the ROM address counter 38 is loaded with the contents of the accumulator 26.

Figure 27:
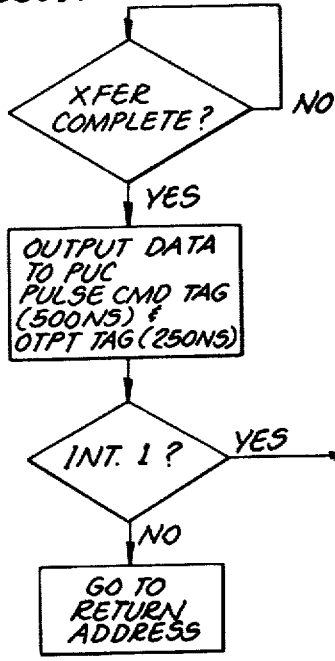

FIG. 27 is a flow chart representation of the EOBOUT routine. As indicated in FIG. 27, the program first performs a cycle step, that is, a series of repeated jumps to the same statement while it waits for the transfer of output data to be complete, that is, the transfer of data signals from a selected portion of the main-memory unit MMU to be completely transferred by means of a DMA-cycle to the direct-memory-access multiplexer DMA-MUX and stored in the output buffers 12 in the data transfer subunit DTS (see FIG. 7A).

Once the transfer of data from the main-memory unit to the multiplexer DMA-MUX is completed, the EOBOUT routine then places the data on the input/output bus IOB to be transferred to a selected peripheral-unit controller. It then generates the output signal OTPT and a double-duration command signal CMD, namely, a command signal of 500 nanoseconds. These two signals have the effect of strobing this last term of output data into the peripheral-unit controller PUC, resetting the data-service-interrupt signal, and causing the generation of an end-of-block interrupt signal for termination of the output data transfer.

The next operation in the EOBOUT routine is a check for any pending data-service-interrupt signals. If any such signals are pending, the program jumps to the INT1 routine. If no such signals are pending, the program returns to the return address by placing the return address stored in the accumulator 26 on the result bus R-bus.

DMANOT Routine

The DMANOT routine is entered when a data-service-interrupt signal is detected and a direct-memory-access transfer is not employed. The distributor microengine subunits DMS tests the contents of the accumulator 26 to see if the routine was entered from the idle loop. If it was so entered, the distributor microengine subunit DMS jumps to the HOMEP2 routine. If it was not so entered, the contents of the accumulator 26 are located into the ROM address counter 38, returning control of the distributor microengine subunit DMS to the routine that was being executed when the program jumped to service the data-service-interrupt signal.

Figure 28:
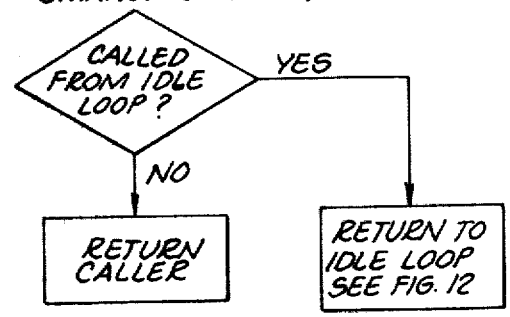

FIG. 28 is a flow chart representation of the DMANOT routine. As shown in FIG. 28, the DMANOT routine commences by checking whether the routine was entered from the idle loop. If it was, the program returns to the idle loop. If it was not entered from the idle loop, the program returns to the routine corresponding to the contents of the accumulator 26, that is, the routine exited so that the program could service a pending data-service-interrupt signal by means of a non-DMA data transfer.

FIRMWARE PROGRAM

Table IV includes the three types of program statements that may be generated in the form of signals at the output of read-only memory array 40 shown in FIG. 9B. There are six read-only memory units in the read-only memory array 40, each of which produces four output signals. Therefore, the microword, that is, the combined output signals of ROM array 40 produced by the six read-only memory units, contains twenty-four bits. Table IV indicates how these twenty-four bits are allocated to different fields, or elements of a statement, depending on which of the three types of program statements are being produced in a particular step of the firmware program.

a jump address field JMPADR of eight bits, and a jump-only field JUMP ONLY of eight bits.

The contents of the various fields of the three statements, in terms of field code, bit content, and their meanings, are presented in Tables V through IX.

Table V indicates the field content and their meanings for the source fields in program statements. As shown in Table V, when the source field contains the term ROM, the field content is all zeros, represented in Table V by hexadecimal 0. Hexadecimal numbers are used in Tables V through X as a convenient way of representing the corresponding combination of binary signals that are generated on appropriate output terminals of ROM array 40 (see FIG. 9B). In response to this source, the read-only memory unit array 40, as shown in FIG. 9B, places literals on the source bus. Literals are the signals ROM0 through ROM4 and FA0 through FA2. These signals are also used in other ways. For example, the file control signals FA0 through FA2 are ordinarily used to address the file storage unit 30 and the ROM signals ROM0-ROM4 are ordinarily used to control various circuits throughout the multiplexer DMA-MUX. However, in the literal mode, these signals are used merely as a known constant to be placed on the source bus S-bus to perform some arithmetic or logic operation in the arithmetic logic subunit ALS.

TABLE V

| SOURCES IN PROGRAM STATEMENTS | | |
|---|---|---|
| SOURCE | FIELD CONTENT | COMMENTS |
| ROM | :0 | Place ROM Literals on S-Bus |
| INTLOC | :1 | Place Interrupt Vecotor Signals on S-Bus |
| RBUF1 | :2 | Place Data Buffer 1 Signals on S-Bus |
| RBUF2 | :3 | Place Data Buffer 2 Signals on S-Bus |
| FILE | :4 | Place File Output Signals on S-Bus |
| DMABUF | :6 | Place DMA Buffer Signals on S-Bus |
| ONES | :7 | Nothing Placed on S-Bus |

Continuing with Table V, when the source is INT-

TABLE IV

| | | | 24-BIT MICROWORD | | | | | |
|---|---|---|---|---|---|---|---|---|
| 3-TYPES OF PROGRAM STATEMENTS | INST | 3 SOURCE | 5 ALU | 3 FILES | 5 CONTROL | 1 WFILE | 1 ACCUM | 6 PCCN |
| | IMED | 3 SOURCE | 5 ALU | 8 IMEDE | | 1 WFILE | 1 ACCUM | 6 PCON |
| | UJMP | 8 JUMP | JUMP ADDRESS(JMPADR) | | | 8 JUMP ONLY | | |

As shown in Table IV, there is an instruction statement called INST, an immediate statement called IMED, and an unconditional jump statement called UJMP.

The instruction statement INST contains seven fields, namely, a source field SOURCE of three bits, an arithmetic logic unit field ALU of five bits, a file field FILE of three bits, a control field CONTROL of five bits, a write file field WFILE of one bit, an accumulator field ACCUM of one bit, and a program control field PCON of six bits.

The immediate statement IMED has six fields, namely, a source field SOURCE of three bits, an ALU field of five bits, an immediate field IMEDE of eight bits, a write field WFIELD of one bit, an accumulator field ACCUM of one bit, and a program control field PCON of six bits. The unconditional jump statement UJMP has three fields, a jump field JUMP of eight bits, LOC, the field content is hexadecimal 1. In response, the interrupt vector signals are placed on the source bus S-bus by the 2-to-1 multiplexer 34 in the arithmetic logic subunit ALS in response to the select interrupt location signal SELINTLOC.

When the field content is hexadecimal 2, the source of signals to be put on the source bus is the data buffer1 20 in the arithmetic logic subunit ALS. When the field content is hexadecimal 3, the source is data buffer 222. When the field content is hexadecimal 4, the source is the file storage unit 30. When the field content is hexadecimal 6, the source of the S-bus signals is the DMA buffer 24 in the arithmetic logic subunit ALS. When the hexadecimal field content is 7, that is, all three of the source bits are in a TRUE truth state, the operation in the arithmetic logic subunit does not involve the source bus S-bus. Therefore, it does not matter what signals are present on the S-bus. The designation ONES is used to indicate that the truth state of the signals that are on the source bus does not matter for that particular program statement.

Table VI represents the various operations of the arithmetic logic unit 28 that are initiated in response to the contents of the ALU field in the 24-bit microword of the firmware program statement. Since the ALU field is a 5-bit field, the field content, indicated in hexadecimal form in Table VI, corresponds to up to five bits.

TABLE VI

ALU OPERATIONS IN PROGRAM STATEMENTS

| OPERATION | FIELD CONTENT | RESULT OF OPERATION |
|---|---|---|
| AMSM1 | :2 | *Accumulator minus S-Bus minus 1 |
| AMNUSS | :3 | Accumulator minus S-Bus |
| SMAM1 | :4 | S-Bus minus Accumulator minus 1 |
| SNMUSA | :5 | S-Bus minus Accumulator |
| APLUSS | :6 | Accumulator plus S-Bus |
| APSP1 | :7 | Accumulator plus S-Bus plus 1 |
| ACC | :8 | Accumulator Only |
| ACCP1 | :9 | Accumulator plus 1 |
| NACC | :A | $\overline{\text{Accumulator}}$ |
| NACCP1 | :B | $\overline{\text{Accumulator}}$ plus 1 |
| SBUS | :C | S-Bus Only |
| SBUP1 | :D | S-Bus plus 1 |
| NSBUS | :E | $\overline{\text{S-Bus}}$ |
| NSP1 | :F | $\overline{\text{S-Bus}}$ plus 1 |
| ZEROS | :10 | All Zeros |
| AXORS | :12 | Accumulator EX-OR S-Bus |
| AXORSN | :14 | Accumulator $\overline{\text{EX-OR}}$ S-Bus |
| AANDS | :18 | Accumulator AND S-Bus |
| AORSN | :1A | Accumulator $\overline{\text{OR}}$ S-Bus |
| AANDSN | :1C | Accumulator $\overline{\text{AND}}$ S-Bus |
| AORS | :1E | Accumulator OR S-Bus |

*Accumulator and S-Bus mean, respectively, the eight signals at the output terminals of the accumulator and the eight signals on the source bus S-bus.

Table VI includes a column labeled operation which represents the type of operation being performed in the arithmetic logic subunit ALS. The second column indicates the field content, that is, the truth condition of the five bits that control the operation of arithmetic logic unit and the result of operation column on the right of Table VI indicates the result produced by the logic or arithmetic operation performed in the arithmetic logis subunit.

All of the entries in Table VI indicated some mathematical or logical operation involving the signals available on the source bus S-bus and the signals available at the output of the accumulator 26 of arithmetic logic unit 28 in the arithmetic logic subunit ALS. For example, operations AMSM1 corresponding to a field content of hexadecimal 2, down through operation NSP1 corresponding to a field content of hexadecimal F, that is, all ones in the first four bits of the field, correspond to arithmetic operations, such as addition and subtraction of the signals on the source bus S-bus and the signals available at the output of the accumulator 26 of the arithmetic logic unit 28 (see FIG. 8A). The last six entries at the bottom of Table VI represent some logic operation between the set of signals on the S-bus and the set of signals available at the output of the accumulator 26. For example, operation AXORS, represented by a field content of hexadecimal 12, is an Exclusive-OR (EX-OR) operation between the output signals of the accumulator in the arithmetic logic subunit ALS and the signals available on the source bus. Similarly, operation AXORSN, represented by a field content of hexadecimal 14, is an Exclusive-OR negate ($\overline{\text{EX-OR}}$) operation between those same signals.

Operation SBUS, represented by field content hexadecimal C, causes the signals on the S-bus to be placed directly on the result bus without any arithmetic or logic operation, that is, without modification. Operation SBUSP1, corresponding to field content of hexadecimal D, represents the operation of adding 1 to the contents of the source bus and placing the sum on the result bus R-bus. Operation ZEROS, corresponding to a field content of hexadecimal 10, puts eight FALSE signals on the result bus.

Table VII represents file storage locations in program statements. As shown in Table IV, the file field FILE of the program statement is three bits wide. Thus, the field content may be represented by any number between 0 and 7 in binary form. The field content of the file storage operation field code actually corresponds to the three signals FA2 through FA0 that are used to address the file storage unit 30 in the arithmetic logic subunit ALS. Thus, each operation listed in Table VII corresponds to an addressed portion of the file storage unit 30. For example, as indicated in Table VII, when the field content of the file storage field is all zeros, the special character SPCHAR is being addressed. This character will have been stored during a command word transfer from the computer unit CU to the multiplexer DMA-MUX. When a field content of hexadecimal 1 is included in the file storage field, the most significant byte MSB of the transfer count is being addressed.

TABLE VII

FILE STORAGE OPERATIONS IN PROGRAM STATEMENTS

| OPERATION | FIELD CONTENT | COMMENTS |
|---|---|---|
| SPCHAR | :0 | Special Character |
| WBCMSB | :1 | Transfer Count MSB |
| SBCLSB | :2 | Transfer Count LSB |
| BAMSB | :3 | Address Pointer MSB |
| BALSB | :4 | Address Pointer LSB |
| STATUS | :5 | Channel Status |
| START | :6 | Type of Transfer |
| TMP2 | :7 | Temporary Work File |
| TMP3 | :4 | Temporary Work File |
| AUTOOP | :5 | Auto I/O Opcode |
| TMP1 | :6 | Temporary Work File |
| NOOPF | :7 | No File Operation |

As shown in Table VII, the remaining six possibilities for the field content of the 3-bit file storage field in program statements, correspond to the operation of addressing the least significant byte of the transfer count, the most significant byte of the address pointer, the least significant byte of the address pointer, a channel status word, a transfer type word, and a temporary work file. As also shown in Table VII, the field contents corresponding to hexadecimal 4, 5, 6, and 7 have alternative meanings. For example, a field content corresponding to hexadecimal 4 may represent the address in the file storage unit of the location of the least significant byte of the address pointer or, alternatively, may represent a temporary work file. The distinction is only in the name given the addressed file location and depends upon the point in the sequence of the firmware program when this particular file address is being utilized. Similarly, the file storage operation corresponding to a field content of hexadecimal 5 corresponds to the channel STATUS word, but may also correspond to the Auto I/O Opcode. Actually, the contents of the address file storage location may be identical in either case. However, the contents are identified as the Auto I/O Opcode at the time the file storage unit 30 is filled by the computer unit CU.

Thus, Table VII is also indicative of the entire contents of the file storage unit 30 (see FIG. 8B), it being understood that there is one such set of file contents for each peripheral-unit controller PUC connected to the multiplexer DMA-MUX.

Table VIII represents the various program control fields PCON that are used in program statements of the firmware program represented in Table IV. As shown in Table IV, each program control field PCON includes six bits.

TABLE VIII

PROGRAM CONTROL OPERATIONS IN FIRMWARE PROGRAM STATEMENTS

| OPER-ATION | FIELD CONTENT | COMMENTS |
|---|---|---|
| SEQZ | :1 | Skip on Equal Zero |
| SEQZN | :0 | Skip on Equal Zero Not |
| SCOUT | :3 | Skip on Carry Out |
| SCOUTN | :2 | Skip on Carry Out Not |
| SDMD | :5 | Skip on DMA Done |
| SDMDN | :4 | Skip on DMA Done Not |
| SRATE | :7 | Skip on Rate Error |
| SRATEN | :6 | Skip on Rate Error Not |
| SINT1 | :8 | Skip on Interrupt 1 |
| SINT1N | :9 | Skip on Interrupt 1 Not |
| SINT2 | :A | Skip on Interrupt 2 |
| SINT2N | :B | Skip on Interrupt 2 Not |
| SSACK | :D | Skip on Stop Acknowledge |
| SSACKN | :C | Skip on Stop Acknowledge Not |
| SCORD | :F | Skip on Command or Data |
| SCORDN | :E | Skip on Command or Data Not |
| SSAME | :10 | Skip on Same Channel |
| SSAMEN | :11 | Skip on Same Channel Not |
| SCDETN | :12 | Skip on Character Detection Not |
| SCDET | :13 | Skip on Character Detection |
| SSPECN | :14 | Skip on Special Character Not |
| SSPEC | :15 | Skip on Special Character |
| SINTP | :17 | Skip on Interrupt Pending |
| SINTPN | :16 | Skip on Interrupt Pending Not |
| SOUTF | :19 | Skip on Out Flag |
| SOUTFN | :18 | Skip on Out Flag Not |
| SPARN | :1A | Skip on Parity Not |
| SPAR | :1B | Skip on Parity |
| SKIP | :1F | Unconditional Skip |
| INC | :1E | Unconditional Increment |
| JEQZ | :21 | Jump on Equal Zero |
| JEQZN | :20 | Jump on Equal Zero Not |
| JCOUTN | :22 | Jump on Carry Out Not |
| JCOUT | :23 | Jump on Carry Out |
| JDMDN | :24 | Jump on DMA Done Not |
| JDMD | :25 | Jump on DMA Done |
| JRATEN | :26 | Jump on Rate Error Not |
| JRATE | :27 | Jump on Rate Error |
| JINT1 | :28 | Jump on Interrupt 1 |
| JINT1N | :29 | Jump on Interrupt 1 Not |
| JINT2 | :2A | Jump on Interrupt 2 |
| JINT2N | :2B | Jump on Interrupt 2 Not |
| JSACKN | :2C | Jump on Stop Acknowledge Not |
| JSACK | :2D | Jump on Stop Acknowledge |
| JCORDN | :2E | Jump on Command or Data Not |
| JCORD | :2F | Jump on Command or Data |
| JCDET | :33 | Jump on Character Detect |
| JCDETN | :32 | Jump on Character Detect Not |
| JINTPN | :36 | Jump on Interrupt Pending Not |
| JINTP | :37 | Jump on Interrupt Pending |
| JOUTFN | :38 | Jump on Out Flag Not |
| JOUTF | :39 | Jump on Out Flag |
| JPAR | :3B | Jump on Parity |
| JPARN | :3A | Jump on Parity Not |
| JMP | :3F | Unconditional Jump |

Firmware program control operations indicate a condition that will produce either a skip or a jump operation in the distributor microengine subunit DMS. Skip and jump operations, as well as increment operations, have been described above in conjunction with the discussion of FIGS. 9A and 9B. The various program control operations listed in Table VII may be considered as a list of input signals to test-tree logic circuit 36 (see FIG. 9A). The truth state of a selected input signal produces a skip operation, in which the ROM address counters 38, skip the next following increment of the present count by immediately going to the second following count, or a jump operation in which the ROM address counters 38 jump to another count, not necessarily related to the prior count. Such a jump operation corresponds to loading the ROM address counters 38 with a new count corresponding to the signals available on result bus lines RB00 through RB07. In this regard, see the discussion of FIG. 9B.

Thus, for example, if the program control field PCON in a firmware statement, includes the operation word SRATE, corresponding to a field content of hexadecimal 7, the corresponding output lines of the read-only memory array 40 produce that set of signals necessary to result in a skip operation. This skip operation will take place at the occurrence of the next clock signal if, and only if, the rate error signal RATER available at the input to the data selector 42 shown in FIG. 9A, is in a truth state of TRUE. On the other hand, by using a field content of hexadecimal 6 in the program control field PCON, the signals on the output lines of read-only memory array 40, correspond to a skip operation on the condition that the rate error signal RATER be in a FALSE truth state.

The program control field PCON also includes three unconditional operations in which the operation produced can be a skip, an increment, or a jump, irrespective of the truth state of any of the signals on the input to test-tree logic circuit 36. These unconditional operations correspond respectively to the unconditional skip SKIP, the unconditional increment INC, and the unconditional jump JMP. The unconditional operations have a field content of hexadecimal 1F, a field content of hexadecimal 1E, a field content of hexadecimal 3F, respectively.

Thus, it may be seen that the program control operations listed in Table VIII represent signals generated by ROM array 40 in FIG. 9B and control the operation of the distributor microengine subunit DMS, that is, whether to skip or increment or, on the other hand, whether to jump or increment, depending upon the truth state of a selected input signal to the test-tree logic circuit 36 (see FIG. 9A).

Table IX indicates the multiplexer control operations CONTROL in program statements. Multiplexer control operations are included in the program statement INST as a 5-bit field. By way of example, operation enable command ENCMD corresponding to a field content of hexadecimal 18, results in the enabling of the command control signal CMD for transfer to a selected peripheral-unit controller PUC. By way of further example, the operation load address register 1 LDADR1 corresponding to a field content in the multiplexer control portion of statement INST of hexadecimal 0, results in a loading of the address register 1 while operation load address register 2 LDADR2 corresponding to a field content of hexadecimal 1, produces the loading of address register 2 (see FIG. 7B where both registers are represented by Memory Address Registers 88).

TABLE IX

MULTIPLEXER CONTROL OPERATIONS IN FIRMWARE PROGRAM STATEMENTS

| OPERATION | FIELD CONTENT | COMMENTS |
|---|---|---|
| ENCMD | :18 | Enable Command Control Signal |
| ENSELT | :14 | Enable Select Control Signal |
| ENRST | :12 | Enable Reset Control Signal |
| ENOTPT | :11 | Enable Output Control Signal |
| CLRCON | :10 | Clear Control Signals |
| NOCON | :10 | No Control Signals |
| LDADR1 | :0 | Load Address Register 1 |
| LDADR2 | :1 | Load Address Register 2 |
| LDCONT | :2 | Load Control Signal |
| LDOUT | :3 | Load Output Buffer |
| CLKIO | :4 | Clock Input/Output |
| CLKINT | :C | Clock Interrupt |
| RSTIOF | :5 | Reset Output Flag |
| SETINT | :6 | Set Interrupt Flag |
| RSTSTP | :7 | Reset Stop Signal |
| LDADRS | :8 | Load Address Reg 1 and Start |
| LDCONS | :A | Load Control Signal and Start |

Thus, it may be seen that Tables V through IX represent the contents of many of the fields in the firmware program statements which control the 24-bit microword output of read-only memory array 40 and thus also control the various operations, signals, and circuits of the direct-memory-access multiplexer DMA-MUX. Tables IV through IX are explanatory of the statement portion of Table X, a description of which now follows.

Table X is an actual embodiment of a program listing of the firmware program that has been employed to operate the direct-memory-access multiplexer DMA-MUX manufactured in accordance with the hardware description provided above. In effect, the listing embodied in Table X is a how-to-use description of the invention herein disclosed, whereas the prior detailed description of the hardware of this invention is a how-to-make description.

TABLE X

| LINE NO. | ROM ADDRESS | ROM OUTPUT | ROUTINE | STMNT TYPE | STATEMENT |
|---|---|---|---|---|---|
| 0174 | 0000 | F0E55E | HOME | INST | ONES,ZEROS,NOOPF,RSTIOF,WFN,HOLD,INC |
| 0175 | | | | | *RESET CPU OUTPUT FLAG |
| 0184 | 0001 | 0C021E | HOMEP1 | IMED | ROM,SBUS,HOMEP2,WFN,LDACC,INC |
| 0206 | 0002 | F0EC49 | HOMEP2 | INST | ONES,ZEROS,NOOPF,CLKINT,WFN,HOLD,SINT1N |
| 0207 | | | | | *SKIP IF INT1 NOT PENDING |
| 0208 | 0003 | 8CD07F | | INST | FILE,SBUS,START,NOCON,WFN,HOLD,JMP |
| 0209 | | | | | *START FILE → RAC |
| 0210 | 0004 | 0C3079 | TSTIO | IMED | ROM,SBUS,CPUOUT,WFN,HOLD,JOUTF |
| 0211 | | | | | *GO TO CPUOUT IF OUTFLAG IS = "1" |
| 0212 | 0005 | F0EC49 | | INST | ONES,ZEROS,NOOPF,CLKINT,WFN,HOLD,SINT1N |
| 0213 | | | | | *CLK CHANNEL SELECT REG |
| 0214 | 0006 | 8CD07F | | INST | FILE,SBUS,START,NOCON,WFN,HOLD,JMP |
| 0215 | | | | | *START FILE → RAC |
| 0216 | 0007 | 0C026B | | IMED | ROM,SBUS,HOMEP2,WFN,HOLD,JINT2N |
| 0217 | | | | | *GO HOME IF INT2 NOT PENDING |
| 0240 | 0008 | 8C4356 | INT2 | INST | FILE,SBUS,WBCLSB,LDOUT,WFN,HOLD,SINTPN |
| 0241 | | | | | *WBCLSB → OUTBUF SKIP IF CPU INTERRUPT NOT SET |
| 0243 | 0009 | 0C027F | | UJMP | JUMP,HOMEP2,JONLY |
| 0244 | | | | | *GO TO HOMEP2 |
| 0246 | 000A | 0CF01E | INT21 | IMED | ROM,SBUS,:F0,WFN,LDACC,INC |
| 0247 | | | | | *:F0 → ACC |
| 0248 | 000B | 38F0DE | | INST | INTLOC,AANDS,TMP2,NOCON,WF,HOLD,INC |
| 0249 | | | | | *AUTO I/O INT LOCATION AND :F0 → TMP2 MASK LSB'S |
| 0250 | 000C | 0C031E | | IMED | ROM,SBUS,:03,WFN,LDACC,INC |
| 0251 | | | | | *:03 → ACC |
| 0252 | 000D | 38C1DE | | INST | INTLOC,AANDS,TMP1,LDADR2,WF,HOLD,INC |
| 0253 | | | | | *AUTO I/O INT LOCATION AND :03 → TMP1,ADR2 MASK MSB'S |
| 0254 | 000E | 86E0DE | | INST | FILE,APLUSS,TMP2,LDADR1,WF,HOLD,INC |
| 0255 | | | | | *SET ADDRESS POINTER FOR RIGHT BYTE OF BYTE COUNT LOC |
| 0257 | 000F | 0CD61E | | IMED | ROM,SBUS,DMANOT,WFN,LDACC,INC |
| 0258 | | | | | *DMANOT → ACC |
| 0260 | 0010 | 92D001 | | INST | FILE,AXORS,START,NOCON,WFN,LDACC,SEQZ |
| 0261 | | | | | *SEE IF RESTORE REQUIRED SKIP IF NOT |
| 0263 | 0011 | 0CC01E | | IMED | ROM,SBUS,:C0,WFN,LDACC,INC |
| 0264 | | | | | *:C0 → ACC SET IN AND OUT BITS IN ACC |
| 0266 | 0012 | E8EA5E | | INST | ONES,ACC,NOOPF,LDCONS,WFN,HOLD,INC |
| 0267 | | | | | *ACC → CONTROL REG START DMA |
| 0269 | 0013 | 0C021E | | IMED | ROM,SBUS,HOMEP2,WFN,LDACC,INC |
| 0270 | | | | | *HOMEP2 → ACC SET RETURN ADDRESS IN CASE INT2 ABORTED |
| 0271 | 0014 | 0C1464 | INT22 | IMED | ROM,SBUS,INT22,WFN,HOLD,JDMDN |
| 0272 | | | | | *WAIT TILL BYTE COUNT LSB'S ARE RESTORED TO MAIN MEMORY |
| 0273 | 0015 | 0C0268 | | IMED | ROM,SBUS,HOMEP2,WFN,HOLD,JINT1 |
| 0274 | | | | | *GO TO HOMEP2 IF INT1 PENDING |
| 0275 | 0016 | 8C635E | | INST | FILE,SBUS,BAMSB,LDOUT,WFN,HOLD,INC |
| 0276 | | | | | *BAMSB → OUTBUF |
| 0277 | 0017 | 8DE8DE | | INST | FILE,SBUSP1,TMP2,LDADRS,WF,HOLD,INC |
| 0278 | | | | | *TMP2 PLUS 1 → TMP2,ADR1 START DMA |
| 0279 | | | | | *SET ADDRESS POINTER FOR LEFT BYTE OF BUFFER ADDRESS |

TABLE X-continued

| LINE NO. | ROM ADDRESS | ROM OUTPUT | ROUTINE | STMNT TYPE | STATEMENT |
|---|---|---|---|---|---|
| 0280 | 0018 | 8CB01E | | INST | FILE,SBUS,STATUS,NOCON,WFN,LDACC,INC |
| 0281 | | | | | *STATUS FILE → ACC |
| 0284 | 001A | 0C1K64 | INT23 | IMED | ROM,SBUS,INT23,WFN,HOLD,JDMDN |
| 0285 | | | | | *WAIT TILL BUFFER ADDRESS MSB'S ARE RESTORED |
| 0286 | 001B | 8C835E | | INST | FILE,SBUS,BALSB,LDOUT,WFN,HOLD,INC |
| 0287 | | | | | *BALSB → OUTBUF |
| 0288 | 001C | 8DE8DE | | INST | FILE,SBUSP1,TMP2,LDADRS,WF,HOLD,INC |
| 0289 | | | | | *TMP2 PLUS 1 → ADR1 START DMA |
| 0290 | | | | | *SET ADDRESS POINTER FOR RIGHT BYTE OF BUFFER ADDRESS |
| 0295 | 001E | 0C7F1F | | IMED | ROM,SBUS,:7F,WFN,LDACC,SKIP |
| 0296 | | | | | *:7F → ACC |
| 0297 | 001F | 0C801F | | IMED | ROM,SBUS,:80,WFN,LDACC,SKIP |
| 0298 | | | | | *:80 → ACC |
| 0299 | 0020 | 98301F | | INST | FILE,AANDS,WBCMSB,NOCON,WFN,LDACC,SKIP |
| 0300 | | | | | *WBCMSB AND :7F → ACC |
| 0301 | | | | | *BUFFER POINTER IS IN UPPER 64K ADDRESS SPACE |
| 0302 | | | | | *FORCE MSB OF WBCMSB TO ZERO AND LOAD IT INTO ACC |
| 0304 | 0021 | 9E301E | | INST | FILE,AORS,WBCMSB,NOCON,WFN,LDACC,INC |
| 0305 | | | | | *WBCMSB OR :80 → ACC |
| 0306 | | | | | *BUFFER POINTER IS IN LOWER 64K OF ADDRESS SPACE |
| 0307 | | | | | *FORCE MSB OF WBCMSB TO ONE AND LOAD IT INTO ACC |
| 0309 | 0022 | 0C2264 | INT24 | IMED | ROM,SBUS,INT24,WFN,HOLD,JDMDN |
| 0310 | | | | | *WAIT TILL DMA IS DONE |
| 0312 | 0023 | 0C0168 | | IMED | ROM,SBUS,HOMEP1,WFN,HOLD,JINT1 |
| 0313 | | | | | *GO TO HOMEP1 IF INT1 PENDING |
| 0314 | 0024 | F0F05C | | INST | ONES,ZEROS,NOOPF,NOCON,WFN,HOLD,SSTRP |
| 0315 | 0025 | 8C235F | | INST | FILE,SBUS,WBCMSB,LDOUT,WFN,HOLD,SKIP |
| 0316 | 0026 | E8E35E | | INST | ONES,ACC,NOOPF,LDOUT,WFN,HOLD,INC |
| 0317 | 0027 | 0C031E | | IMED | ROM,SBUS,:03,WFN,LDACC,INC |
| 0318 | | | | | *:03 → ACC |
| 0320 | 0028 | 85E85E | | INST | FILE,SMNUSA,TMP2,LDADRS,WFN,HOLD,INC |
| 0321 | | | | | *SET ADDRESS POINTER FOR LEFT BYTE OF BYTE COUNT |
| 0323 | 0029 | 0C2964 | INT25 | IMED | ROM,SBUS,INT25,WFN,HOLD,JDMDN |
| 0324 | | | | | *WAIT TILL BYTE COUNT MSB'S ARE RESTORED TO MAIN MEMORY |
| 0325 | 002A | F0F81E | INT26 | INST | ONES,ZEROS,NOOPF,ENCMD,WFN,LDACC,INC |
| 0326 | | | | | *HOME → ACC SET CMD TAG TO PICO |
| 0328 | 002B | E9F01E | | INST | ONES,ACCP1,NOOPF,CLRCON,WFN,LDACC,INC |
| 0329 | | | | | *ACC PLUS 1 → ACC CLEAR CMD TAG |
| 0331 | 002C | E9E61E | | INST | ONES,ACCP1,NOOPF,SETINT,WFN,LDACC,INC |
| 0332 | | | | | *ACC PLUS 1 → ACC SET CPU INTERRUPT |
| 0334 | 002D | F0EC49 | | INST | ONES,ZEROS,NOOPF,CLKINT,WFN,HOLD,SINT1N |
| 0335 | | | | | *CLK CHANNEL SELECT REG SKIP IF INT1 NOT PENDING |
| 0337 | 002E | 8CD040 | | INST | FILE,SBUS,START,NOCON,WFN,HOLD |
| 0338 | 002F | E8E77F | | INST | ONES,ACC,NOOPF,RSTSTP,WFN,HOLD,JMP |
| 0339 | | | | | *START → RAC GO PERFORM INT1 SERVICE |
| 0340 | | | | | *ACC → RAC GO TO HOMEP2 AND RST STOP FLAG |
| 0357 | 0030 | 0C306C | CPUOUT | IMED | ROM,SBUS,CPUOUT,WFN,HOLD,JSACKN |
| 0358 | | | | | *WAIT FOR CPU TO STOP |
| 0360 | 0031 | 6EE40F | | INST | RBUF2,NSBUS,NOOPF,CLKIO,WFN,LDACC,SCORD |
| 0361 | | | | | *RBUF2 → ACC COMMAND WORD MSB'S TO ACC |
| 0362 | | | | | *SKIP IF OUTPUT COMMAND |
| 0364 | 0032 | 0C527F | | UJMP | JUMP,POUT,JONLY |
| 0365 | | | | | *INSTRUCTION WAS OUTPUT DATA GO TO POUT |
| 0367 | 0033 | 180141 | | IMED | ROM,AANDS,:1,WFN,HOLD,SEQZ |
| 0368 | | | | | *TST RESET BIT OF COMMAND WORD SKIP IF = "0" |
| 0370 | 0034 | 0C3E7F | | UJMP | JUMP,RESET,JONLY |
| 0371 | | | | | *GO EXECUTE RESET COMMAND |
| 0373 | 0035 | 180241 | | IMED | ROM,AANDS,:2,WFN,HOLD,SEQZ |
| 0374 | | | | | *TST BRANCH BIT OF COMMAND WORD SKIP IF = "0" |
| 0376 | 0036 | 0C5A7F | | UJMP | JUMP,BRANCH,JONLY |
| 0377 | | | | | *GO EXECUTE BRANCH COMMAND |
| 0379 | 0037 | 180441 | | IMED | ROM,AANDS,:4,WFN,HOLD,SEQZ |
| 0380 | | | | | *TST MODE BIT OF COMMAND WORD |
| 0382 | 0038 | 0C467F | | UJMP | JUMP,MODE,JONLY |
| 0383 | | | | | *GO EXECUTE SET MODE COMMAND |
| 0385 | 0039 | 188041 | | IMED | ROM,AANDS,:80,WFN,HOLD,SEQZ |
| 0386 | | | | | *TST SET SPECIAL CHARACTER BIT OF COMMAND WORD |
| 0387 | 003A | 0C4E7F | | UJMP | JUMP,SETSPC,JONLY |
| 0388 | | | | | *GO EXECUTE SET SPECIAL CHARACTER COMMAND |
| 0396 | 003D | 0C007F | | UJMP | JUMP,HOME,JONLY |
| 0397 | | | | | *STIMULUS LOST GO HOME |
| 0414 | 003E | 0C4176 | RESET | IMED | ROM,SBUS,RESET1,WFN,HOLD,JINTPN |
| 0415 | | | | | *IF INT NOT PENDING GO TO RESET1 |
| 0417 | 003F | F0F051 | | INST | ONES,ZEROS,NOOPF,NOCON,WFN,HOLD,SSAMEN |
| 0418 | | | | | *ARE WE RESETTING INTERRUPTING CHANNEL? |
| 0420 | 0040 | F0E65E | | INST | ONES,ZEROS,NOOPF,SETINT,WFN,HOLD,INC |
| 0421 | | | | | *YES, CLEAR INTERRUPT |
| 0423 | 0041 | F0F25E | RESET1 | INST | ONES,ZEROS,NOOPF,ENRST,WFN,HOLD,INC |

TABLE X-continued

| LINE NO. | ROM ADDRESS | ROM OUTPUT | ROUTINE | STMNT TYPE | STATEMENT |
|---|---|---|---|---|---|
| 0424 | | | | | *SET RESET TAG TO PUC |
| 0426 | 0042 | F0F01E | | INST | ONES,ZEROS,NOOPF,CLRCON,WFN,LDACC,INC |
| 0427 | | | | | *HOME → ACC CLEAR RESET TAG |
| 0429 | 0043 | F0EC49 | | INST | ONES,ZEROS,NOOPF,CLKINT,WFN,HOLD,SINT1N |
| 0430 | | | | | *CLK CHANNEL SELECT REG. SKIP IF INT1 NOT PENDING |
| 0432 | 0044 | 8CD07F | | INST | FILE,SBUS,START,NOCON,WFN,HOLD,JMP |
| 0433 | | | | | *START FILE → RAC |
| 0435 | 0045 | E9E57F | | INST | ONES,ACCP1,NOOPF,RSTIOF,WFN,HOLD,JMP |
| 0450 | 0046 | 0C401E | MODE | IMED | ROM,SBUS,:40,WFN,LDACC,INC |
| 0451 | | | | | *SET OUTPUT BIT IN ACC |
| 0453 | 0047 | E8E25E | | INST | ONES,ACC,NOOPF,LDCONT,WFN,HOLD,INC |
| 0454 | | | | | *TRANSFER TO CONTROL REG |
| 0456 | 0048 | 4EE35E | | INST | RBUF1,NSBUS,NOOPF,LDOUT,WFN,HOLD,INC |
| 0457 | | | | | *RBUF1 → OUTBUF MODE INFO TO OUTPUT BUFFER |
| 0459 | 0049 | F0F45E | | INST | ONES,ZEROS,NOOPF,ENSELT,WFN,HOLD,INC |
| 0460 | | | | | *SET SELT TAG TO PICO |
| 0462 | 004A | F0F01E | | INST | ONES,ZEROS,NOOPF,CLRCON,WFN,LDACC,INC |
| 0463 | | | | | *HOME → ACC CLEAR SELT TAG |
| 0465 | 004B | F0EC49 | | INST | ONES,ZEROS,NOOPF,CLKINT,WFN,HOLD,SINT1N |
| 0466 | 004C | 8CD07F | | INST | FILE,SBUS,START,NOCON,WFN,HOLD,JMP |
| 0467 | 004D | E9E57F | | INST | ONES,ACCP1,NOOPF,RSTIOF,WFN,HOLD,JMP |
| 0480 | 004E | 4E10DE | SETSPC | INST | RBUF1,NSBUS,SPCHAR,NOCON,WF,HOLD,INC |
| 0481 | | | | | *RBUF1 → SPCHAR SPECIAL CHAR TO CHAR DETECT FILE |
| 0483 | 004F | F0EC09 | | INST | ONES,ZEROS,NOOPF,CLKINT,WFN,LDACC,SINT1N |
| 0484 | 0050 | 8CD07F | | INST | FILE,SBUS,START,NOCON,WFN,HOLD,JMP |
| 0485 | 0051 | E9E57F | | INST | ONES,ACCP1,NOOPF,RSTIOF,WFN,HOLD,JMP |
| 0498 | 0052 | 0C401E | POUT | IMED | ROM,SBUS,:40,WFN,LDACC,INC |
| 0499 | | | | | *SET OUTPUT BIT IN ACC |
| 0501 | 0053 | E8E25E | | INST | ONES,ACC,NOOPF,LDCONT,WFN,HOLD,INC |
| 0502 | | | | | *TRANSFER TO CONTROL REG |
| 0504 | 0054 | 4EE35E | | INST | RBUF1,NSBUS,NOOPF,LDOUT,WFN,HOLD,INC |
| 0505 | | | | | *RBUF1 → OUTBUF DATA TO OUTPUT BUFFER |
| 0507 | 0055 | F0F15E | | INST | ONES,ZEROS,NOOPF,ENOTPT,WFN,HOLD,INC |
| 0508 | | | | | *SET OTPT TAG TO PUC |
| 0510 | 0056 | F0F01E | | INST | ONES,ZEROS,NOOPF,CLRCON,WFN,LDACC,INC |
| 0511 | | | | | *HOME → ACC CLEAR OTPT TAG |
| 0513 | 0057 | F0EC49 | | INST | ONES,ZEROS,NOOPF,CLKINT,WFN,HOLD,SINT1N |
| 0514 | 0058 | 8CD07F | | INST | FILE,SBUS,START,NOCON,WFN,HOLD,JMP |
| 0515 | 0059 | E9E57F | | INST | ONES,ACCP1,NOOPF,RSTIOF,WFN,HOLD,JMP |
| 0523 | 005A | 188040 | BRANCH | IMED | ROM,AANDS,:80,WFN,HOLD,SEQZN |
| 0524 | | | | | *TST DMA/NON DMA BIT OF COMMAND WORD SKIP IF NON DMA |
| 0526 | 005B | 0C5F7F | | UJMP | JUMP,BRNCH1,JONLY |
| 0527 | | | | | *GO TO BRNCH1 |
| 0537 | 005C | 0CD61E | NODMA | IMED | ROM,SBUS,DMANOT,WFN,LDACC,INC |
| 0538 | | | | | *ADDRESS OF DMANOT ROUTINE → ACC |
| 0540 | 005D | E8D0DE | | INST | ONES,ACC,START,NOCON,WF,HOLD,INC |
| 0541 | | | | | *ACC → START TRANSFER TO START FILE |
| 0543 | 005E | 0C937F | | UJMP | JUMP,NODMA1,JONLY |
| 0544 | | | | | *GO TO NODMA1 |
| 0562 | 005F | 0C031F | BRNCH1 | IMED | ROM,SBUS,:03,WFN,LDACC,INC |
| 0563 | | | | | *:03 → ACC |
| 0565 | 0060 | 3881DE | | INST | INTLOC,AANDS,TMP3,LDADR2,WF,HOLD,INC |
| 0566 | | | | | *INTLOC AND :03 → TMP3,ADR2 |
| 0567 | | | | | *SET MSB'S OF INT LOCATION |
| 0569 | 0061 | 0CF01E | | IMED | ROM,SBUS,:F0,WFN,LDACC,INC |
| 0570 | | | | | *:F0 → ACC |
| 0572 | 0062 | 38E8DE | | INST | INTLOC,AANDS,TMP2,LDADRS,WF,HOLD,INC |
| 0573 | | | | | *INTLOC AND :F0 → TMP2,ADR1, START DMA |
| 0574 | | | | | *SET LSB'S OF INT LOCATION |
| 0576 | 0063 | 8DF0DE | | INST | FILE,SBUSP1,TMP2,NOCON,WF,HOLD,INC |
| 0577 | | | | | *TMP2 + 1 → TMP2 BUMP LSB'S OF INTLOCATION ADDRESS |
| 0579 | 0064 | 0C6A1E | | IMED | ROM,SBUS,BRNCH3,WFN,LDACC,INC |
| 0580 | | | | | *BRNCH3 → ACC SET RETURN ADDRESS |
| 0582 | 0065 | 0C6564 | BRNCH2 | IMED | ROM,SBUS,BRNCH2,WFN,HOLD,JDMDN |
| 0583 | | | | | *WAIT TILL OP CODE BYTE IS ACCESSED |
| 0585 | 0066 | CED0C6 | | INST | DMABUF,NSBUS,TMP1,NOCON,WF,HOLD,SRATEN |
| 0586 | | | | | *DMABUF → TMP1 INCREMENT IF NON EXISTENT MEM ACCESSED |
| 0587 | | | | | *STORE OP CODE BYTE OF WORD1 |
| 0588 | 0067 | 0C007F | | UJMP | JUMP,HOME,JONLY |
| 0590 | 0068 | F0EC49 | | INST | ONES,ZEROS,NOOPF,CLKINT,WFN,HOLD,SINT1N |
| 0591 | | | | | *CLK CHANNEL SELECT REGISTER SKIP IF INT1 NOT PENDING |
| 0593 | 0069 | 8CD07F | | INST | FILE,SBUS,START,NOCON,WFN,HOLD,JMP |
| 0594 | | | | | *START → RAC GO PERFORM INT1 SERVICE |
| 0616 | 006A | F0E45E | BRNCH3 | INST | ONES,ZEROS,NOOPF,CLKIO,WFN,HOLD,INC |
| 0617 | | | | | *CLK CHANNEL SELECT REGISTER |
| 0619 | 006B | 8C815E | | INST | FILE,SBUS,TMP3,LDADR2,WFN,HOLD,INC |
| 0620 | | | | | *TMP3 → ADR2 LOAD MSB'S OF INT LOCATION POINTER |
| 0622 | 006C | 8DE8DE | | INST | FILE,SBUSP1,TMP2,LDADRS,WF,HOLD,INC |

TABLE X-continued

| LINE NO. | ROM ADDRESS | ROM OUTPUT | ROUTINE | STMNT TYPE | STATEMENT |
|---|---|---|---|---|---|
| 0623 | | | | | *TMP2 + 1 → TMP2,ADR1 |
| 0625 | | | | | *LOAD LSB'S OF INT LOCATION POINTER AND START DMA |
| 0626 | 006D | 0CC71E | | IMED | ROM,SBUS,:C7,WFN,LDACC,INC |
| 0627 | | | | | *:C7 → ACC |
| 0629 | 006E | 7AB0DE | | INST | RBUF2,AORSN,STATUS,NOCON,WF,HOLD,INC |
| 0630 | | | | | *RBUF2 AND :31 → STATUS |
| 0631 | | | | | *MASK BITS 11,12, AND 13 AND STORE IN STATUS WORD |
| 0633 | 006F | 0C7F1E | | IMED | ROM,SBUS,:7F,WFN,LDACC,INC |
| 0634 | | | | | *:7F → ACC |
| 0635 | 0070 | 0C7064 | BRNCH4 | IMED | ROM,SBUS,BRNCH4,WFN,HOLD,JDMDN |
| 0636 | | | | | *WAIT TILL BYTE COUNT MSB'S ACCESSED |
| 0638 | 0071 | DAF041 | | INST | DMABUF,AORSN,NOOPF,NOCON,WFN,HOLD,SEQZ |
| 0639 | | | | | *TEST MSB OF BYTE COUNT SKIP IF = "0" |
| 0641 | 0072 | 8DE8DF | | INST | FILE,SBUSP1,TMP2,LDADRS,WF,HOLD,SKIP |
| 0642 | | | | | *TMP2 + 1 → TMP2,ADR1 |
| 0643 | | | | | *LOAD LSB'S OF INT LOCATION POINTER AND START DMA |
| 0644 | | | | | *MSB'S STILL IN ADR2 |
| 0646 | 0073 | 8DE8DC | | INST | FILE,SBUSP1,TMP2,LDADRS,WF,HOLD,SSTRP |
| 0647 | | | | | *TMP2 + 1 → TMP2,ADR1 |
| 0648 | | | | | *LOAD LSB'S OF INT LOCATION POINTER AND START DMA |
| 0649 | | | | | *MSB'S STILL IN ADR2 SKIP IF 4 SERIES PROCESSOR |
| 0651 | 0074 | CE30DF | | INST | DMABUF,NSBUS,WBCMSB,NOCON,WF,HOLD,SKIP |
| 0652 | | | | | *DMABUF → WBCMSB |
| 0654 | 0075 | DC30DF | | INST | DMABUF,AANDSN,WBCMSB,NOCON,WF,HOLD,SKIP |
| 0655 | | | | | *DMABUF OR :80 → WBCMSB |
| 0657 | 0076 | F0F05F | | INST | ONES,ZEROS,NOOPF,NOCON,WFN,HOLD,INC |
| 0658 | | | | | *UNCONDITIONAL INCREMENT |
| 0664 | 0078 | 0C7D1E | | IMED | ROM,SBUS,BRNCH6,WFN,LDACC,INC |
| 0665 | | | | | *BRNCH6 → ACC SET RETURN ADDRESS |
| 0667 | 0079 | 0C7964 | BRNCH5 | IMED | ROM,SBUS,BRNCH5,WFN,HOLD,JDMDN |
| 0668 | | | | | *WAIT TILL BYTE COUNT LSB'S ARE ACCESSED |
| 0670 | 007A | CE50DE | | INST | DMABUF,NSBUS,WBCLSB,NOCON,WF,HOLD,INC |
| 0671 | | | | | *DMABUF → WBCLSB STORE BYTE COUNT LSB'S |
| 0673 | 007B | F0EC49 | | INST | ONES,ZEROS,NOOPF,CLKINT,WFN,HOLD,SINTIN |
| 0674 | | | | | *CLK CHANNEL SELECT REGISTER. SKIP IF INT1 NOT PENDING |
| 0676 | 007C | 8CD07F | | INST | FILE,SBUS,START,NOCON,WFN,HOLD,JMP |
| 0677 | | | | | *START → RAC GO PERFORM INT1 SERVICE |
| 0696 | 007D | F0E45E | BRNCH6 | INST | ONES,ZEROS,NOOPF,CLKIO,WFN,HOLD,INC |
| 0697 | | | | | *CLK CHANNEL SELECT REGISTER |
| 0699 | 007E | 8C815E | | INST | FILE,SBUS,TMP3,LDADR2,WFN,HOLD,INC |
| 0700 | | | | | *TMP3 → ADR2 LOAD MSB'S OF INT LOCATION POINTER |
| 0702 | 007F | 8DE8DE | | INST | FILE,SBUSP1,TMP2,LDADRS,WF,HOLD,INC |
| 0703 | | | | | *TMP2 + 1 → TMP2,ADR1 |
| 0704 | | | | | *LOAD LSB'S OF INT LOCATION POINTER AND START DMA |
| 0706 | 0080 | 8CD01E | | INST | FILE,SBUS,TMP1,NOCON,WFN,LDACC,INC |
| 0707 | | | | | *TMP1 → ACC LOAD OP CODE FILE TO ACC |
| 0709 | 0081 | 182041 | | IMED | ROM,AANDS,:20,WFN,HOLD,SEQZ |
| 0710 | | | | | *TEST IN/OUT BIT OF OP CODE SKIP IF "0" = INPUT |
| 0712 | 0082 | 0C401F | | IMED | ROM,SBUS,:40,WFN,LDACC,SKIP |
| 0713 | | | | | *:40 → ACC SET OUT ENABLE BIT IN ACC |
| 0715 | 0083 | 0C801E | | IMED | ROM,SBUS,:80,WFN,LDACC,INC |
| 0716 | | | | | *:80 → ACC SET IN ENABLE BIT IN ACC |
| 0718 | 0084 | 0C8464 | BRNCH7 | IMED | ROM,SBUS,BRNCH7,WFN,HOLD,JDMDN |
| 0719 | | | | | *WAIT TILL BUFFER ADDRESS MSB'S ACCESSED |
| 0721 | 0085 | 8DE85E | | INST | FILE,SBUSP1,TMP2,LDADRS,WFN,HOLD,INC |
| 0722 | | | | | *TMP2 + 1 → ADR1 LOAD LSB'S OF INT LOCATION POINTER |
| 0723 | | | | | *AND START DMA MSB'S STILL IN ADR2 |
| 0725 | 0086 | CE70DE | | INST | DMABUF,NSBUS,BAMSB,NOCON,WF,HOLD,INC |
| 0726 | | | | | *DMABUF → BAMSB STORE BUFFER ADDRESS MSB'S |
| 0728 | 0087 | 9EB0DE | | INST | FILE,AORS,STATUS,NOCON,WF,HOLD,INC |
| 0729 | | | | | *ACC OR STATUS → STATUS "OR" IN RESULT OF OP CODE TEST |
| 0731 | 0088 | 0C8D1E | | IMED | ROM,SBUS,BRNCH9,WFN,LDACC,INC |
| 0732 | | | | | *BRNCH9 → ACC STORE RETURN ADDRESS |
| 0733 | 0089 | 0C8964 | BRNCH8 | IMED | ROM,SBUS,BRNCH8,WFN,HOLD,JDMDN |
| 0734 | | | | | *WAIT TILL BUFFER ADDRESS LSB'S ACCESSED |
| 0736 | 008A | CE90DE | | INST | DMABUF,NSBUS,BALSB,NOCON,WF,HOLD,INC |
| 0737 | | | | | *DMABUF → BALSB STORE BUFFER ADDRESS LSB'S |
| 0739 | 008B | F0EC49 | | INST | ONES,ZEROS,NOOPF,CLKINT,WFN,HOLD,SINTIN |
| 0740 | | | | | *CLK CHANNEL SELECT REGISTER SKIP IF INT1 NOT PENDING |
| 0741 | 008C | 8CD04C | | INST | FILE,SBUS,START,NOCON,WFN,HOLD,JUMP |
| 0742 | | | | | *START → RAC GO PERFORM INT1 SERVICE |
| 0756 | 008D | F0E45E | BRNCH9 | INST | ONES,ZEROS,NOOPF,CLKIO,WFN,HOLD,INC |
| 0757 | | | | | *CLK CHANNEL SELECT REGISTER |
| 0759 | 008E | 0C801E | | IMED | ROM,SBUS,:80,WFN,LDACC,INC |
| 0760 | | | | | *:80 → ACC |
| 0762 | 008F | 98B040 | | INST | FILE,AANDS,STATUS,NOCON,WFN,HOLD,SEQZN |
| 0763 | | | | | *TEST ENIN FLAG IN STATUS SKIP IF = "1" |
| 0765 | 0090 | 0CBD1F | | IMED | ROM,SBUS,OUT,WFN,LDACC,SKIP |

TABLE X-continued

| LINE NO. | ROM ADDRESS | ROM OUTPUT | ROUTINE | STMNT TYPE | STATEMENT |
|---|---|---|---|---|---|
| 0766 | | | | | *OUT → ACC ADDRESS OF OUTPUT ROUTINE TO ACC |
| 0768 | 0091 | 0C9E1E | | IMED | ROM,SBUS,IN,WFN,LDACC,INC |
| 0769 | | | | | *IN → ACC ADDRESS OF INPUT ROUTINE TO ACC |
| 0771 | 0092 | E8C7DE | | INST | ONES,ACC,START,RSTSTP,WF,HOLD,INC |
| 0772 | | | | | *ACC → START TRANSFER TO START FILE |
| 0792 | 0093 | 4EE35E | NODMA1 | INST | RBUF1,NSBUS,NOOPF,LDOUT,WFN,HOLD,INC |
| 0793 | | | | | *RBUF1 → OUTBUF LOAD LSB'S OF COMMAND WORD TO OUTBUF |
| 0795 | 0094 | 0C401E | | IMED | ROM,SBUS,:40,WFN,LDACC,INC |
| 0796 | | | | | *:40 → ACC SET OUTPUT BIT IN ACC |
| 0798 | 0095 | E8E25E | | INST | ONES,ACC,NOOPF,LDCONT,WFN,HOLD,INC |
| 0799 | | | | | *ACC → CONTROL TRANSFER TO CONTROL REGISTER |
| 0801 | 0096 | 6EF01E | | INST | RBUF2,NSBUS,NOOPF,NOCON,WFN,LDACC,INC |
| 0802 | | | | | *RBUF2 → ACC LOAD MSB'S OF COMMAND WORD TO ACC |
| 0804 | 0097 | 180441 | | IMED | ROM,AANDS,:04,WFN,HOLD,SEQZ |
| 0805 | | | | | *TEST MODE BIT IN COMMAND WORD SKIP IF = "0" |
| 0807 | 0098 | F0FC5F | | INST | ONES,ZEROS,NOOPF,ENCMD;ENSELT,WFN,HOLD,SKIP |
| 0808 | | | | | *SET CMD AND SELT TAGS TO PUC |
| 0810 | 0099 | F0F85E | | INST | ONES,ZEROS,NOOPF,ENCMD,WFN,HOLD,INC |
| 0811 | | | | | *SET CMD TAG TO PUC |
| 0813 | 009A | F0F01E | | INST | ONES,ZEROS,NOOPF,CLRCON,WFN,LDACC,INC |
| 0814 | | | | | *HOME → ACC CLEAR TAG(S) |
| 0816 | 009B | F0EC49 | | INST | ONES,ZEROS,NOOPF,CLKINT,WFN,HOLD,SINT1N |
| 0817 | | | | | *CLK CHANNEL SELECT REGISTER SKIP IF INT1 NOT PENDING |
| 0819 | 009C | 8CD07F | | INST | FILE,SBUS,START,NOCON,WFN,HOLD,JMP |
| 0820 | | | | | *START → ACC GO PERFORM INT1 SERVICE |
| 0822 | 009D | E9E57F | | INST | ONES,ACCP1,NOOPF,RSTIOF,WFN,HOLD,JMP |
| 0843 | 009E | 8D80C3 | IN | INST | FILE,SBUSP1,BALSB,LDADR1,WF,HOLD,SCOUT |
| 0844 | | | | | *BALSB FILE + 1 → BALSB FILE,ADR1 SKIP IF CARRY OUT |
| 0846 | 009F | 8C615F | | INST | FILE,SBUS,BAMSB,LDADR2,WFN,HOLD,SKIP |
| 0847 | | | | | *BAMSB FILE → ADR2 |
| 0849 | 00A0 | 8D61C3 | | INST | FILE,SBUSP1,BAMSB,LDADR2,WF,HOLD,SCOUT, |
| 0850 | | | | | *BAMSB FILE + 1 → BAMSB FILE, ADR2 |
| 0851 | | | | | *GOT CARRY FROM LSB'S BUMP MSB'S SKIP IF CARRY OUT |
| 0853 | 00A1 | 8CAA5F | | INST | FILE,SBUS,STATUS,LDCONS,WFN,HOLD,SKIP |
| 0854 | | | | | *STATUS FILE → CONTROL |
| 0855 | | | | | *LOAD CONTROL START DMA CYCLE |
| 0857 | 00A2 | 8DAADE | | INST | FILE,SBUSP1,STATUS,LDCONS,WF,HOLD,INC |
| 0858 | | | | | *STATUS FILE + 1 → STATUS FILE,CONTROL |
| 0859 | | | | | *GOT CARRY FROM MSB'S BUMP LOAD CONTROL |
| 0860 | | | | | *START DMA CYCLE |
| 0862 | 00A3 | 8D50C3 | | INST | FILE,SBUSP1,WBCLSB,NOCON,WF,HOLD,SCOUT |
| 0863 | | | | | *WCLSB FILE + 1 → WCLSB |
| 0864 | | | | | *BUMP LSB'S OF BYTE COUNT SKIP IF CARRY OUT |
| 0865 | 00A4 | 0CA77F | | UJMP | JUMP,IN1,JONLY |
| 0866 | | | | | *NO CARRY GO TO IN1 |
| 0868 | 00A5 | 8D30C2 | | INST | FILE,SBUSP1,WBCMSB,NOCON,WF,HOLD,SCOUTN |
| 0869 | | | | | *WCMSB FILE + 1 → WCMSB FILE |
| 0870 | | | | | *BUMP MSB'S OF BYTE COUNT SKIP IF NO CARRY OUT |
| 0872 | 00A6 | 0CBA7F | | UJMP | JUMP,EOBIN,JONLY |
| 0873 | | | | | *GOT CARRY THEREFORE BYTE COUNT = 0 GO TO EOBIN |
| 0875 | 00A7 | 0CAD73 | IN1 | IMED | ROM,SBUS,CHARD,WFN,HOLD,JCDET |
| 0876 | | | | | *TEST CHARACTER DETECTION BIT JUMP TO CHARD IF = "1" |
| 0878 | 00A8 | 0CA864 | IN2 | IMED | ROM,SBUS,IN2,WFN,HOLD,JDMDN |
| 0879 | | | | | *WAIT TILL DATA TRANSFER IS COMPLETE |
| 0881 | 00A9 | F0F846 | | INST | ONES,ZERO,NOOPF,ENCMD,WFN,HOLD,SRATEN |
| 0882 | | | | | *SET CMD TAG TO PUC TST FOR NON EXISTENT MEM ERROR |
| 0884 | 00AA | F0F85E | | INST | ONES,ZEROS,NOOPF,ENCMD,WFN,HOLD,INC |
| 0885 | | | | | *NON EXISTENT MEM ERROR HOLD CMD TAG |
| 0887 | 00AB | F0F05E | | INST | ONES,ZEROS,NOOPF,CLRCON,WFN,HOLD,INC |
| 0888 | | | | | *CLR CMD TAG |
| 0890 | 00AC | 0CB77F | | UJMP | JUMP,CHARD2,JONLY |
| 0891 | | | | | *GO TO CHARD2 |
| 0914 | 00AD | 0CAD64 | CHARD | IMED | ROM,SBUS,CHARD,WFN,HOLD,JDMDN |
| 0915 | | | | | *WAIT TILL DATA TRANSFER IS COMPLETE |
| 0917 | 00AE | E8F0C6 | | INST | ONES,ACC,TMP2,NOCON,WF,HOLD,SRATEN |
| 0918 | | | | | *ACC → TMP2 STORE RETURN ADDRESS TST NONEXISTENT MEM ERR |
| 0920 | 00AF | 0CBB7F | | UJMP | JUMP,EOBIN1,JONLY |
| 0921 | | | | | *NON EXISTENT MEM ERROR GO TO EOBIN1 |
| 0923 | 00B0 | CEF015 | | INST | DMABUF,NSBUS,NOOPF,NOCON,WFN,LDACC,SSPEC |
| 0924 | | | | | *DMABUF → ACC SKIP IF SPECIAL CHAR DETECTION DESIRED |
| 0926 | 00B1 | 120D1F | | IMED | ROM,AXORS,:0D,WFN,LDACC,SKIP |
| 0927 | | | | | *ACC EXCLUSIVE OR :0D → ACC |
| 0929 | 00B2 | 9210A | | INST | FILE,AXORS,SPCHAR,NOCON,WFN,LDACC,SPARN |
| 0930 | | | | | *ACC EXCLUSIVE OR SPEC CHAR → ACC SKIP IF NO PARITY |
| 0932 | 00B3 | 187F1E | | IMED | ROM,AANDS,:7F,WFN,LDACC,INC |
| 0933 | | | | | *STRIP MSB FROM RESULT |
| 0935 | 00B4 | E8F840 | | INST | ONES,ACC,NOOPF,ENCMD,WFN,HOLD,SEQZN |
| 0936 | | | | | *SET CMD TAG TO PUC TST FOR COMPARISON |
| 0938 | 00B5 | F0F85E | | INST | ONES,ZEROS,NOOPF,ENCMD,WFN,HOLD,INC |

TABLE X-continued

| LINE NO. | ROM ADDRESS | ROM OUTPUT | ROUTINE | STMNT TYPE | STATEMENT |
|---|---|---|---|---|---|
| 0939 | | | | | *GOT COMPARISON HOLD CMD TAG |
| 0941 | 00B6 | 8CF01E | CHARD1 | INST | FILE,SBUS,TMP2,CLRCON,WFN,LDACC,INC |
| 0942 | | | | | *TMP2 → ACC RESTORE RETURN ADDRESS CLR CMD TAG |
| 0951 | 00B7 | F0EC49 | CHARD2 | INST | ONES,ZEROS,NOOPF,CLKINT,WFN,HOLD,SINT1N |
| 0952 | | | | | *CLK CHANNEL SELECT REG SKIP IF INT1 NOT PENDING |
| 0954 | 00B8 | 8CD07F | | INST | FILE,SBUS,START,NOCON,WFN,HOLD,JMP |
| 0955 | | | | | *START → RAC GO PERFORM INT1 SERVICE |
| 0957 | 00B9 | E8E77F | | INST | ONES,ACC,NOOPF,RSTSTP,WFN,HOLD,JMP |
| 0958 | | | | | *ACC → RAC RETURN AND RESET THE STOP FLAG |
| 0966 | 00BA | 0CBA64 | EOBIN | IMED | ROM,SBUS,EOBIN,WFN,HOLD,JDMDN |
| 0967 | | | | | *WAIT TILL DMA IS DONE |
| 0975 | 00BB | E8F8DE | EOBIN1 | INST | ONES,ACC,TMP2,ENCMD,WF,HOLD,INC |
| 0976 | | | | | *SET CMD TAG TO PUC |
| 0978 | 00BC | 0CB67F | | UJMP | JUMP,CHARD1,JONLY |
| 0979 | | | | | *GO TO CHARD1 |
| 1002 | 00BD | 8D80C3 | OUT | INST | FILE,SBUSP1,BALSB,LDADR1,WF,HOLD,SCOUT |
| 1003 | | | | | *BALSB FILE + 1 → BALSB FILE, ADR1 SKIP IF CARRY OUT |
| 1005 | 00BE | 8C615F | | INST | FILE,SBUS,BAMSB,LDADR2,WFN,HOLD,SKIP |
| 1006 | | | | | *BAMSB FILE → ADR2 |
| 1008 | 00BF | 8D61C3 | | INST | FILE,SBUSP1,BAMSB,LDADR2,WF,HOLD,SCOUT |
| 1009 | | | | | *BAMSB FILE + 1 → BAMSB FILE, ADR2 |
| 1010 | | | | | *GOT CARRY FROM LSB'S BUMP MSB'S SKIP IF CARRY OUT |
| 1012 | 00C0 | 8CAA5F | | INST | FILE,SBUS,STATUS,LDCONS,WFN,HOLD,SKIP |
| 1013 | | | | | *STATUS FILE → CONTROL |
| 1014 | | | | | *LOAD CONTROL START DMA CYCLE |
| 1016 | 00C1 | 8DAADE | | INST | FILE,SBUSP1,STATUS,LDCONS,WF,HOLD,INC |
| 1017 | | | | | *STATUS FILE + 1 → STATUS FILE, CONTROL |
| 1018 | | | | | *GOT CARRY FROM MSB'S BUMP LOAD CONTROL |
| 1019 | | | | | *START DMA CYCLE |
| 1021 | 00C2 | 8D50C3 | | INST | FILE,SBUSP1,WBCLSB,NOCON,WF,HOLD,SCOUT |
| 1022 | | | | | *WCLSB FILE + 1 → WCLSB |
| 1023 | | | | | *BUMP LSB'S OF BYTE COUNT SKIP IF CARRY OUT |
| 1025 | 00C3 | 0CC67F | | UJMP | JUMP,OUT1,JONLY |
| 1026 | | | | | *NO CARRY GO TO OUT1 |
| 1028 | 00C4 | 8D30C2 | | INST | FILE,SBUSP1,WBCMSB,NOCON,WF,HOLD,SCOUTN |
| 1029 | | | | | *WCMSB FILE + 1 → WCMSB FILE |
| 1030 | | | | | *BUMP MSB'S OF BYTE COUNT SKIP IF NO CARRY OUT |
| 1032 | 00C5 | 0CD07F | | UJMP | JUMP,EOBOUT,JONLY |
| 1033 | | | | | *GOT CARRY THEREFORE BYTE COUNT = 0 GO TO EOBOUT |
| 1035 | 00C6 | 0CC664 | OUT1 | IMED | ROM,SBUS,OUT1,WFN,HOLD,JDMDN |
| 1036 | | | | | *WAIT TILL DMA IS DONE |
| 1038 | 00C7 | CEE35E | | INST | DMABUF,NSBUS,NOOPF,LDOUT,WFN,HOLD,INC |
| 1039 | | | | | *DMABUF → OUTBUF |
| 1041 | 00C8 | F0F15E | | INST | ONES,ZEROS,NOOPF,ENOTPT,WFN,HOLD,INC |
| 1042 | | | | | *SET OTPT TAG TO PUC |
| 1044 | 00C9 | F0F05E | | INST | ONES,ZEROS,NOOPF,CLRCON,WFN,HOLD,INC |
| 1045 | | | | | *CLEAR OTPT TAG |
| 1047 | 00CA | F0F846 | | INST | ONES,ZEROS,NOOPF,ENCMD,WFN,HOLD,SRATEN |
| 1048 | | | | | *SET CMD TAG TO PUC TST IF NON EXISTENT MEM ACCESSED |
| 1050 | 00CB | F0F85E | | INST | ONES,ZEROS,NOOPF,ENCMD,WFN,HOLD,INC |
| 1051 | | | | | *HOLD CMD TAG |
| 1053 | 00CC | F0F05E | OUT2 | INST | ONES,ZEROS,NOOPF,CLRCON,WFN,HOLD,INC |
| 1054 | | | | | *CLEAR CMD TAG |
| 1056 | 00CD | F0EC49 | | INST | ONES,ZEROS,NOOPF,CLKINT,WFN,HOLD,SINT1N |
| 1057 | 00CE | 8CD07F | | INST | FILE,SBUS,START,NOCON,WFN,HOLD,JMP |
| 1058 | 00CF | E8E77F | | INST | ONES,ACC,NOOPF,RSTSTP,WFN,HOLD,JMP |
| 1068 | 00D0 | 0CD064 | EOBOUT | IMED | ROM,SBUS,EOBOUT,WFN,HOLD,JDMDN |
| 1069 | | | | | *WAIT TILL DMA IS DONE |
| 1071 | 00D1 | CEE35E | | INST | DMABUF,NSBUS,NOOPF,LDOUT,WFN,HOLD,INC |
| 1072 | | | | | *DMABUF → OUTBUF |
| 1074 | | | | | *SET OTPT TAG TO PUC |
| 1075 | 00D2 | F0F15E | | INST | ONES,ZEROS,NOOPF,ENOTPT,WFN,HOLD,INC |
| 1077 | 00D3 | F0F05E | | INST | ONES,ZEROS,NOOPF,CLRCON,WFN,HOLD,INC |
| 1078 | | | | | *CLEAR OTPT TAG |
| 1080 | 00D4 | F0F85E | | INST | ONES,ZEROS,NOOPF,ENCMD,WFN,HOLD,INC |
| 1081 | | | | | *SET CMD TAG |
| 1083 | 00D5 | 0CCC7F | | UJMP | JUMP,OUT2,JONLY |
| 1084 | | | | | *GO TO OUT2 |
| 1097 | 00D6 | 120241 | DMANOT | IMED | ROM,AXORS,:2,WFN,HOLD,SEQZ |
| 1098 | 00D7 | E8F07F | | INST | ONES,ACC,NOOPF,NOCON,WFN,HOLD,JMP |
| 1099 | | | | | *ACC → RAC RETURN TO CALLER |
| 1100 | 00D8 | F0E75E | | INST | ONES,ZEROS,NOOPF,RSTSTP,WFN,HOLD,INC |
| 1101 | | | | | *RESET STOP FLAG |
| 1103 | 00D9 | 0C047F | | UJMP | JUMP,TSTIO,JONLY |

Table X includes a column entitled line number, a column entitled ROM address, a column entitled ROM output, a column entitled Routine, a column entitled Statement type STMNT TYPE, and one entitled Statement.

The line number column includes a line number for each statement or statement explanation for the convenience of easily referring to a particular statement. Line numbers have no other significance. The ROM address column indicates the hexadecimal representation of the eight binary signals applied to the input terminals of the read-only memory units 54, 56, 58, 60, 62, and 64 that constitute read-only memory array 40. Accordingly, the ROM address corresponds to the truth state of the eight signals applied to the input terminals of the read-only memory units shown in FIG. 9B.

The ROM output column is a listing of hexadecimal representations of the 24-bit microword produced at the output terminals of the read-only memory units of read-only memory array 40 (see FIG. 9B).

Converting the ROM output hexadecimal code into a binary code that is twenty-four bits wide, the ones and zeros of the binary code indicate truth conditions of the signals at the output of the six read-only memory units shown in FIG. 9B. In this way, it is possible to determine the status of signals throughout the multiplexer DMA-MUX.

The column labeled Routine gives a name to a statement or to a set of statements that in combination produce a desired resultant operation in the DMA-multiplexer DMA-MUX.

The column labeled Statement Type STMNT TYPE indicates which one of the three types of program statements indicated in Table IV, is represented by the statement being made at that point in the firmware program.

The rightmost column of Table X indicates the 24-bit microword statement at each location in the program. The statement will be one of three types of statements included in Table IV and will include the fields listed in Tables V through IX.

A brief summary of the operations being performed in response to the statement of Table X, is in most cases included below each such statement and is denoted by a precursor asterisk. These summaries require no further explanation except to note that the term "control" is used in conjunction with a load control signal LDCONT in the multiplexer control word in a statement, and it indicates that some signals are loaded into the Opcode register 14 during that operation.

By way of further explanation of Table X, the first entry in each of the columns in Table X will now be discussed. As previously indicated, a line number is merely a convenient means of referring to a particular statement. Line 174 is the first line number of Table X. The ROM address, that is, the combination of input signals to the six read-only memory units comprising read-only memory array 40 is all zeros, that is, all eight signals applied to the terminals of each read-only memory unit are FALSE. For the program statement at line 174, the ROM output may be represented in hexadecimal form by FOE55E, and in binary form by 111100001110010101011110. These ones and zeros represent the truth states of the twenty-four signals appearing at the output terminals of the read-only memory units 54, 56, 58, 60, 62, and 64 or read-only memory array 40. The statement appearing at line 174 has been given a routine name HOME. Most routines listed in Table X are comprised of a plurality of statements in a particular sequence. However, some routines, including the routine HOME, correspond to only one statement.

The statement type is an indication of which one of the three types of program statements shown in Table IV, a particular statement may be. In the case of line 174, it is an instruction statement INST. Therefore, the statement includes a 3-bit source field, a 5-bit ALU field, a 3-bit file field, a 5-bit Control field, a 1-bit write file field, a 1-bit accumulator field, and a 6-bit program control field.

The statement appearing at line 174 includes a ONES term which corresponds to the ONES source field. As shown in Table V, ONES means that the source bus is not used and therefore it does not matter what truth state the source bus signals are in.

The second term of the statement is Zeros, which, as shown in Table IV, is the 5-bit ALU field. As shown in Table VI, Zeros in the ALU field results in all zeros being placed on the result bus by the arithmetic logic subunit ALS.

The next word in the program statement is NOOPF. As shown in Table IV, this is the 3-bit file field and, as indicated in Table VII, a NOOPF operation corresponds to no file operation.

The 5-bit control field contains RSTIOF, which is shown in Table IX and is an operation which resets output flags to FALSE.

The write file field has a write-file-not signal, which means nothing is being written into the file storage unit.

The accumulator field contains Hold, which indicates that the contents of the accumulator are to be held fixed.

The program control field, a 6-bit field, contains an unconditional increment operation INC, and therefore produces an increment operation in the ROM address counter 38 shown in FIG. 9B. The purpose of the statement appearing at line 174 is briefly indicated on the following line, line 175, in which it is indicated that the function of the prior statement is to reset the central processor unit CPU output flag.

For purposes of illustrating the second type of statement type, namely, an immediate statement IMED, line 210 of Table X will now be examined. As indicated under the ROM address column, the statement appearing at line 209 employs a ROM address of hexadecimal 0004. The output of the read-only memory unit array 40 in FIG. 9B, in hexadecimal form is 0C3079. In binary form, 0C3079 corresponds to a ROM output address 000011000011000001111001 on the twenty-four output terminals of the six read-only memory units comprising read-only memory array 40.

The name given this particular routine is test input-/output TSTIO.

As shown in Table IV, the IMED statement type includes a 3-bit source field, a 5-bit ALU field, an 8-bit immediate field IMEDE, a 1-bit write file field, a 1-bit accumulator field, and a 6-bit program control field. The statement appearing at line 210 of the program listed in Table X, has a ROM source indicating that the field content in the source field is 000 corresponding to the placement of ROM literals on the S-bus. The ALU field contains the term SBUS, thereby indicating that the contents of the source bus S-bus, are placed directly on the result bus R-bus without modification. The immediate field has the term CPUOUT which is the name of another major routine and indicates that point in the program to be the destination for the program's next statement if a certain condition is met. The write file field has a write-file-not bit WFN in it, indicating that this is not an operation in which signals will be written into the file storage unit 30.

The accumulator field contains Hold, indicating that the contents of the accumulator 26 are held fixed and not used and the program control field contains a jump on outflag JOUTF operation, indicating that the distributor microengine subunit is to jump to the routine CPU-OUT if, and only if, the outflag signal is in a truth state of TRUE. Of course, the alternative condition, namely, an outflag signal in a truth state of FALSE, produces an increment operation in the distributor microengine subunit DMS which results in the program sequence proceeding with the statement appearing at line 212.

The third type of statement indicated in Table IV, namely, the unconditional jump statement UJMP is discussed in conjunction with program line 243 as an example. As indicated in Table X under the ROM address column on line 243, the hexadecimal representation of the input of the signals appearing at the input terminals to the read-only memory units in read-only memory array 40, is 0009. The corresponding hexadecimal representation of the output signals of read-only memory units comprising read-only memory array 40 is 0C027F, which corresponds to the 24-bit binary microcode 000011000000001001111111. Since this unconditional jump statement is part of an ongoing routine, there is no new routine name under the routine column corresponding to line 243. The statement type indicated is an unconditional jump UJMP. The statement, as indicated in Table IV, has three fields, a jump field which is eight bits wide, a jump-address field which is eight bits wide, and a jump-only field which is eight bits wide.

The unconditional jump statement UJMP is a special form of the instruction statement IMED, but which always represents a particular combination of fields and therefore makes it easier and more convenient to use frequently. The jump field JUMP, which is an 8-bit field, corresponds to ROM source field and an ALU operation, corresponding to SBUS in which the contents of the source bus are passed directly to the result bus R-bus without modification. The contents of the jump-only field correspond to a write file condition of write-file-not, an accumulator field of Hold, and a program control field of unconditional jump. The middle 8-bit field, namely, the jump-address field, includes the name of the destination routine for the unconditional jump statement. In the case of line 243, the jump-address field contains the HOMEP2 routine as a destination for the jump operation.

Thus it may be seen that Tables IV through IX provide explanation of the various fields that constitute each statement of the program listing provided in Table X and indicate how Table X is to be read and interpreted and what is taking place at the read-only-memory-unit output terminals in response to each program statement.

In order to further explain Table X and the circuit implications of a series of program statements, the IN routine will now be described in detail in conjunction with the figures previously discussed in the detailed description of the invention. Although most of the major routines have already been described in some detail, the IN routine description that follows should be considered representative of all the routines insofar as understanding the details of Table X and in the way each statement of Table X corresponds to the various signals and circuits previously described.

By way of a preface, it is to be understood that in the ordinary practice of the invention, prior to the IN routine, the firmware program will be in an idle loop, that is, in the HOME routine in which the DMA-multiplexer DMA-MUX will have waited for the occurrence of any of three signals. These signals are the data-service-interrupt signal IN1, the end-of-block interrupt signal IN2, or a central processor unit output signal. Receipt of such signals by the multiplexer DMA-MUX, results in a sequence of routines to carry out responsive operations.

An IN routine is performed in response to a signal from the central processor unit CPU. The central processor unit, in accordance with the software program in the main-memory unit MMU, transfers the appropriate signals to commence a data transfer operation in which data will be transferred from a selected peripheral unit and peripheral-unit controller PUC to the direct-memory access multiplexer DMA-MUX and the main-memory unit MMU of the computer unit CU.

In response to a CPU output signal, the distributor microengine subunit DMS performs a CPUOUT routine to determine the type of command received from the central processor unit. Assuming that the computer unit CU has initiated a data transfer operation, the computer unit CU will have issued a command word (see Table II) causing the distributor microengine subunit to perform a branch routine in which it assembles the interrupt location address corresponding to the selected peripheral-unit controller, obtains access to the Auto I/O block stored in a preprogrammed, preselected location in the main-memory unit, stores the most significant bytes and least significant bytes of the Auto I/O block in the file storage unit, sets the character detection and parity standardization enable signals in the STATUS word of the file storage unit 30, and then goes into a NODMA1 routine in which a branch address is transferred to the selected peripheral-unit controller and the command signal CMD is enabled and transferred to the same peripheral-unit controller PUC.

In response to the branch address and the command signal, the selected peripheral-unit controller, when ready to transmit data to the computer unit's main-memory unit, generates a data-service-interrupt signal IN1. In response to the interrupt signal, the distributor microengine subunit DMS goes to the IN routine for the purpose of transferring the input data to the main-memory unit. It is at this point in the sequence of operations that the IN routine commences at line 843 of the firmware program listing of Table X.

As shown in Table X at line 843, the input ROM address in hexadecimal form is 009E and the resultant ROM output comprises signals which in hexadecimal form are represented by 8D8OC3, which is equivalent to the binary representation 100011011000000011000011.

For purposes of indicating which signals generated by the read-only memory array 40, shown in FIG. 9B, correspond to the 24-bit microcode, at bit number, in parentheses, has been included on the output lines of the read-only memory units 54, 56, 58, 60, 62, and 64 respectively. These bit numbers indicate how the output signals correspond to the bit position, starting with (1) and proceeding to (24) from left to right, in the 24-bit microword. Accordingly, by checking the bit number shown in FIG. 9B against the 24-bit microword for the ROM output corresponding to the statement on line 843 of the firmware program listing, the truth states of all twenty-four read-only memory output signals may be ascertained.

In the case of the ROM output at line 843, the following signals have truth states of TRUE: RCS1, AS2, AS1, CIN, FA2, ACC, WF, TTO, and TTF.

Line 843 of the IN routine is an instruction statement INST which, as shown in Table IV, includes a source field, an ALU field, a file field, a control field, a write file bit, an accumulator bit, and a program control field. As indicated by the statement, the source in this particular instruction statement is the file storage unit 30. Accordingly, the contents of a particular part of the file storage unit 30 will be transferred to the S-bus to become a source for the arithmetic logic unit 28. The ALU field contains the term SBUSP1 meaning that the operation to be performed in the arithmetic logic subunit is the operation of adding one to the contents of the S-bus and depositing, that is, transferring, the resultant signals onto the result bus.

The file field specifies BALSB which is the least significant byte of the buffer address, that is, the particular eight bits of the file storage unit 30 that will be addressed. The 5-bit control field of the instruction statement specifies LDADR1 which indicates that the memory address register 1 is to be loaded. The write file instruction is WF, indicating that this is a write operation, that is, the signals on the result bus R-bus are to be written into the addressed portion of the file storage unit. The accumulator field contains Hold, meaning that the contents of the accumulator 26 remain fixed. The program control term is skip on carry out. Carry out, as shown in FIG. 9A, is one of the signals applied to the test-tree logic circuit 36.

The various signals generated by the read-only memory array 40 will now be traced through the multiplexer DMA-MUX to ascertain how these signals produce the conditions specified in the statement.

The term file in the source field results in a TRUE signal on the RCS1 line (line (1)) of read-only memory unit 54, as shown in FIG. 9B. Signals on lines RCS2 and RCS3 of read-only memory unit 54, are in the truth state of FALSE. As indicated previously, ROM output decoder 66 may be a Texas Instruments Model 74S138 decoder multiplexer device which is described in detail beginning at page 274 of the TI Design Book. Examination of the function cable of the TI Design Book appearing at page 275, shows that a TRUE signal on input terminal C, combined with FALSE signals on input terminals A and B, selects the Y4 output of the plurality of output signals. Consequently, from FIG. 9B, it may be observed that the file enable signal FILEN will be selected to enable the file storage unit 30 in the arithmetic logic subunit ALS.

The purpose of ROM output decoder 66 is to select the signals to be placed on the source bus and because only one such signal may be selected at a time, only one source of signals to be placed on the source bus will be enabled or activated in accordance with the microcode word output of the read-only memory array 40.

Further examination of the binary microcode output corresponding to the statement of line 843 of the firmware program listing, shows that the bits 01101 in the ALU field correspond to ALU control signals in the following truth state: the mode signal M is FALSE, the AS2 signal is TRUE, the AS1 signal is TRUE, the AS0 signal is FALSE, and the CIN signal is TRUE.

As previously mentioned in the detailed description of the invention, the arithmetic logic subunit ALS comprises two 4-bit parallel binary accumulators, such as a Texas Instruments Model SN74S281, which is described beginning at page S271 of the TI Supplement. At page S272 of the TI Supplement, the description includes function tables which indicate the arithmetic and logic functions of the arithmetic logic units 28A and 28B in FIG. 8A, depending upon the truth states of the various ALU control signals. In looking at the function tables and particularly the function that corresponds to the previously stated combination of truth states for the ALU control signals, it may be seen that the output of the arithmetic logic unit is equal to the contents of the source bus plus one. Thus, the arithmetic operation corresponding to the statement SBUSP1 which, as previously indicated, is the arithmetic operation of adding one to the contents of the source bus S-bus and depositing the result on the result bus R-bus, is accomplished by the combination of signal truth conditions represented by the signals on lines 4 through 8 of the read-only memory array 40. The phrase "contents of the source bus" is used herein to mean the signals on the eight lines of the source bus.

Continuing the examination of the statement of line 843 in Table X, it is seen that the file field contains the binary signals 100 which are represented by 4 in hexadecimal form. Table VII shows that the file contents corresponding to a field content of hexadecimal 4, is the least significant byte of the address pointer. Thus, the binary number 100 corresponds to a combination of file address signals appearing at lines 9, 10, and 11 of the read-only memory array 40 that addresses the particular location in the file storage unit 30 that corresponds to the stored least significant byte of the buffer address.

The multiplexer control field, which includes bits 12 through 16, contains all zeros. Therefore, only FALSE signals are on the corresponding lines 12 through 16 of the read-only memory array 40. These signals produce the appropriate combination of input signals to ROM output decoder 68 to select the signal appearing at terminal YO. It will be recalled that ROM output decoder 68 may also be a Texas Instruments Model SN74LS138 decoder multiplexer. Selection of the signal at output terminal YO of ROM output decoder 68 results in the selection of the load address register 1 signal LDADR1 which, as shown in FIG. 7B, is applied to the memory address registers in the address-decoder and control-logic subunit ADCL where it is used as a clock signal to load the least significant byte registers of the memory address registers 88.

As shown in FIG. 7B, the signals appearing on the result bus R-bus are applied to the memory address registers 88. Thus, the portion of the statement appearing at line 843 of the firmware microcode program thus far examined, puts the least significant byte of the buffered address stored in the file storage unit on the source bus S-bus, and takes the signals appearing on the source bus and performs an arithmetic operation in which 1 is added to the signals on the source bus and the sum is then placed on the result bus and loaded into the memory address registers 88.

The 1-bit write file bit is WF in the firmware instruction statement appearing at line 843 and therefore a TRUE signal, corresponds to bit position 17, causes the output of the result bus R-bus in the arithmetic logic subunit ALS to be written back into the addressed location of the file storage unit 30.

The 1-bit accumulator field shows a Hold condition in the statement appearing at line 843 of Table X, which corresponds to a TRUE accumulator signal ACC on line 18 of the read-only memory array 40, shown in FIG. 9B. The TRUE truth state of the signal reloads the accumulator 26 with the same signals generated at the output terminals of the accumulator during the prior machine cycle. Consequently, the accumulator retains its contents for an additional machine cycle.

The last field in the statement appearing at line 843 of Table X, namely, the program control field PCON, includes bits 19 through 24 which correspond to the signals LDS, TT3, TT2, TT1, TT0, and TTF (see FIG. 9B). Each of these signals plays a part in selecting an input signal to test-tree logic circuit 36 and in selecting the appropriate truth state for a conditional jump or skip operation. In this particular microword output, bits 19 through 24 have the binary code, 000011. This code means that the load signal LDS, the TT3 signal, TT2 signal, and TT1 signal are FALSE and the TT0 and TTF signals are TRUE. This combination of signals TT0 through TT3, selects the carry out signal COUT which, as shown in FIG. 9A, is applied to the D1 terminal of data selector 42. The truth state of the TTF signal being TRUE, inverts the carry out signal COUT as it is transferred out of the synchronizer flip-flop 46 as shown in FIG. 9A.

The signal on the output terminal Q of synchronizer flip-flop 46 and the TTF signal are applied to an Exclusive-OR gate XOR1, the output signal of which is the condition met signal CM. The truth condition of the load signal LDS determines whether the conditional operation is to be a skip or a jump. If the load signal LDS is TRUE it is a jump operation; if the load signal is FALSE, it is a skip operation. In this case, the load signal is FALSE, therefore the conditional operation is a skip operation, as explained in detail in conjunction with FIG. 9B above.

Thus, the effect of the ROM output signals corresponding to the statement appearing at line 843 of Table X, is to add 1 to the contents of the file storage unit 30 corresponding to the least significant byte of the buffer address, restore the incremented contents back into the file and also store the incremented contents in one set of registers of the memory address registers 88 in the address-decoder and control-logic subunit ADCL.

Furthermore, the skip on carry out term SCOUT, appearing in the program control field, has the effect of causing a skip of the next following increment of the input address to read-only memory array 40 if, and only if, the carry out signal COUT is TRUE. The reason for this skip is that a TRUE carry out signal from the accumulator portions of the arithmetic logic units in the arithmetic logic subunit ALS, indicates that the process of adding one to the least significant byte of the buffer address resulted in a carry. A carry indicates that the most significant byte of the buffer address must be also increased by 1 to compensate for the carry in the least significant byte.

For purposes of this explanation, it will be assumed that the carry-out signal produced during the operation corresponding to the statement of line 843 does have a TRUE condition and therefore the program skips the statement at line 846 and continues operation at the statement at line 849.

Comparing the ROM output of line 849 with the ROM output of line 843, it will be observed that only the third and fourth hexadecimal numerals have changed. Actually, the changed hexadecimal numerals correspond to a change in bits 9, 10, 11, and 16 of the 24-bit binary microcode. The changes in bits 9, 10, and 11 correspond to the change in the file storage unit address whereby the most significant byte of the buffer address is addressed instead of the least significant byte of the buffer address that was previously addressed in the statement of line 843. The change in bit 16 corresponds to a selection of the Y1 output terminal of ROM output decoder 68 shown in FIG. 9B. This selection puts the load signal LDADR2 in a truth state of TRUE whereby the arithmetic result of the operation of incrementing the most significant byte of the buffer address by 1, is loaded into the second set of memory address registers 88 in the address-decoder and control-logic subunit ADCL.

It will be noted that the statement of line 849 also includes the term skip on carry out SCOUT. It will be assumed for purposes of discussion, that the carry out signal is TRUE and that therefore the condition for skipping is met, and that the program thereafter skips the statement at line 853 and commences with the statement appearing at line 857.

The ROM output for line 857 is represented in hexadecimal form by 8DAADE and in binary form by 100011011010101011011110. Accordingly, the source of the signals to be placed on the source bus S-bus is the file storage unit 30. The arithmetic logic operation is the operation of adding 1 to the signals on the S-bus and depositing the sum on the result bus R-Bus. However, in this statement, the file field contains STATUS, indicating that the file storage unit will be addressed with the location of the STATUS word. This address is reflected in the truth condition of the file address signals FA2–FA0 on lines 9, 10, and 11 respectively, of the output terminals of the read-only memory array 40, as shown in FIG. 9B.

The multiplexer control field contains the term LDCONT which corresponds to the generation of a load control signal LDCONT at terminal Y2 of ROM output decoder 68, as shown in FIG. 9B. As previously indicated in the detailed description of the circuitry of the direct-memory-access multiplexer DMA-MUX, the load control signal LDCONT is applied to the clock terminal of the Opcode register 14 in the data transfer subunit DTS as shown in FIG. 7A, and is also applied to the DMA start and reset logic circuit 120 of the direct-memory-access logic subunit DMAL, as shown in FIG. 10. In response thereto, the Opcode register 14 generates the enable signals to enable an input data transfer operation in accordance with the instructions originally contained in the command word and stored in the STATUS file portion of the file storage unit 30 (see Table VII). Furthermore, in response to the load control signal LDCONT, the direct-memory-access logic subunit DMAL is enabled to commence a direct-memory-access cycle by acquiring access to the main buses MB of the computer unit CU, as explained above in conjunction with FIG. 10.

The write file bit WF of the statement on line 857 is TRUE, therefore the file is enabled for writing the contents of the result bus R-bus back into the file storage unit 30. The accumulator bit is in the Hold state, that is, a TRUE condition, so that the contents of the accumulator 26 remain fixed.

As a result of the execution of the statement at line 857, data signals that are available at the selected peripheral-unit controller PUC, are enabled onto the input-/output bus IOB, into the multiplexer DMA-MUX, amplified in the data transfer subunit DTS by input buffers 10, shown in FIG. 7A, and applied to the data bus DB for direct transfer into the appropriate location in the main-memory unit MMU during the DMA cycle.

The program control field contains the unconditional increment INC, therefore, the next statement in the program sequence is the statement appearing at line 862. The statement at line 862 results in a ROM output represented in hexadecimal form by 8D50C3. This output is represented in binary form by 100011010101000011000011.

Relating the above identified binary microword to the output lines (1)-(24) of the read-only memory array 40 in FIG. 9B, it is apparent that the following signals are in a truth condition of TRUE: The ROM coded signal RCS1, the accumulator control signals AS2, AS1, and CIN, the file address signal FA1, the ROM signal ROM4, the write file signal WF, the accumulator signal ACC, and the test-tree-logic-circuit signals TT0 and TTF.

As indicated in the statement corresponding to line 862 of Table X, the source of the signals to be applied to the source bus S-bus in this operation is the file storage unit 30 (see FIG. 8B). This is accomplished by means of selection of output terminal Y4 of ROM output decoder 66 which generates the file enable signal FILEN (see FIG. 9B). The ALU operation corresponding to binary 1101 on signals AS2, AS1, AS0, and CIN respectively, is the operation of adding 1 to the contents of the source bus S-bus and depositing the sum on the result bus R-bus. The bits 010, which in bit positions (9), (10), and (11) represent the truth states of the signals FA2, FA1, and FA0 respectively, correspond to an address of the file storage unit 30 at the location corresponding to the least significant byte of the transfer count. It is this least significant byte of the transfer count which is placed on the source bus S-bus during this operation.

The multiplexer control field contains the term NOCON which, as shown in Table IX, indicates that no control signals are being generated during the operation corresponding to this statement. The write file bit WF is TRUE, indicating that the signals on the result bus R-bus during the operation corresponding to the statement at line 862, are written back into the file storage unit 30 in the location addressed during this operation. The accumulator field contains a Hold term, indicating that the contents of the accumulator 26 remain fixed through this operation.

The program control field contains the term SCOUT corresponding to a skip-on-carry-out operation discussed above in conjunction with prior statements.

As shown below the statement at line 862, namely, at lines 863 and 864, the effect of the operation corresponding to the statement at line 862, is two-fold. First, the contents of the file storage unit 30, corresponding to the least significant byte of the transfer count, are incremented and stored in the same location within the file storage unit 30. Second, the carry out signal COUT is monitored by the test-tree logic circuit 36 to ascertain whether or not the least significant byte LSB of the transfer count has become equal to zero. If it has not, the program increments to the next statement appearing at line 865, which corresponds to an unconditional jump statement UJMP. The jump address is IN1, the name of the routine represented by the statement at line 875. On the other hand, if the carry out signal COUT is in a TRUE condition, the program skips to the statement at line 868 which produces an operation to increment (also referred to as "bumping") the most significant byte MSB of the transfer count.

Comparing the statements appearing at lines 868 and 862, it is apparent that the only difference is in the address of the file field, that is, the selection location within the file storage unit 30, whereby it is the most significant byte of the byte count WCMSB that is incremented in the statement at line 868 as opposed to the least significant byte of the byte count WCLSB that had been incremented in the statement at line 862. If a TRUE carry out signal COUT is detected during the operation represented by the statement at line 868, the program increments to the statement appearing at line 872, an unconditional jump to the EOBIN routine. This unconditional jump corresponds to performance of an end-of-block interrupt sequence in response to a zero byte count.

For purposes of discussion, it will be assumed that a FALSE carry out signal is detected during the operation represented by the statement at line 868. Therefore, the program skips to the statement appearing at line 875 and the IN1 routine.

As shown at line 875 of Table X, the output signals of the read-only memory unit array 40 of FIG. 9B, may be represented in hexadecimal form by 0CAD73 and in binary form by 000011001010110101110011.

As indicated under the column titled "STMNT TYPE", the statement at line 875 of Table X is an immediate statement IMED. Table IV indicates the immediate statements contain six fields, namely, a source field, an ALU field, an immediate field, a write file field, an accumulator field, and a program control field.

The source field contains the term ROM which, as previously indicated in Table V, corresponds to the placement of ROM literals on the source bus, the three FALSE signals RCS1, RCS2, and RCS3 selecting the Y0 output of ROM output decoder 66 (see FIG. 9B). This selection results in the generation of a TRUE select ROM signal SELROM. As previously discussed in conjunction with FIG. 8B and FIG. 9B, the select ROM signal SELROM is transferred to the multiplexer 34 in the arithmetic logic subunit ALS where it is used to enable the multiplexer 34 to place the signals ROM0 through ROM4 and FA2 through FA0 on the source bus S-bus as a literal term.

The next field in the statement appearing at line 875 of Table X, is the ALU field which contains the term SBUS. The term SBUS in the ALU field as indicated in Table VI, passes the signals on the source bus S-bus onto the result bus R-bus without arithmetic or logic modification.

The next term in the statement at line 875 of Table X corresponds to the immediate field IMEDE which contains the term CHARD, the name of the routine to which the program jumps upon the satisfaction of the condition stated in the program control field. In this case, the routine to which the program jumps upon the satisfaction of the condition, is the CHARD routine which commences at line 914 of Table X. The CHARD routine is the routine used to compare a term of incoming data signals with either an ASCII carriage return code ("0D" in hexadecimal form), or with a special character stored in the file storage unit 30 at location :0 (see Table VII) and comprising eight bits which may have any combination of truth conditions.

Examination of the eight bits comprising the immediate field IMEDE, namely, the bits in positions 10 through 16, shows that the immediate field contains the hexadecimal term AD which corresponds to the ROM input address AD for the statement appearing at line 914, the statement with which the CHARD routine commences. Thus, it may be seen that the literal, that is, the signals appearing on output terminals 9 through 16 of read-only memory array 40, constitute the address of the next statement to be generated by read-only memory array 40 upon the satisfaction of the condition specified in the program control field.

The literals are thus placed on the source bus S-bus and the contents of the source bus S-bus are passed without modification to the result bus R-bus which is connected to the ROM address counters 48, 50, and 52. Accordingly, the first three fields in the statement of the immediate statement at line 875 set up the next program statement in accordance with the truth states of the literal signals ROM0–ROM4 and FA0–FA2 generated at terminals 9 through 16 of read-only memory array 40 (see FIG. 9B).

The write file field of the statement at line 875 contains the term write file not WFN. This term corresponds to a FALSE signal on terminal 17 of read-only memory array 40. The write file not signal WFN is equivalent to a FALSE write file signal WF and is transferred to the file storage unit 30 in the arithmetic logic subunit ALS, as shown in FIG. 8B. A FALSE write file signal disables the write function in the file storage unit 30 so that the contents of the file storage unit 30 cannot be inadvertently modified by the signals on the result bus R-bus.

The accumulator field in the statement at line 875 of Table X, contains a hold signal Hold which, as previously indicated, corresponds to a TRUE accumulator signal ACC on terminal 18 of read-only memory array 40. A TRUE accumulator signal ACC holds the contents of the accumulator 26 fixed during an operation.

The program control field of the JCDET. As shown in FIG. 9A, the character detection signal CDET is one input signal to data selector 44 of the test-tree logic circuit 36. The effect of the truth states of the signals on terminals 19 through 24 of the read-only memory array 40 is to cause the test-tree logic circuit 36 to select the character detection signal CDET to test whether or not the condition for the jump operation has been satisfied. If the character detection signal CDET is TRUE, the program jumps to the ROM input address AD which corresponds to the contents of the immediate field. However, if the character detection signal CDET is FALSE, the program increments to the next statement appearing at line 878. For purposes of this discussion it will be assumed that the character detection signal CDET, detected during the operation corresponding to the statement at line 875 of Table X, is FALSE and thus the next operation corresponds to the statement at line 878.

The statement at line 878 of Table X results in a ROM output which may be represented in hexadecimal form by 0CA864 and in binary form by 000011001010100001100100. This statement and the four following statements in Table X comprise the IN2 routine. The statement at line 878 is an immediate type statement, as shown under the column labeled "STMNT TYPE".

The explanation for the statement at line 878 of Table X shows that the source field contains the term ROM, ALU field contains the term SBUS, the write file bit is in the FALSE state, and the accumulator bit contains the Hold term. Thus, the only difference between the immediate statement at line 878 and the immediate statement at line 875 is the content of the immediate field and the content of the program control field. It will be seen that the immediate field contains the term IN2, the name of this same statement, and that the program control field contains the term jump-on-DMA-done-not JDMDN.

As indicated in the explanation statement at line 879, the purpose of the operation corresponding to the statement at line 878 is to wait until the data transfer is complete. This waiting is accomplished by having the program repeatedly jump to this same statement as long as the DMA done signal DMADON is FALSE. However, as soon as the DMA done signal DMADON becomes TRUE (see FIG. 10), the condition for jumping back to this statement is no longer satisfied and the program increments to the statement at line 881.

The ROM output of the statement at line 881 may be represented in hexadecimal form by F0F846 and in binary form by 111100001111100001000110. As indicated in the statement column of line 881, the source field contains the term ONES which, as previously indicated in conjunction with Table V, corresponds to a condition in which the signals on the source bus S-bus are ignored. The ALU field contains the term ZEROS which, as indicated in Table VI, results in the placing of all FALSE signals on the result bus R-bus. The file field contains the term NOOPF which, as indicated in Table VII, corresponds to a no-file operation for this statement.

The multiplexer control field contains the term enable command ENCMD, which corresponds to a TRUE signal on terminal 13 of read-only memory array 40, as shown in FIG. 9B. The signal on terminal 13 of read-only memory array 40 is the ROM signal ROM3. ROM signal ROM3 is applied to the data terminal D1 of ROM output register 70 and thereby produces a TRUE signal at the output terminal Q1 of ROM output register 70. As indicated in FIG. 9B, the signal on terminal Q1 of ROM output register 70 corresponds to the enable command signal ENCMD. As previously discussed in conjunction with FIG. 7C, the enabling of the signal ENCMD in the address-decoder and control-logic subunit ADCL, places a TRUE command signal CMD on the input/output bus IOB connected to the selected peripheral-unit controller PUC.

The write file bit of the statement at line 881 of Table X contains the write-file-not term WFN, which prevents inadvertent writing into the file storage unit 30. The accumulator bit contains the term Hold which, as previously indicated, fixes the contents of the accumulator 26 during this operation.

The program control field PCON contains the term skip-on-rate-error-not SRATEN. Accordingly, the signals on terminals 19 through 24 of the read-only memory array 40 are in the appropriate truth states to select the rate error signal RATER which is applied to the terminal D3 of the data selector 42 in the test-tree logic circuit 36 as shown in FIG. 9A. The truth values of the signals on terminals 19 through 24 are such that if the rate error signal RATER is TRUE, which is indicative of the existence of a rate error detected by the direct-memory access logic subunit DMAL as discussed previously in conjunction with FIG. 10, the program increments to the operation corresponding to the statement at line 884. If, however, the rate error signal is FALSE, the program skips to the statement at line 887.

For purposes of discussion, it will be assumed that the truth state of the rate error signal RATER, during the operation corresponding to the statement at line 881 of Table X, is FALSE and therefore, the next operation corresponds to the statement appearing at line 887 of Table X.

As indicated at line 887 of Table X, the ROM output may be represented in hexadecimal form by F0F05E and in binary form by 111100001111000001011110.

As indicated under the column entitled STATEMENT on line 887 of Table X, the source field contains the term ONES, the ALU field contains the term ZEROS, and the file field contains the term NOOPF. The effect of these three fields in conjunction with the signals they represent, namely, the signals on terminals 1 through 11 of read-only memory array 40, is to perform no operation involving the source bus S-bus and result bus R-bus.

The multiplexer control field of the statement at line 887 contains the term clear-control CLRCON which corresponds to the placing of FALSE signals on terminals 12 through 16 of the read-only memory array 40. This has the effect of putting the four output signals of ROM output register 70 in a FALSE state, thus clearing all the corresponding control signals (see FIG. 9B). The write file bit contains the write-file-not term WFN, that is, a FALSE write file signal, thus preventing the inadvertent writing over the contents of the file. The accumulator bit contains a Hold accumulator signal which corresponds to a TRUE accumulator control signal ACC on terminal 18 of read-only memory array 40. A TRUE accumulator control signal is transferred to the accumulator in the arithmetic logic subunit ALS and has the effect of holding the contents of the accumulator fixed.

The program control field of the statement at line 887 contains the unconditional increment operation INC which causes the program to increment to the next step in the program sequence, namely, the statement at line 890. As indicated in Table X, the statement at line 890 is an unconditional jump in which the jump-address field contains the address for the CHARD2 routine which commences at line 951 of Table X. This routine is used to check for pending data-service-interrupt signals and returns the program to the return address stored in the accumulator 26 in the previous step, if no data-service-interrupt signals are pending.

Completion of the operation corresponding to the statement appearing at line 890 of Table X is also completion of the entire IN routine, a major routine of Table X.

From the above detailed line-by-line description of the IN routine of Table X, it will now be apparent how all the other routines in Table X (including those routines represented in flow chart form by FIGS. 12–28), are carried out and it will also now be obvious, in view of the detailed description of the corresponding signals produced at the output terminals of read-only memory array 40, how the circuits described above in conjunction with FIGS. 7A–7D, 8A, 8B, 9A, and 9B carry out the operations corresponding to the statements listed in Table X.

SUMMARY

The distributed input/output system DIOS of this invention constitutes an input/output device management system, that is, a system for transferring data signals from a peripheral device into a computer's memory unit and also for transferring data signals out of a computer's memory unit to a peripheral device, and adapted for use with general purpose digital computers and with input/output devices wherein the digital computers employ direct-memory-access capability.

The distributed input/output system comprises a plurality of peripheral-unit controllers, each being adapted to be connected to a peripheral unit and each being programmed to respond to signals generated by a programmed digital computer to perform a sequence of data transfer operations in conjunction with the particular peripheral unit to which it is connected. The plurality of peripheral-unit controllers is connected to a common direct-memory-access type multiplexer which is in turn connected to the main buses of the computer. Each of the peripheral-unit controllers is connected to the direct-memory-access multiplexer by an elongated cable permitting location of the peripheral-unit controller at the peripheral unit being controlled. Each peripheral-unit controller comprises a substantially identical microengine unit that includes a controller memory unit which is programmed to execute a control data transfer operation with at least one peripheral device.

The direct-memory-access multiplexer includes circuits to provide for signal flow between a computer unit and peripheral-unit controllers and peripheral units. Furthermore, the direct-memory-access multiplexer includes circuits which enable it to simulate the arithmetic, logic, and control capabilities of the central processor unit. It also includes circuits used to gain access and control of the computer's main buses whereby the multiplexer may acquire direct access to the computer's main-memory unit and communicate therewith without involving the central processor unit of the computer unit. Of course, once data signals have been transferred by means of this invention, the central processor unit may use such data signals in any conventional manner because this invention is independent of the central processor unit except as delineated above.

The distributed input/output system of this invention constitutes an input/output device management system in which a first plurality of peripheral units communicate with a digital computer by means of a multiplexer having direct-memory-access features and a second plurality of peripheral units communicate with the same digital computer by a less sophisticated multiplexer which does not have such direct-memory-access features.

The first plurality of peripheral units may have a combined data bandwidth that exceeds the combined data bandwidth of the second plurality of peripheral units because of the greater data bandwidth of the multiplexer having direct-memory-access features. However, aside from the speed of data transfer operations, there are no differences in the computer software program or in the signals received from or in the signals transferred to peripheral units or controllers to which peripheral units are connected. This lack of differences makes multiplexers of the direct-memory-access type physically interchangeable and software compatible with multiplexers of the indirect-memory-access type.

GENERAL REMARKS

While the invention has been described with particular reference to the use of general purpose programmable computers, and permanently programmed read-only memory units, it will be understood that many features of the system which are presently programmed in software program form, may be embodied in hardwired form. Likewise, those parts of the system which have been described as utilizing hardwired programs may be embodied in software program form.

For purposes of simplifying the explanation, language has been utilized which may sound like it is concerned with mental processes but which in fact is concerned with physical processes. For example, the terms "instruction", "information", and "data" and particularly where reference is made to storage and transfer thereof, refer specifically to instruction signals, information signals, and data signals or other manifestations of instructions, information, and data which are capable of physical manipulation. In the embodiment of the invention described, the signals in question are stored either in the computer unit in binary form in magnetized cells, such cells usually being magnetized in one direction to represent a value ZERO and in the opposite direction to represent a value ONE in the binary system, or in semiconductor devices, such as transistor-transistor logic TTL memory arrays with open and closed output circuits corresponding to FALSE and TRUE logic states, respectively. The term "transfer data" and similar expressions refer to the manipulation of those signals or manifestations. The term "flag" is used herein to mean signal.

It is to be understood that while the invention has been described with particular reference to signals in binary form, signals in other logic form, such as trinary form, may be considered within the scope of this invention. Furthermore, it is to be understood that while binary signals described herein in conjunction with this invention are considered to be in a positive or TRUE state when in a constant voltage level, such as +5 volts DC and are considered to be in a negative or FALSE state when in a constant voltage level, such as 0 volts DC, the scope of this invention also includes binary signals the state of which depend upon the direction of change from one voltage level to another.

Many details of a type which would be obvious to one skilled in the art have been omitted. For example, many of the precautions that would obviously be taken in order to assure accuracy and reliability of the data transfer processes, such as initializing values of bits and various cells in the main-memory unit MMU have not been mentioned. Likewise, arrangements for causing operations to occur at predetermined times and predetermined sequences or at specified intervals, have not all been described. Furthermore, not all of the possible details of the logic circuits of this invention have been described. Software programs that may be used in conjunction with digital computers connected to peripheral units by means of this invention have not been described fully herein, but are included in the "Distributed I/O System User's Manual" 91-53629-00A1 published by Computer Automation, Inc., April 1976. Digital computers that may be used in conjunction with this invention have also not been described fully herein, but at least one such computer and its operation are described in the "NAKED MINI LSI Series Computer Handbook", 91-20400-00A2, published by Computer Automation, Inc., October 1974. Any omitted details would now be known to those of ordinary skill in this art and the drawings and description provided herein would make it obvious to those of such skill how to make and use the invention. All of these and other details are of such a nature that they can be supplied by a person having ordinary skill in the art of designing and programming computers.

The invention described herein may be employed in many ways different from those specifically set forth, and many variations may be made therein within the scope of the appended claims.

We claim:

1. A distributed input/output control system adapted for use with a digital computer and a plurality of peripheral units, the computer having a main memory unit and a central processor unit, the system comprising:
   a first multiplexer adapted to be connected to said computer for communicating with said main memory unit by means of said central processor unit;
   a first plurality of peripheral-unit controllers, each such controller coupling at least one of a first plurality of peripheral units with said first multiplexer;
   a second multiplexer adapted to be connected to said computer and also adapted to communicate directly with said main memory unit without processing in said main processor unit;
   a second plurality of peripheral-unit controllers, each such controller coupling at least one of a second plurality of peripheral units with said second multiplexer; and
   means for establishing priority relationships among each said plurality of peripheral-unit controllers and for establishing a priority relationship between said first and second multiplexers whereby an ordered sequence of input/output operations is established for any plurality of peripheral units ready to communicate with said computer at about the same time whereby transfers may be made between said ready peripheral units and said computer in accordance with said ordered sequence.

2. An input/output control system adapted for interconnecting a digital computer and a plurality of peripheral devices, said digital computer being controlled in accordance with a software program and having a central processor unit and a main memory unit and said control system being adapted for selectively transferring data signals, control signals, and status signals between the computer unit and the peripheral devices, the control system comprising:
   a first multiplexer having means responsive to such a software program for transferring data signals, control signals, and status signals between said main memory unit and one of said peripheral devices by means of said processor unit;
   a second multiplexer unit having means responsive to such a software program for transferring data signals, control signals, and status signals between said main memory unit and another of said peripheral devices without processing in said main processor unit;
   said first and second multiplexer units being physically interchangeable and also being software compatible whereby the control system operates in the same manner under the control of the same programs if said multiplexer units are interchanged, and whereby priority between said multiplexers connected to said peripheral devices is controlled; and
   a plurality of control units adapted for control of said peripheral devices, each said control unit being electrically interposed between one of said peripheral devices and one of said multiplexers.

3. In a method for operating an input/output control system having a direct-memory-access multiplexer electrically interposed between a digital computer and at least one peripheral device for controlling the transfer of sets of data signals from a memory unit of the digital computer in which such signals are stored to the peripheral device and for controlling the transfer of sets of data signals from the peripheral device to the memory unit, the steps of:
- (a) storing a program including a transfer instruction portion at a known location in said memory unit;
- (b) fetching a transfer instruction portion of such a program previously stored in said memory unit by means of said direct memory-access multiplexer and temporarily storing said fetched instruction in said multiplexer;
- (c) by means of said direct memory-access multiplexer transferring a first set of data signals between said memory unit and said peripheral device in accordance with said temporarily stored transfer instruction;
- (d) by means of said direct memory-access multiplexer modifying said temporarily stored transfer instruction in said multiplexer upon the completion of a transfer of said first set of data signals to represent such completion;
- (e) by means of said direct memory-access multiplexer repeating said steps of transferring and modifying for additional transferred sets of data signals until all sets of data signals in a limited plurality of such sets, have been transferred;
- (f) utilizing in said repeating step (e) a transfer instruction previously modified in step (d); and
- (g) storing said repeatedly modified transfer instruction at said known location in said memory unit.

4. The method of claim 3 wherein said transfer instruction comprises a count representative of the number of transfers remaining to complete transfer of all data signal sets in said limited plurality and wherein said transfer instruction also comprises a buffer address pointer representative of the location in said memory unit involved in the next data signal set transfer; and
wherein said modifying step (d) comprises the steps of:
- (h) decrementing said transfer count and
- (i) incrementing said buffer address pointer whenever the transfer of a set of data signals is completed.

5. The method of claim 4 further comprising the steps of:
- (j) generating a zero transfer count signal when said transfer count reaches zero; and
- (k) performing said restoring step (g) when said zero transfer count signal is generated.

6. In a method for operating an input/output control system having a direct memory access multiplexer adapted for electrically interconnecting a digital computer and a plurality of peripheral units and having a plurality of peripheral-unit controllers, the computer having a memory unit with automatic input and output instructions being stored at addressable locations therein, additional addressable locations in the memory unit being allocated for storing data signals, each such controller being adapted for generating a sequence of control words for managing the transfer of data signals from the computer to a corresponding peripheral unit, and from a corresponding peripheral unit to the computer, and each such controller also being adapted for generating resettable interrupt signals and for transferring such interrupt signals through the multiplexer before each transfer of data signals, the steps of:
- (a) by means of said direct memory-access multiplexer fetching said automatic input and output instruction signals at memory locations corresponding to a selected peripheral-unit controller and temporarily storing said instruction signals in said multiplexer;
- (b) generating an interrupt signal in said controller unit to indicate the readiness of the corresponding peripheral unit for a transfer operation;
- (c) assembling in said direct memory access multiplexer a set of address signals in response to said interrupt signal, said set of address signals corresponding to a memory unit location in a block of previously stored data signals;
- (d) transferring said set of address signals directly to said memory unit for reading said previously stored data signals out of said memory unit for transfer to said corresponding peripheral unit;
- (e) modifying said temporarily stored instruction signals arithmetically to indicate the remaining number of data signal transfers and to also indicate a change in said set of address signals for the next reading of data signals at another memory unit location;
- (f) utilizing additional interrupt signals generated by said selected peripheral-unit controller for transferring modified address words to said memory unit for reading additional data signals of said block of said previously stored data signals for transfer to said peripheral unit;
- (g) monitoring the modification of said temporarily stored instruction signals to ascertain the occurrence of the final transfer of data signals of said block of said stored data signals; and
- (h) detecting the occurrence of said final transfer, and upon such detection, restoring said arithmetically modified instruction signals back into said memory unit at the locations from which said instructions were previously fetched.

7. A multiplexer unit adapted for electrically interconnecting a digital computer including a processor and a plurality of peripheral-unit controllers, each such controller being adapted for connection to a different peripheral unit, and including means for generating an interrupt signal, the computer having a memory unit, the multiplexer unit comprising:
means for transmitting signals being transferred from said computer to said peripheral units,
means for receiving signals being transferred from said peripheral units to said computer, and
means controlled in part by an interrupt signal for reading said transmitted signals directly from said memory unit and for writing said received signals directly into said memory unit without processing said transmitted signals by said processor, and
means for receiving at least one interrupt signal from each of said peripheral-unit controllers;
means for generating a corresponding set of address signals in response to a received interrupt signal, each such received interrupt signal having a priority assigned to the peripheral-unit controller from which such an interrupt signal may be transferred;
means for transferring each said corresponding set of address signals to corresponding memory cells in said memory unit, for locating said memory cells in accordance with said assigned priority; and
means for incrementing such sets of address signals in response to receiving each additional interrupt signal from each said peripheral-unit controller for locating the memory cells corresponding to said incremented address signals.

8. In an input/output control system having a multiplexer unit adapted for electrically interconnecting a digital computer with a plurality of peripheral units, and having a plurality of peripheral-unit controllers, the computer having a memory unit, automatic input and output instruction signals being stored at addressable locations in the memory unit and additional addressable locations in the memory unit being allocated for storing data signals, each such controller including means for connection to a peripheral unit and means for generating a sequence of control words for managing the transfer of data signals from the computer to a peripheral unit and from a peripheral unit to the computer, and means for generating resettable interrupt signals and for transferring such interrupt signals to the multiplexer unit before each transfer of data signals, the multiplexer unit comprising:

- means for fetching said automatic input and output instruction signals at memory unit locations corresponding to a selected peripheral-unit controller and for temporarily storing said instruction signals,
- means responsive to an interrupt signal generated by said selected peripheral-unit controller for assembling an address word that represents a memory unit location corresponding to a block of previously stored data signals,
- means for transferring said address word directly to said memory unit for reading said previously stored data signals out of said memory unit for transfer to a peripheral unit to which said selected peripheral-unit controller is connected,
- means for modifying said temporarily stored instruction signals, each such modification being indicative of the number of data signal transfers having been made to a selected peripheral-unit controller and being also indicative of a change in the address word for the next reading of data signals at another memory unit location,
- means responsive to additional interrupt signals generated by said selected peripheral-unit controller for transferring modified address words to said memory unit for reading additional data signals of said block of said previously stored data signals for transfer to said peripheral unit,
- means responsive to said modifying means for recognizing the last transferred data signals of said block of said stored data signals, and
- means responsive to said last transfer recognizing means for restoring said modified instruction signals back into said memory unit at the locations from which said instructions were previously fetched.

9. The combination of an input/output control system interconnecting a digital computer and a plurality of peripheral units, the computer having a memory unit and the control system having a multiplexer connected to the computer and a peripheral-unit controller connected to each of the peripheral units, the multiplexer comprising:

- means for fetching, storing, and executing an input/output instruction in said stored memory unit;
- means responsive to said input/output instruction, to enable the direct transfer of a predetermined number of sets of data signals from said memory unit to a selected peripheral unit or from a selected peripheral unit to said memory unit, one of said sets being the final set to be transferred;
- means responsive to a data-service interrupt signal generated by a peripheral-unit controller for executing said instruction stored in said multiplexer, whereby execution of said instruction causes a transfer of data signals directly between said selected peripheral unit and said memory unit;
- means for modifying said input/output instruction to produce an instruction which is indicative of the number of completed data-signal set transfers;
- means for transferring a set of data signals and for detecting whether said set is said final set;
- means for tranferring an additional set of data signals when said last mentiond set of data signals is not said final set; and
- means for terminating data transfer operations and for restoring said modified input/output instruction to said computer when a set of data signals is said final set.

10. In an input/output control system having a multiplexer adapted for electrically interconnecting a digital computer and a plurality of peripheral units, and having a plurality of peripheral-unit controllers, the computer having a memory unit with automatic input instructions being stored at addressable locations therein, additional addressable locations in the memory unit being allocated for storing data signals, each such controller including means for connection to a peripheral unit and means for generating a sequence of control words for managing the transfer of data signals from the computer to a corresponding peripheral unit and from a corresponding peripheral unit to the computer, and means for generating resettable interrupt signals and for transferring such interrupt signals to the multiplexer for each such transfer of data signals, the multiplexer comprising:

(a) a data transfer subunit having drivers for amplifying data signals being transferred from a peripheral unit to said memory unit and for amplifying data signals being transferred from said memory unit to a peripheral unit, said data transfer subunit also having a register to temporarily store enabling signals which, when applied to said drivers, enable said drivers to amplify data signals;

(b) an arithmetic logic subunit having an accumulator, a source bus, an arithmetic logic device, a result bus, and a file storage unit, said accumulator and said source bus being connected to input terminals of said arithmetic logic device to provide input signals for arithmetic and logic operations within said arithmetic logic device, said result bus being connected to output terminals of said arithmetic logic device to receive the resultant signals of said arithmetic and logic operations, and said file storage unit having input terminals connected to said result bus and having output terminals connected to said source bus to provide means for temporarily storing signals on said buses, including said automatic input and output instruction signals; and (c) a distributor microengine subunit having at least one memory device in which a firmware program is stored, and having output terminals to which firmware programmed signals are applied;

an address counter having input terminals to which said result bus is connected for loading a new count into said address counter, and having output terminals connected to the input terminals of said memory device for addressing memory locations within said memory device;

a test-tree logic circuit having input terminals to which at least one circuit-status signal is applied and to which at least one of said firmware programmed signals is applied for selecting said circuit-status signal for testing, said test-tree logic circuit also having at least one additional input terminal to which at least an additional one of said firmware programmed signals is applied, and also having output terminals connected to said address counter whereby a first set of firmware programmed signals and the result of said testing of said circuit-status signal determine the response of said address counter.

11. In an input/output control system as defined in claim 10, the multiplexer further comprising:

(d) an address-decoder and control-logic subunit having memory address registers for storing memory address signals and memory address drivers for applying memory address signals to said computer memory unit, the input terminals of said memory address registers being connected to said result bus, said address-decoder and control-logic subunit also having means for recognizing and decoding computer generated transfer control signals and means for transferring decoded control signals to a selected peripheral-unit controller.

12. In an input/output control system as defined in claim 11, the multiplexer further comprising:

(e) an interrupt logic subunit having means adapted to receive said interrupt signals transferred to said multiplexer from peripheral-unit controllers, means to identify the particular peripheral-unit controller having transferred an interrupt signal to said multiplexer, means responsive to a received interrupt signal to generate a signal indicative of an interrupt signal having been received, means to generate a set of memory address signals corresponding to a received interrupt signal, means to transfer said interrupt-received indicative signal to said test-tree logic circuit and to transfer said set of memory address signals to said source bus.

13. In an input/output control system as defined in claim 12, the multiplexer further comprising:

(f) a direct-memory-access logic subunit having means for connection to said main buses of said computer unit, having means responsive to at least one of said firmware programmed signals to generate signals which, when transferred to said computer unit, cause a transfer of control of said main buses from said central processor unit to said multiplexer whereby said multiplexer has direct access to said memory unit, having means adapted to receive an acknowledge signal generated in said computer unit to acknowledge the completion of a memory-write operation and a memory-read operation, having means adapted to retain control of said main buses for additional transfers of data signals into and out of said memory unit and to relinquish control of main buses if no additional data signals are to be transferred upon receiving said acknowledge signal, and having means responsive to said acknowledge signal to generate a memory-access-completion signal and to transfer said signal to said test-tree logic circuit whereby the truth state of said memory-access-completion signal may be tested in said distributor microengine subunit.

14. In an input/output control system as defined in claim 13, the multiplexer further comprising:

(g) a clock signal generator having means for generating a plurality of clock pulse signals and means for transferring said clock pulse signals to said peripheral-unit controllers and to subunits in said multiplexer for synchronizing the operations of said controllers and said subunits.

15. In an input/output control system as defined in claim 2 wherein each said control unit comprises means responsive to control signals from said central processor unit and status signals from said peripheral devices for selecting one single communication path at a time through one of said control units and one of said multiplexers between said digital computer and one of said peripheral devices.

16. A multiplexer unit adapted for electrically interconnecting a digital computer including a processor and a plurality of peripheral unit controllers, each such controller being adapted for connection to a different peripheral unit and including means for generating an interrupt signal, the computer having a memory unit, the multiplexer unit comprising;

means for transmitting signals being transferred from said computer to said peripheral units;

means for receiving signals being transferred from said peripheral units to said computer; and means controlled in part by an interrupt signal for reading said transmitted signals directly from said memory unit and for writing said received signals directly into said memory unit without processing said transmitted signals by said processor; and, means for receiving at least one interrupt signal from each of said peripheral-unit controllers;

means for generating a corresponding set of address signals in response to a received interrupt signal, each such received interrupt signal having a priority assigned to the peripheral-unit controller from which such an interrupt signal may be transferred;

means for transferring each said corresponding set of address signals to corresponding memory cells in said memory unit, for locating said memory cells in accordance with said assigned priority; and means for incrementing such sets of address signals in response to receiving each additional interrupt signal from each said peripheral-unit controller for locating the memory cells corresponding to said incremented address signals.

* * * * *